US008817346B2

(12) United States Patent
Shiraishi

(10) Patent No.: US 8,817,346 B2
(45) Date of Patent: Aug. 26, 2014

(54) IMAGE PROCESSING APPARATUS, IMAGE PROCESSING METHOD, AND IMAGE FORMING APPARATUS FOR READING CODE DATA ROTATED AT 180 DEGREES

(75) Inventor: Naoto Shiraishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 333 days.

(21) Appl. No.: 13/043,750

(22) Filed: Mar. 9, 2011

(65) Prior Publication Data

US 2011/0228325 A1 Sep. 22, 2011

(30) Foreign Application Priority Data

Mar. 18, 2010 (JP) ................................. 2010-063353

(51) Int. Cl.
H04N 1/46 (2006.01)
(52) U.S. Cl.
USPC .... 358/539; 358/1.16; 358/1.17; 358/426.02; 358/426.04; 358/426.06
(58) Field of Classification Search
CPC ............ G06K 15/1898; H04N 1/3247; H04N 1/3877; H04N 1/41; H04N 2201/3292
USPC ................. 358/1.15, 539, 1.16–1.17, 426.02, 358/426.04, 426.06
See application file for complete search history.

(56) References Cited

U.S. PATENT DOCUMENTS

| 4,626,921 | A | * | 12/1986 | Ohtani et al. | .................. 382/245 |
| 4,682,215 | A | * | 7/1987 | Adachi | .......................... 358/539 |
| 5,113,494 | A | * | 5/1992 | Menendez et al. | ............. 345/502 |
| 5,815,283 | A | * | 9/1998 | Watanabe et al. | .............. 358/296 |
| 5,987,176 | A | * | 11/1999 | Imaizumi et al. | .............. 382/232 |
| 6,195,151 | B1 | * | 2/2001 | Parthasarathy et al. | ......... 355/24 |
| 6,915,017 | B2 | | 7/2005 | Shiraishi | |
| 6,941,023 | B2 | | 9/2005 | Shiraishi | |

(Continued)

FOREIGN PATENT DOCUMENTS

JP 8-317225 11/1996
JP 2888186 2/1999

(Continued)

Primary Examiner — Benny Q Tieu
Assistant Examiner — Quyen V Ngo
(74) Attorney, Agent, or Firm — Oblon, Spivak, McClelland, Maier & Neustadt, L.L.P.

(57) ABSTRACT

First storage stores code data each of which is formed by arranging identification at head of line code data obtained by coding image in a line unit, from first to last line of the image. Second storage recognizes the identification from the code data read by First reader to store the code data in a line unit. Third storage stores decoded image obtained by decoding the code data read from the second storage by Second reader in a line unit. When the image is rotated 180 degrees, First reader reads the code data from First storage from the last to the first line and reads each line from an end to a head of the line, Second reader reads the code data from Second storage from the identification to the end of the line, and Third reader reads the decoded image from the end to the head of the line.

13 Claims, 53 Drawing Sheets

(56) References Cited

U.S. PATENT DOCUMENTS

| | | |
|---|---|---|
| 7,079,691 B2 | 7/2006 | Shiraishi |
| 7,233,702 B2 | 6/2007 | Shiraishi |
| 7,359,557 B2 | 4/2008 | Shiraishi |
| 7,456,985 B2 | 11/2008 | Shiraishi |
| 7,483,586 B2 | 1/2009 | Shiraishi |
| 7,573,614 B2 | 8/2009 | Shiraishi |
| 2009/0060325 A1 | 3/2009 | Shiraishi |
| 2009/0128857 A1 | 5/2009 | Shiraishi |
| 2010/0225969 A1* | 9/2010 | Sato .............. 358/1.16 |

FOREIGN PATENT DOCUMENTS

| | | |
|---|---|---|
| JP | 2001-197496 | 7/2001 |
| JP | 2002-200792 | 7/2002 |
| JP | 3437346 | 6/2003 |
| JP | 2007-214802 | 8/2007 |
| JP | 4000266 | 8/2007 |
| JP | 4131977 | 6/2008 |

* cited by examiner

FIG. 6A
CODING PROCESS

| FIRST PAGE | SECOND PAGE | THIRD PAGE | FOURTH PAGE |
|---|---|---|---|
| TRANSMISSION OF IMAGE AND CODE TO CODING DEVICE AMOUNT OF DATA TRANSMITTED THROUGH BUS: 128 MB+128 MB/2 = 192 MB | TRANSMISSION OF IMAGE AND CODE TO CODING DEVICE AMOUNT OF DATA TRANSMITTED THROUGH BUS: 128 MB+128 MB/2 = 192 MB | TRANSMISSION OF IMAGE AND CODE TO CODING DEVICE AMOUNT OF DATA TRANSMITTED THROUGH BUS: 128 MB+128 MB/2 = 192 MB | TRANSMISSION OF IMAGE AND CODE TO CODING DEVICE AMOUNT OF DATA TRANSMITTED THROUGH BUS: 128 MB+128 MB/2 = 192 MB |

FIG. 6B
DECODING PROCESS

| FIRST PAGE | SECOND PAGE | THIRD PAGE | FOURTH PAGE |
|---|---|---|---|
| TRANSMISSION OF CODE TO DECODING DEVICE AMOUNT OF DATA TRANSMITTED THROUGH BUS: 128 MB/2 = 64 MB (0-DEGREE ROTATION DECODING) | TRANSMISSION OF CODE TO DECODING DEVICE AMOUNT OF DATA TRANSMITTED THROUGH BUS: 128 MB/2 = 64 MB (180-DEGREE ROTATION DECODING) | TRANSMISSION OF CODE TO DECODING DEVICE AMOUNT OF DATA TRANSMITTED THROUGH BUS: 128 MB/2 = 64 MB (0-DEGREE ROTATION DECODING) | TRANSMISSION OF CODE TO DECODING DEVICE AMOUNT OF DATA TRANSMITTED THROUGH BUS: 128 MB/2 = 64 MB (180-DEGREE ROTATION DECODING) |

TIME AXIS →

FIG. 6C
AMOUNT OF DATA TRANSMITTED THROUGH BUS FOR EACH PERIOD

| CODE NAME | CODE | CODE LENGTH |
|---|---|---|
| INDEX 1 | 0x1 | 3 |
| INDEX 2 | 0x2 | 3 |
| INDEX 3 | 0x3 | 3 |
| INDEX 4 | 0x8 | 4 |
| INDEX 5 | 0x9 | 4 |
| INDEX 6 | 0x34 | 6 |
| INDEX 7 | 0x35 | 6 |
| INDEX 8 | 0x36 | 6 |
| INDEX 9 | 0x37 | 6 |
| INDEX 10 | 0xe0 | 8 |
| INDEX 11 | 0xe1 | 8 |
| INDEX 12 | 0xe2 | 8 |
| INDEX 13 | 0xe3 | 8 |
| INDEX 14 | 0xe4 | 8 |
| INDEX 15 | 0xe5 | 8 |
| INDEX 16 | 0xe6 | 8 |
| INDEX 17 | 0xe7 | 8 |
| INDEX 18 | 0xe8 | 8 |
| INDEX 19 | 0xe9 | 8 |
| INDEX 20 | 0xea | 8 |
| INDEX 21 | 0xeb | 8 |
| INDEX 22 | 0xec | 8 |
| INDEX 23 | 0xed | 8 |
| INDEX 24 | 0xee | 8 |
| INDEX 25 | 0xef | 8 |
| INDEX 26 | 0xf0 | 8 |
| INDEX 27 | 0xf1 | 8 |
| INDEX 28 | 0xf2 | 8 |
| INDEX 29 | 0xf3 | 8 |
| INDEX 30 | 0xf4 | 8 |
| INDEX 31 | 0xf5 | 8 |
| INDEX 32 | 0xf6 | 8 |

FIG. 9B

| CODE NAME | CODE | CODE LENGTH |
|---|---|---|
| ESC HEADER | 0x0 | 3 |
| ESC DATA | 16'hxxxx | 16 |

FIG. 9C

| CODE NAME | CODE | CODE LENGTH |
|---|---|---|
| LINE MARKER | 0xfffff | 20 |

FIG. 9D

| CODE NAME | CODE | CODE LENGTH |
|---|---|---|
| LINE END CODE | 0xf7 | 8 |

FIG. 19

| DICTIONARY DATA | INDEX |
|---|---|
| 0x0123 | 1 |
| 0x4567 | 2 |
| 0x89AB | 3 |
| 0xCDEF | 4 |
| 0x3210 | 5 |
| 0x7654 | 6 |
| 0xBA98 | 7 |
| 0xFEDC | 8 |
| 0x0000 | 9 |
| 0x1111 | 10 |
| 0x2222 | 11 |
| 0x3333 | 12 |
| 0x4444 | 13 |
| 0x5555 | 14 |
| 0x6666 | 15 |
| 0x7777 | 16 |
| 0x8888 | 17 |
| 0x9999 | 18 |
| 0xAAAA | 19 |
| 0xBBBB | 20 |
| 0xCCCC | 22 |
| 0xDDDD | 22 |
| 0xEEEE | 23 |
| 0xFFFF | 24 |
| 0x0011 | 25 |
| 0x2233 | 26 |
| 0x4455 | 27 |
| 0x6677 | 28 |
| 0x8899 | 29 |
| 0xAABB | 30 |
| 0xCCDD | 31 |
| 0xEEFF | 32 |

INPUT DATA 0x5555 →

→ OUTPUT SYMBOL

FIG. 25

| INDEX NUMBER | CODE | CODE LENGTH |
|---|---|---|
| INDEX 01 | 0x1 | 3 |
| INDEX 02 | 0x2 | 3 |
| INDEX 03 | 0x3 | 3 |
| INDEX 04 | 0x8 | 4 |
| INDEX 05 | 0x9 | 4 |
| INDEX 06 | 0x34 | 6 |
| INDEX 07 | 0x35 | 6 |
| INDEX 08 | 0x36 | 6 |
| INDEX 09 | 0x37 | 6 |
| INDEX 10 | 0xe0 | 8 |
| INDEX 11 | 0xe1 | 8 |
| INDEX 12 | 0xe2 | 8 |
| INDEX 13 | 0xe3 | 8 |
| INDEX 14 | 0xe4 | 8 |
| INDEX 15 | 0xe5 | 8 |
| INDEX 16 | 0xe6 | 8 |
| INDEX 17 | 0xe7 | 8 |
| INDEX 18 | 0xe8 | 8 |
| INDEX 19 | 0xe9 | 8 |
| INDEX 20 | 0xea | 8 |
| INDEX 21 | 0xeb | 8 |
| INDEX 22 | 0xec | 8 |
| INDEX 23 | 0xed | 8 |
| INDEX 24 | 0xee | 8 |
| INDEX 25 | 0xef | 8 |
| INDEX 26 | 0xf0 | 8 |
| INDEX 27 | 0xf1 | 8 |
| INDEX 28 | 0xf2 | 8 |
| INDEX 29 | 0xf3 | 8 |
| INDEX 30 | 0xf4 | 8 |
| INDEX 31 | 0xf5 | 8 |
| INDEX 32 | 0xf6 | 8 |

FIG. 34

| CODE | INDEX NUMBER | CODE LENGTH |
| --- | --- | --- |
| 0b001x_xxxx | INDEX 01 | 3 |
| 0b010x_xxxx | INDEX 02 | 3 |
| 0b011x_xxxx | INDEX 03 | 3 |
| 0b1000_xxxx | INDEX 04 | 4 |
| 0b1001_xxxx | INDEX 05 | 4 |
| 0b1101_00xx | INDEX 06 | 6 |
| 0b1101_01xx | INDEX 07 | 6 |
| 0b1101_10xx | INDEX 08 | 6 |
| 0b1101_11xx | INDEX 09 | 6 |
| 0b1110_0000 | INDEX 10 | 8 |
| 0b1110_0001 | INDEX 11 | 8 |
| 0b1110_0010 | INDEX 12 | 8 |
| 0b1110_0011 | INDEX 13 | 8 |
| 0b1110_0100 | INDEX 14 | 8 |
| 0b1110_0101 | INDEX 15 | 8 |
| 0b1110_0110 | INDEX 16 | 8 |
| 0b1110_0111 | INDEX 17 | 8 |
| 0b1110_1000 | INDEX 18 | 8 |
| 0b1110_1001 | INDEX 19 | 8 |
| 0b1110_1010 | INDEX 20 | 8 |
| 0b1110_1011 | INDEX 21 | 8 |
| 0b1110_1100 | INDEX 22 | 8 |
| 0b1110_1101 | INDEX 23 | 8 |
| 0b1110_1110 | INDEX 24 | 8 |
| 0b1110_1111 | INDEX 25 | 8 |
| 0b1111_0000 | INDEX 26 | 8 |
| 0b1111_0001 | INDEX 27 | 8 |
| 0b1111_0010 | INDEX 28 | 8 |
| 0b1111_0011 | INDEX 29 | 8 |
| 0b1111_0100 | INDEX 30 | 8 |
| 0b1111_0101 | INDEX 31 | 8 |
| 0b1111_0110 | INDEX 32 | 8 |

FIG. 35

| INDEX | DICTIONARY DATA |
|---|---|
| 1 | 0x0123 |
| 2 | 0x4567 |
| 3 | 0x89AB |
| 4 | 0xCDEF |
| 5 | 0x3210 |
| 6 | 0x7654 |
| 7 | 0xBA98 |
| 8 | 0xFEDC |
| 9 | 0x0000 |
| 10 | 0x1111 |
| 11 | 0x2222 |
| 12 | 0x3333 |
| 13 | 0x4444 |
| 14 | 0x5555 |
| 15 | 0x6666 |
| 16 | 0x7777 |
| 17 | 0x8888 |
| 18 | 0x9999 |
| 19 | 0xAAAA |
| 20 | 0xBBBB |
| 22 | 0xCCCC |
| 22 | 0xDDDD |
| 23 | 0xEEEE |
| 24 | 0xFFFF |
| 25 | 0x0011 |
| 26 | 0x2233 |
| 27 | 0x4455 |
| 28 | 0x6677 |
| 29 | 0x8899 |
| 30 | 0xAABB |
| 31 | 0xCCDD |
| 32 | 0xEEFF |

INPUT INDEX 14 → (14)

OUTPUT DATA 0x5555

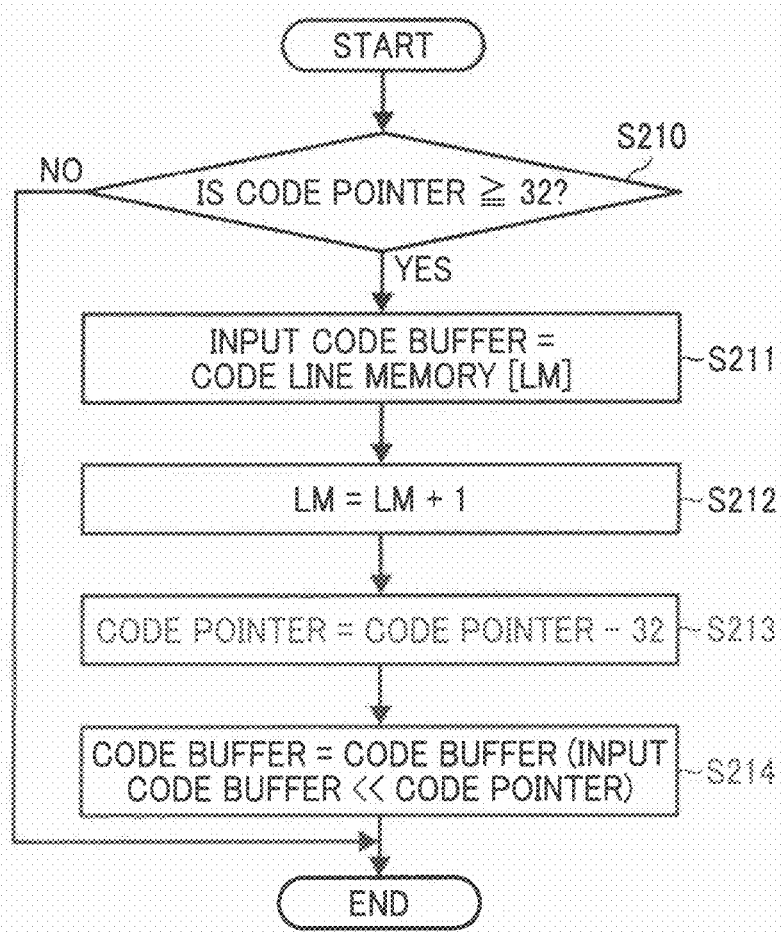

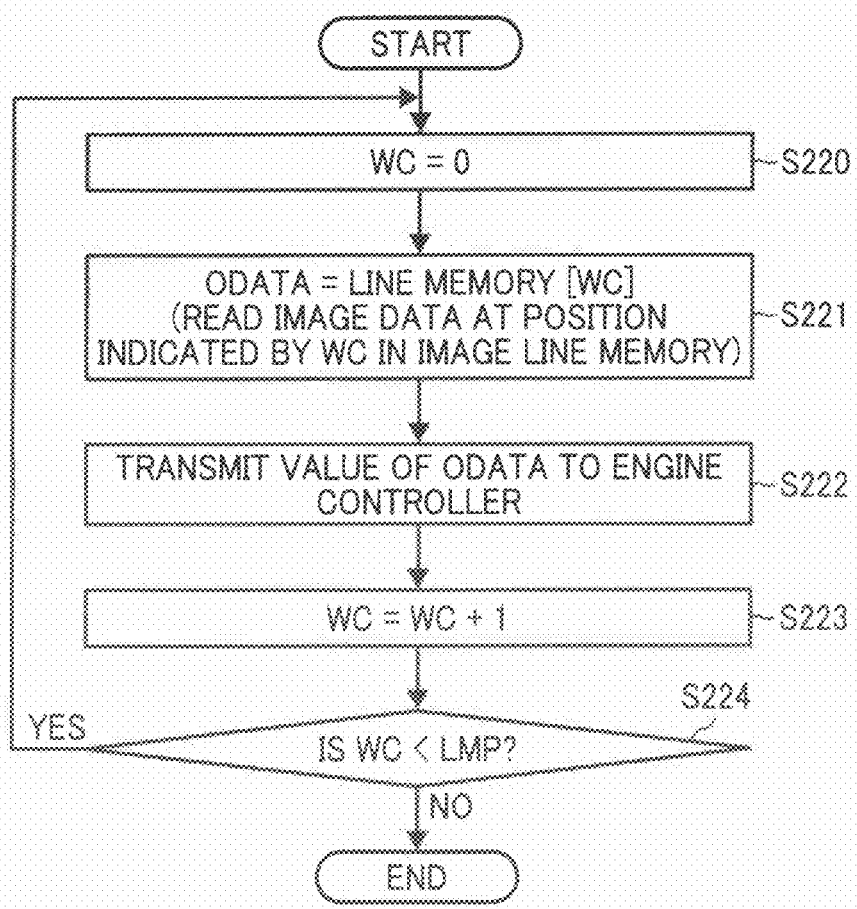

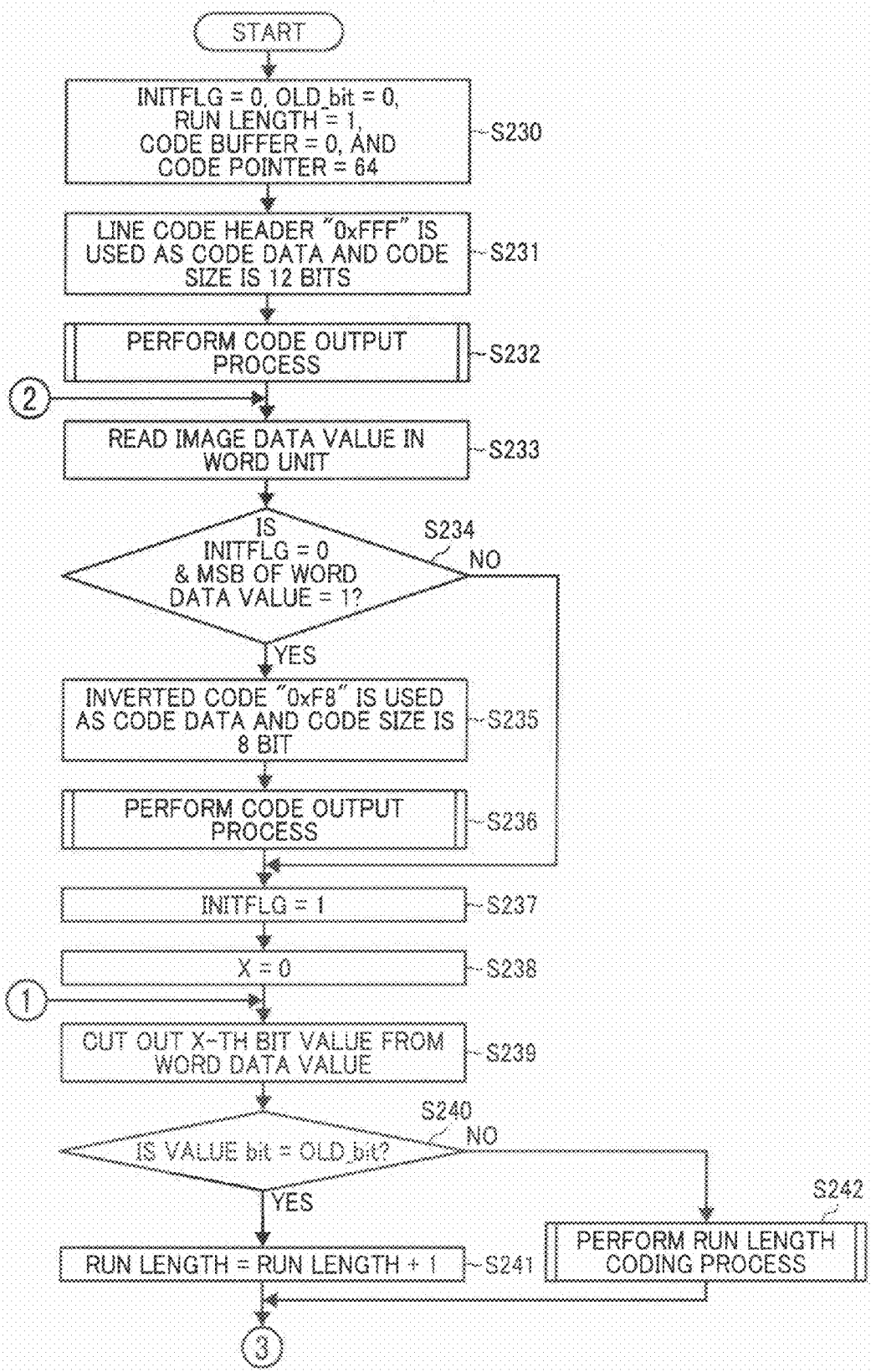

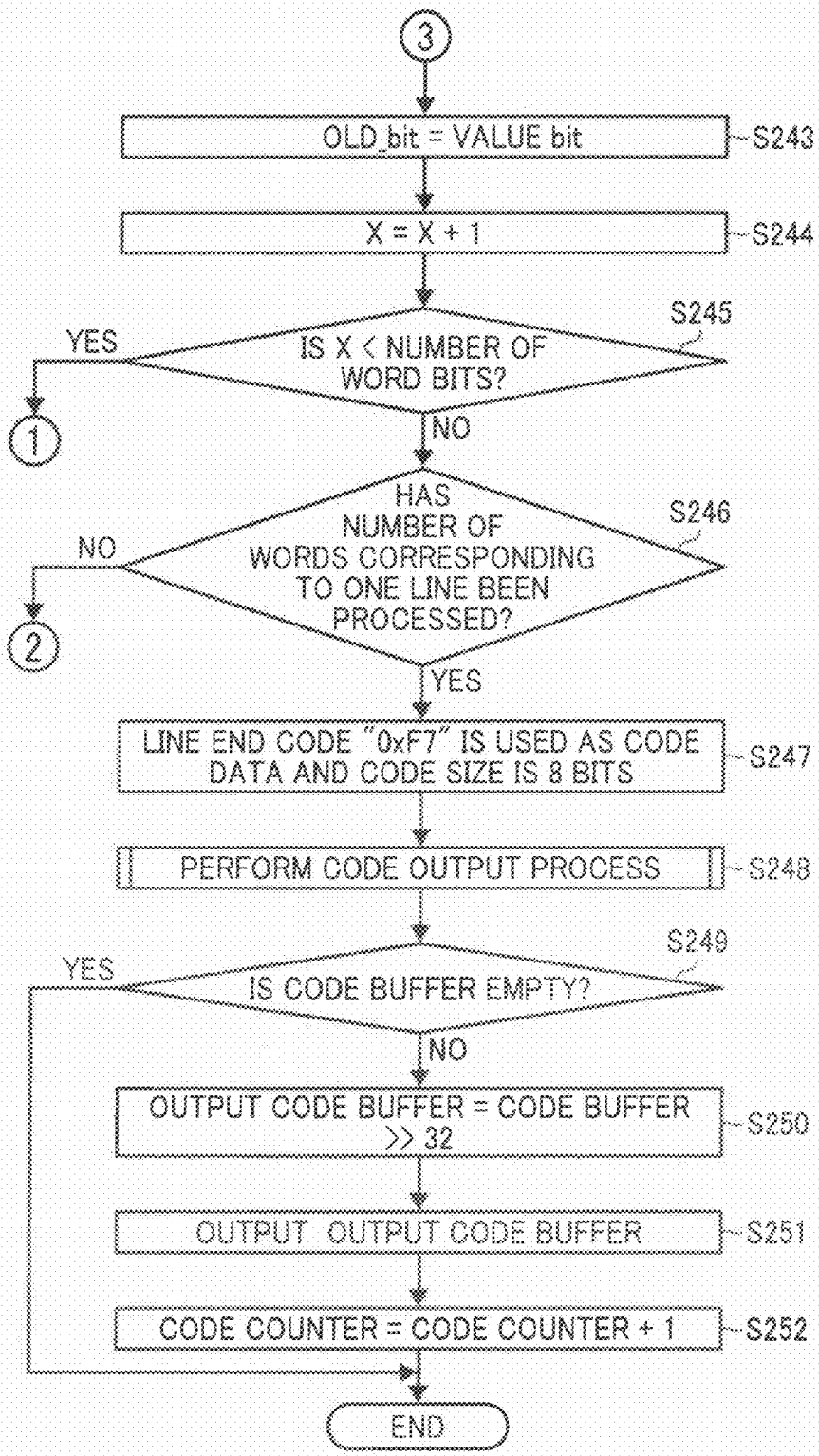

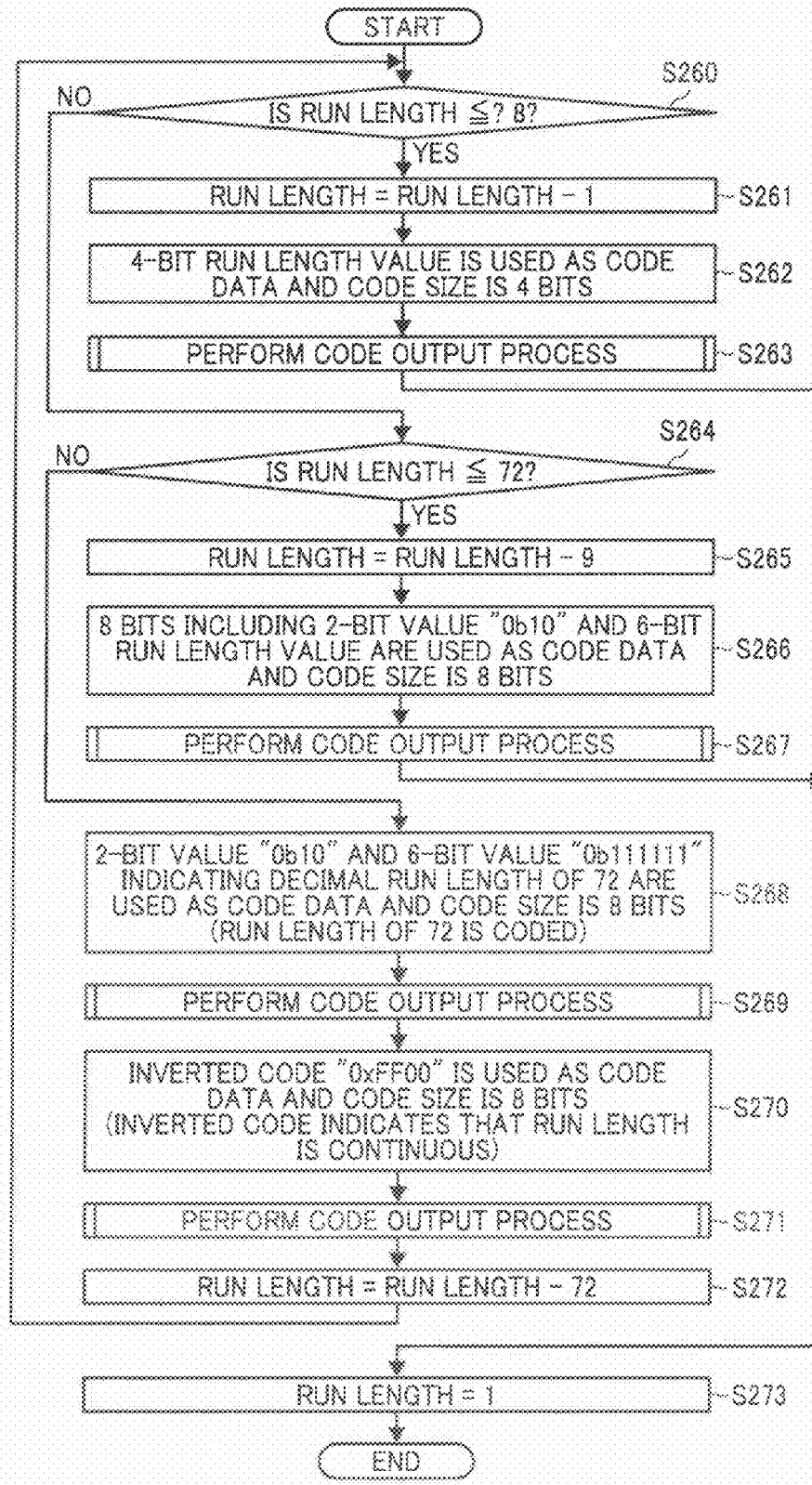

FIG. 56A
CODING PROCESS

| FIRST PAGE | SECOND PAGE | THIRD PAGE | FOURTH PAGE |
|---|---|---|---|
| TRANSMISSION OF IMAGE AND CODE TO CODING DEVICE AMOUNT OF DATA TRANSMITTED THROUGH BUS: 128 MB+128 MB/2 = 192 MB | RECIPROCATION OF IMAGE TO ROTATING DEVICE + TRANSMISSION OF IMAGE AND CODE TO CODING DEVICE AMOUNT OF DATA TRANSMITTED THROUGH BUS: 128 MB × 2+128 MB +128 MB/2 = 448 MB | TRANSMISSION OF IMAGE AND CODE TO CODING DEVICE AMOUNT OF DATA TRANSMITTED THROUGH BUS: 128 MB+128 MB/2 = 192 MB | RECIPROCATION OF IMAGE TO ROTATING DEVICE + TRANSMISSION OF IMAGE AND CODE TO CODING DEVICE AMOUNT OF DATA TRANSMITTED THROUGH BUS: 128 MB × 2+128 MB +128 MB/2 = 448 MB |

TIME AXIS →

FIG. 56B
DECODING PROCESS

| FIRST PAGE | SECOND PAGE | THIRD PAGE | FOURTH PAGE |
|---|---|---|---|
| TRANSMISSION OF CODE TO DECODING DEVICE AMOUNT OF DATA TRANSMITTED THROUGH BUS: 128 MB/2 = 64 MB | TRANSMISSION OF CODE TO DECODING DEVICE AMOUNT OF DATA TRANSMITTED THROUGH BUS: 128 MB/2 = 64 MB | TRANSMISSION OF CODE TO DECODING DEVICE AMOUNT OF DATA TRANSMITTED THROUGH BUS: 128 MB/2 = 64 MB | TRANSMISSION OF CODE TO DECODING DEVICE AMOUNT OF DATA TRANSMITTED THROUGH BUS: 128 MB/2 = 64 MB |

FIG. 56C
AMOUNT OF DATA TRANSMITTED THROUGH BUS FOR EACH PERIOD

192 MB     512 MB     256 MB     512 MB     64 MB

IMAGE PROCESSING APPARATUS, IMAGE PROCESSING METHOD, AND IMAGE FORMING APPARATUS FOR READING CODE DATA ROTATED AT 180 DEGREES

CROSS-REFERENCE TO RELATED APPLICATIONS

The present application claims priority to and incorporates by reference the entire contents of Japanese Patent Application No. 2010-063353 filed in Japan on Mar. 18, 2010.

BACKGROUND OF THE INVENTION

1. Field of the Invention

The present invention relates to an image processing apparatus, an image processing method, and an image forming apparatus suitable to rotate image data 180 degrees and output the image data.

2. Description of the Related Art

An image forming apparatus, such as a printer, temporarily stores image data in a memory. In this case, when the image data is stored in the memory without any change, a high-capacity memory is needed, which results in an increase in cost. In order to solve this problem, the image data is compressed and is then stored in the memory.

For example, a print process of the printer is performed as follows. The printer receives a page description language (PDL) which is created by, for example, a computer through a network and analyzes the PDL to generate an intermediate language that can be executed by a drawing unit. A drawing unit analyzes the intermediate language and draws an image subjected to gradation processing to a band memory. The drawn image data is compressed and coded by a binary image compression coding algorithm, and the generated code data is stored in the memory. Thereafter, during a print operation, the code data is read from the memory while being delayed for each of C, M, Y, and K and the read code data is decoded. Then, the data corresponding to each of C, M, Y, and K is transmitted to the printer engine and is then printed.

In addition, a printer capable of performing printing on both surfaces of a sheet has been known. When performing printing on the rear surface of the sheet, the printer can print image data that is rotated 180 degrees with respect to the original image data on the rear surface reversed to the printed front surface of the sheet.

In the related art, when it is necessary to rotate image data 180 degrees and output the image data in the reverse order, as in double-side printing, code data obtained by compressing and coding the image data is expanded on the memory and then the expanded data is read in the reverse order. Therefore, a memory space with a size more than that of the code data is needed in order to decode the compressed and coded code data and expand the decoded data. In addition, an operation of writing the expanded data to the memory and an operation of reading the data from the memory are needed, resulting in a low processing speed.

In order to solve the above-mentioned problems, for example, Japanese Patent Application Laid-open No. 08-317225 discloses an image data compressing/decompressing device that divides image data corresponding to one page into a plurality of rectangular blocks, compresses each divided block, and manages data. Japanese Patent No. 3437346 discloses a technique that codes image data for every N×N blocks and manages the code length of the coded data for each block. In this way, it is possible to manage a variable-length code and perform a memory access to each block code. Therefore, it is possible to rotate the image data in a 90-degrees unit.

Japanese Patent Application Laid-open No. 2001-197496 discloses a technique that compresses codes for every N×N blocks, calculates a code length for each block, and manages the codes in a block line unit. In this way, it is possible to manage a variable-length code and perform a memory access to each block code. Therefore, it is possible to rotate data in a 90-degrees unit.

Japanese Patent Application Laid-open No. 2007-214802 discloses a technique that individually performs a decoding process of obtaining image data 802 which is rotated 0 degrees with respect to a code 801 obtained by coding image data 800 and a decoding process of obtaining image data 803 which is rotated 180 degrees with respect to the code 801, as shown in FIG. 50, in order to increase the print speed during double-side printing and reduce a memory space used. According to Japanese Patent Application Laid-open No. 2007-214802, as shown in FIG. 51, during coding, the image data 800 is coded in a line unit to generate a code 801'. During decoding, the code 801' is decoded from the last line to create an intermediate image 804 that is reversed in the vertical direction. In addition, the image is reversed in the horizontal direction to obtain the image data 803 that is rotated 180 degrees with respect to the image data 800.

Japanese Patent No. 4131977 discloses a coding method capable of decoding a code in both the forward direction and the reverse direction. In particular, Japanese Patent No. 4131977 is used to compress and code moving picture data. When a code is received by radio waves, such as television broadcast signals, a large loss of codes occurs. For example, when an error occurs due to the damage of codes during the decoding of image data in the forward direction, decoding is performed from the rear side of the code to a portion that is not damaged. In this way, the deterioration of image quality is prevented.

Japanese Patent Application Laid-open No. 2002-200792 discloses a non-stack-type double-side printing method. In the non-stack type, after the front surface is printed, a reversing device reverses the sheet and printing is performed on the rear surface of the sheet having the printed front surface. In this way, double-side printing is achieved.

Japanese Patent No. 2888186 discloses a compression scheme using a predictive coding method that predicts the value of a pixel of interest from peripheral pixels using a prediction expression.

However, in recent years, printers having a structure in which image data is transmitted through an internal bus have been generally used. FIG. 52 shows the structure of an example of a printer 500 according to the related art in which image data is transmitted through an internal bus.

The printer 500 includes a central processing unit (CPU) section provided with a memory controller, an image processing Application Specific Integrated Circuit (ASIC), a panel controller ASIC, a main memory 630, and a ROM 640 storing programs.

The CPU section provided with a memory controller includes a CPU 600, a CPU I/F 601, a memory arbiter (ARB) 602, a memory controller 603, a direct memory access (DMA) controller 604, a bus controller 605, and a communication controller 606. The CPU section provided with a memory controller, the image processing ASIC, and the panel controller ASIC can communicate with one another through a bus 613. The communication controller 606 communicates with, for example, a computer (PC) 650 through a network.

The memory arbiter 602 arbitrates an access between the main memory 630 and each unit of the CPU section provided with a memory controller. The communication controller 606 controls communication through, for example, a network. The bus controller 605 arbitrates connection between each unit and the bus 613. The memory controller 603 controls an access to the main memory 630. The CPU I/F 601 controls communication between the memory arbiter 602 and the CPU 600.

The main memory 630 includes a page description language (PDL) data area 630A, an image data area 630B, a rotated image data area 630C, and a page code data area 630D.

The image processing ASIC includes a bus I/F 607, a coding unit 608, a decoding unit 609, an engine controller 610, and a rotating unit 700. The bus I/F 607 controls communication between the bus 613 and the image processing ASIC. The coding unit 608 compresses and codes image data stored in the image data area 630B of the main memory 630. The decoding unit 609 decodes a page code stored in the page code data area 630D of the main memory 630. The rotating unit 700 rotates the image data 180 degrees. The engine controller 610 controls a printer engine 660.

The panel controller ASIC includes a bus I/F 611 and a panel controller 612. The bus I/F 611 controls communication between the bus 613 and the panel controller ASIC. The panel controller 612 controls an operation panel 621.

Next, the flow of data during a 180-degree rotation process of the printer 500 shown in FIG. 52 will be described with reference to FIGS. 53 and 54. In FIG. 53, PDL data created by the computer 650 is stored in the PDL data area 630A of the main memory 630 through, for example, the memory arbiter 602 along a path A. As shown in a path B, the CPU 600 reads the PDL data from the PDL data area 630A of the main memory 630 through, for example, the memory arbiter 602. The CPU 600 analyzes the PDL data, draws image data, and stores the drawn image data in the image data area 630B of the main memory 630 along a path C.

The image data stored in the image data area 630B is read from the image data area 630B to be subjected to the 180-degree rotation process, and is supplied to the rotating unit 700 through the bus 613 along a path D. The rotating unit 700 rotates the image data 180 degrees. The rotated image data is supplied to the main memory 630 through the bus 613 along a path E and is then stored in the rotated image data area 630C. The rotated image data stored in the rotated image data area 630C is supplied to the coding unit 608 through the bus 613 along a path F. The rotated image data is coded by the coding unit, is supplied to the main memory 630 through the bus 613 along a path G, and is stored in the page code data area 630D.

Then, as shown in FIG. 54, the rotated image data subjected to path coding is read from the page code data area 630D of the main memory 630 and is supplied to the decoding unit 609 through the bus 613 along a path H. Then, the rotated image data is decoded by the decoding unit and is then supplied to the engine controller 610.

However, in Japanese Patent Application Laid-open No. 08-317225 and Japanese Patent No. 3437346, since the image data of one page is managed in a fine block unit, a large memory area for storing the address of each block is needed and the process becomes complicated. In addition, since the original image data is divided into fine blocks, the compression ratio is reduced.

In Japanese Patent Application Laid-open No. 2001-197496, it is necessary to store the addresses in a block line unit and a process of calculating the internal address of the block line code during rotation becomes complicated.

In Japanese Patent Application Laid-open No. 2007-214802, as shown in FIG. 55, the code length of each line is described as a line TAG at the end of line code data. During the 180-degree rotation process, the code length is read from the line TAG to calculate the address of a code at the head of the line. Then, the code of one line is sequentially read from the address and is then decoded. Therefore, a DMA that transmits codes serially reads codes corresponding to one line, and randomly access the addresses of the codes. Therefore, the efficiency of the DMA transmitting the codes is significantly reduced. As a result, the performance of a common bus or the memory access performance of the memory deteriorates.

In Japanese Patent No. 4131977, it is possible to decode the code in the reverse direction, but a code format capable of decoding the code in both the forward direction and the reverse direction is needed, which results in an increase in a code size and a low compression ratio.

The predictive coding method disclosed in Japanese Patent No. 2888186 predicts coding from peripheral pixels using the prediction expression and performs coding. Therefore, basically, it is difficult to decode codes in the reverse direction. This is because the peripheral pixels used for decoding have not been decoded during the decoding of the code in the reverse direction. As such, the image data coded by the predictive coding method can be decoded only in the forward direction in which the image data has been coded.

In the double-side printing system according to the related art shown in FIGS. 52 to 54, as shown in FIGS. 56A to 56C, when even-numbered pages are coded, a large amount of data is transmitted through the bus for a rotation process, and the print speed is reduced. In the example shown in FIGS. 56A to 56C, in the coding process, for the odd-numbered pages (the first page, the third page, and the fifth page), the amounts of data transmitted through the bus 613 are 192 MB, 256 MB, and 64 MB, respectively. For the even-numbered pages (the second page and the fourth page), the amounts of data transmitted through the bus 613 are 512 MB.

SUMMARY OF THE INVENTION

It is an object of the present invention to at least partially solve the problems in the conventional technology.

According to the present invention, there is provided an image processing apparatus including: a first storage unit that stores therein a plurality of code data each of which is formed by arranging an identification code at a head side of line code data obtained by coding image data in a line unit, in order from a first line to a last line of the image data; a first reading unit that reads the code data from the first storage unit; a second storage unit that recognizes the identification code from the code data read by the first reading unit to store therein the code data in a line unit based on the identification code; a second reading unit that reads the code data from the second storage unit; a decoding unit that decodes the code data read by the second reading unit; a third storage unit that stores therein decoded image data obtained by decoding the code data by the decoding unit in a line unit; and a third reading unit that reads the decoded image data stored in the third storage unit in a line unit, wherein, when the image data is rotated 180 degrees and is output, the first reading unit reads the code data from the first storage unit from the last line to the first line and reads each line from an end to a head of the line, the second reading unit reads the code data from the second storage unit from a position of the identification code included in the code data to the end of the line with respect to the code data, and the third reading unit reads the decoded image data from the third storage unit from the end to the head of the line in a pixel unit.

According to another aspect of the present invention, there is provided a method of an image processing including: first reading, by a first reading unit, code data which is formed by arranging an identification code at a head side of line code data obtained by coding image data in a line unit from a first storage unit that stores therein a plurality of the code data in order from a first line to a last line of the image data; second recognizing, by a second storage unit, the identification code from the code data read by the first reading unit to store therein the code data in a line unit based on the identification code; second reading, by a second reading unit, the code data from the second storage unit; decoding, by a decoding unit, the code data read by the second reading; third storing, by a third storage unit, therein decoded image data obtained by decoding the code data by the decoding in a line unit; and third reading, by a third reading unit, the decoded image data stored in the third storage unit in a line unit, wherein, when the image data is rotated 180 degrees and is output, the first reading includes reading the code data from the first storage unit from the last line to the first line and reads each line from an end to a head of the line, the second reading includes reading the code data from the second storage unit from a position of the identification code included in the code data to the end of the line with respect to the code data, and the third reading includes reading the decoded image data from the third storage unit from the end to the head of the line in a pixel unit.

According to still another aspect of the present invention, there is provided an image forming apparatus including: a printing unit capable of performing printing on front and rear surfaces of a sheet; a first storage unit that stores therein a plurality of code data each of which is formed by arranging an identification code at a head side of line code data obtained by coding image data in a line unit, in order from a first line to a last line of the image data; a first reading unit that reads the code data from the first storage unit; a second storage unit that recognizes the identification code from the code data read by the first reading unit to store therein the code data in a line unit based on the identification code; a second reading unit that reads the code data from the second storage unit; a decoding unit that decodes the code data read by the second reading unit; a third storage unit that stores therein decoded image data obtained by decoding the code data by the decoding unit in a line unit; and a third reading unit that reads the decoded image data stored in the third storage unit in a line unit, wherein, when the image data is rotated 180 degrees and is output, the first reading unit reads the code data from the first storage unit from the last line to the first line and reads each line from an end to a head of the line, the second reading unit reads the code data from the second storage unit from a position of the identification code included in the code data to the end of the line with respect to the code data, and the third reading unit reads the decoded image data from the third storage unit from the end to the head of the line in a pixel unit, and wherein the first reading unit, the second reading unit, and the third reading unit perform a reading process for the 0-degree rotation when the printing unit performs printing on the front surface of the sheet and performs a reading process for the 180-degree rotation when the printing unit performs printing on the rear surface of the sheet.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 6A to 6C are diagrams illustrating the entire process according to the first embodiment of the invention;

FIGS. 9A to 9D are diagrams illustrating code formats according to the first embodiment of the invention;

FIG. 19 is a diagram illustrating the search of a dictionary;

FIG. 25 is a diagram illustrating an example of an index code table;

FIG. 34 is a diagram illustrating an example of an inverted index code table;

FIG. 35 is a diagram illustrating an example of accessing the dictionary using an index value and calculating image data;

FIG. 39 is a flowchart illustrating an example of a 0-degree rotation code input process;

FIG. 40 is a flowchart illustrating an example of a line memory output process;

FIG. 45A is a flowchart illustrating an example of a line coding process according to the second embodiment of the invention;

FIG. 45B is a flowchart illustrating an example of the line coding process according to the second embodiment of the invention;

FIG. 46 is a flowchart illustrating an example of a run length coding process;

FIGS. 56A to 56C are diagrams illustrating the related art.

DETAILED DESCRIPTION OF THE PREFERRED EMBODIMENTS

First Embodiment

Figure 1:
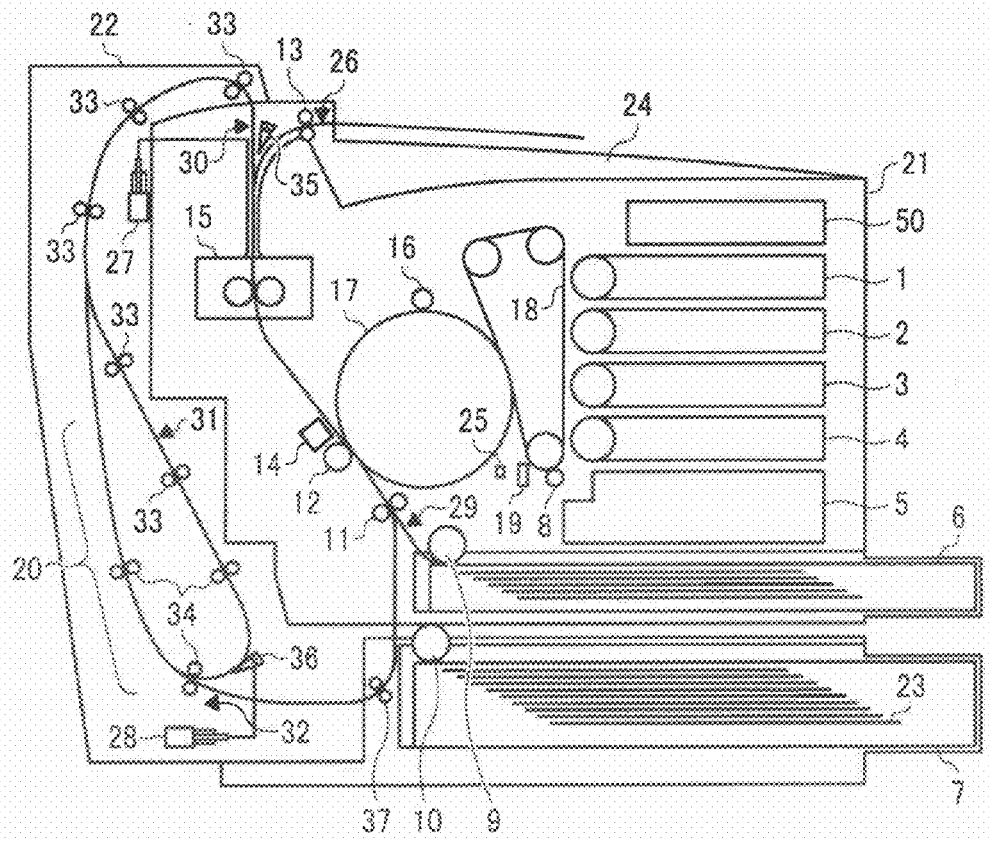
FIG. 1 is a diagram illustrating the structure of an example of an image forming apparatus according to a first embodiment of the invention.

An image forming apparatus according to a first embodiment of the invention will be described in detail with reference to the accompanying drawings. FIG. 1 shows the structure of an example of the image forming apparatus according to the first embodiment of the invention.

An image forming apparatus body 21 includes as main components developing devices 1 to 4, an optical unit 5, a charging device 8, a photosensitive belt 18, a transfer drum 17, a registration roller 11, a transfer roller 12, a neutralization device 14, a fixing device 15, a cleaner 16, a discharge roller 13, feed cassettes 6 and 7, a discharge sensor 26, and a switching device 35. A sheet reversing device 22 includes as main components transport rollers 33, 34, and 37, sheet sensors 30, 31, and 32, a solenoid 27, a solenoid 28, and a switching device 36.

The operation of the image forming apparatus body 21 and the sheet reversing device 22 will be described below. The charging device 8 uniformly charges the photosensitive belt 18 in response to a print start signal from a host (not shown). The optical unit 5 forms a latent image on the photosensitive belt 18 based on print data transmitted from the host. The formed latent image is developed by any one of the developing devices 1 to 4 and colored particles in the developing device are applied onto the photosensitive belt 18.

The photosensitive belt 18 is rotated by a driving source (not shown) and transfers the colored particles on the photosensitive belt 18 onto the transfer drum 17. The photosensitive belt 18 is neutralized by an erase lamp 25 and the colored particles remaining on the photosensitive belt 18 are removed by a cleaner 19. Then, the photosensitive belt 18 is charged again by the charging device 8. In the case of color printing, this process is repeatedly performed while the developing devices are changed.

A visual image is formed on the transfer drum 17 by the colored particles of one color or two or more colors. A sheet 23 is taken out from the feed cassette 6 or the feed cassette 7 by a feed roller 9 or a feed roller 10 in advance or at the time when a predetermined transfer operation ends and then waits at the position where the registration roller 11 is disposed. After a predetermined period of time has elapsed after the detection of the sheet by a sheet sensor 29, the feed roller 9 or the feed roller 10 is stopped.

The sheet that waits at the position of the registration roller 11 starts to be transported again at the time when the position of the visual image formed on the transfer drum 17 is aligned with a transfer position on the sheet, and the visual image is transferred to the sheet at the position of the transfer roller 12. The neutralization device 14 separates the sheet from the transfer drum 17 and the fixing device 15 fixes the colored particles to the sheet. In the case of single-side printing, the switching device 35 is not operated and the sheet is discharged to a discharge tray 24.

In the case of double-side printing, the solenoid 27 is operated and the switching device 35 is moved to the right side of FIG. 1 to guide the sheet into a sheet reversing unit 20. The transport roller 33 transports the sheet to the sheet reversing unit 20 disposed below the reversing device. The sheet reversing unit 20 transports the sheet to the left side of FIG. 1 by a predetermined amount of movement and operates the solenoid 28 to move the switching device 36 to the upper side of FIG. 1. Then, the transport roller 34 is rotated backward to transport the rear end of the sheet to the front side of the transport roller 37, which is provided in the vicinity of a feed port of the image forming apparatus body, in the depth direction.

Then, the transport roller 34 is rotated at appropriate timing to transport the sheet to the transport roller 37, and the transport roller 37 transmits the sheet to the position of the registration roller 11 and waits for the next operation. Then, transfer, separation, and fixation are performed by the same process as that in the single-side printing, and the sheet is discharged to the discharge tray 24 without operating the switching device 35. In this way, the double-side printing operation ends. In addition, an electric and electronic equipment control unit 50 controls the overall operation of the image forming apparatus.

Figure 2:
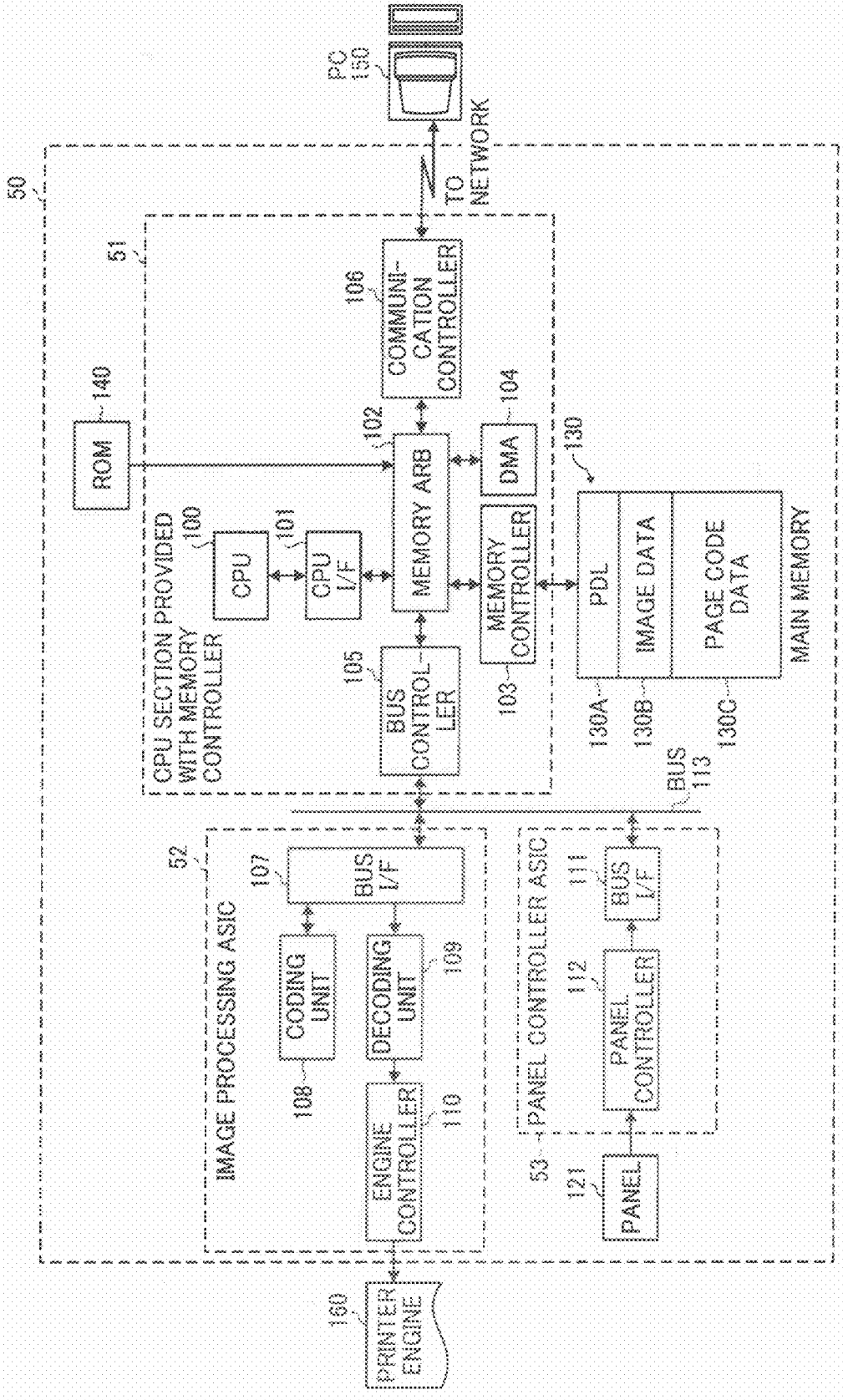
FIG. 2 is a block diagram illustrating the structure of an example of an electric and electronic equipment control unit.

FIG. 2 shows the structure of an example of the electric and electronic equipment control unit 50. The electric and electronic equipment control unit 50 includes a central processing unit (CPU) section 51 provided with a memory controller, an image processing Application Specific Integrated Circuit (ASIC) 52, a panel controller ASIC 53, a main memory 130, and a ROM 140 that stores programs. The CPU section 51 provided with the memory controller, the image processing ASIC 52, and the panel controller ASIC 53 can communicate with one another through a bus 113.

The CPU section 51 provided with the memory controller includes a CPU 100, a CPU I/F 101, a memory arbiter (ARB) 102, a memory controller 103, a direct memory access (DMA) controller 104, a bus controller 105, and a communication controller 106. The CPU 100 controls the overall operation of the image forming apparatus and analyzes PDL data that has been created by a computer (PC) 150 and then transmitted through a network to form a band data image, according to the programs stored in the ROM 140. The formed band data image is stored in an image data area 130B of the main memory 130.

The memory arbiter 102 arbitrates an access between the main memory 130 and each unit of the CPU section provided with the memory controller. The communication controller 106 controls communication through, for example, a network. The bus controller 105 arbitrates connection between the bus 113 and each unit. The memory controller 103 controls an access to the main memory 130. The CPU I/F 101 controls the communication between the memory arbiter 102 and the CPU 100.

The main memory 130 includes a page description language (PDL) data area 130A, an image data area 130B, and a page code data area 130C.

The image processing ASIC 52 includes a bus I/F 107, a coding unit 108, a decoding unit 109, and an engine controller 110. The bus I/F 107 controls the communication between the bus 113 and the image processing ASIC 52. The coding unit 108 performs compression coding on the image data stored in the image data area 130B of the main memory 130. Page code data obtained by performing compression coding on the image data is stored in the page code data area 130C of the main memory 130. The decoding unit 109 decodes the page code data read from the page code data area 130C of the main memory 130 and supplies the decoded data to the engine controller 110. The engine controller 110 controls a printer engine 160.

As shown in FIG. 1, the printer engine 160 performs non-stack-type double-side printing. The non-stack type performs printing on the front surface of a sheet, turns over the sheet using a reversing mechanism, and performs printing on the rear surface of the sheet having the printed front surface, thereby achieving double-side printing. Therefore, during double-side printing, the electric and electronic equipment control unit 50 alternately transmits image data for the front surface and image data for the rear surface to the printer engine 160. During the printing of the rear surface, the electric and electronic equipment control unit 50 transmits image data that is rotated 180 degrees with respect to the front surface of the sheet to the printer engine 160. This is because the reversing mechanism turns over the sheet.

The panel controller ASIC 53 includes a bus I/F 111 and a panel controller 112. The bus I/F 111 controls the communication between the bus 113 and the panel controller ASIC. The panel controller 112 controls an operation panel 121. The operation panel 121 is provided with a display unit and various kinds of operators, shows the state of the image forming apparatus to the user, and receives an operation instruction from the user.

Figure 3:
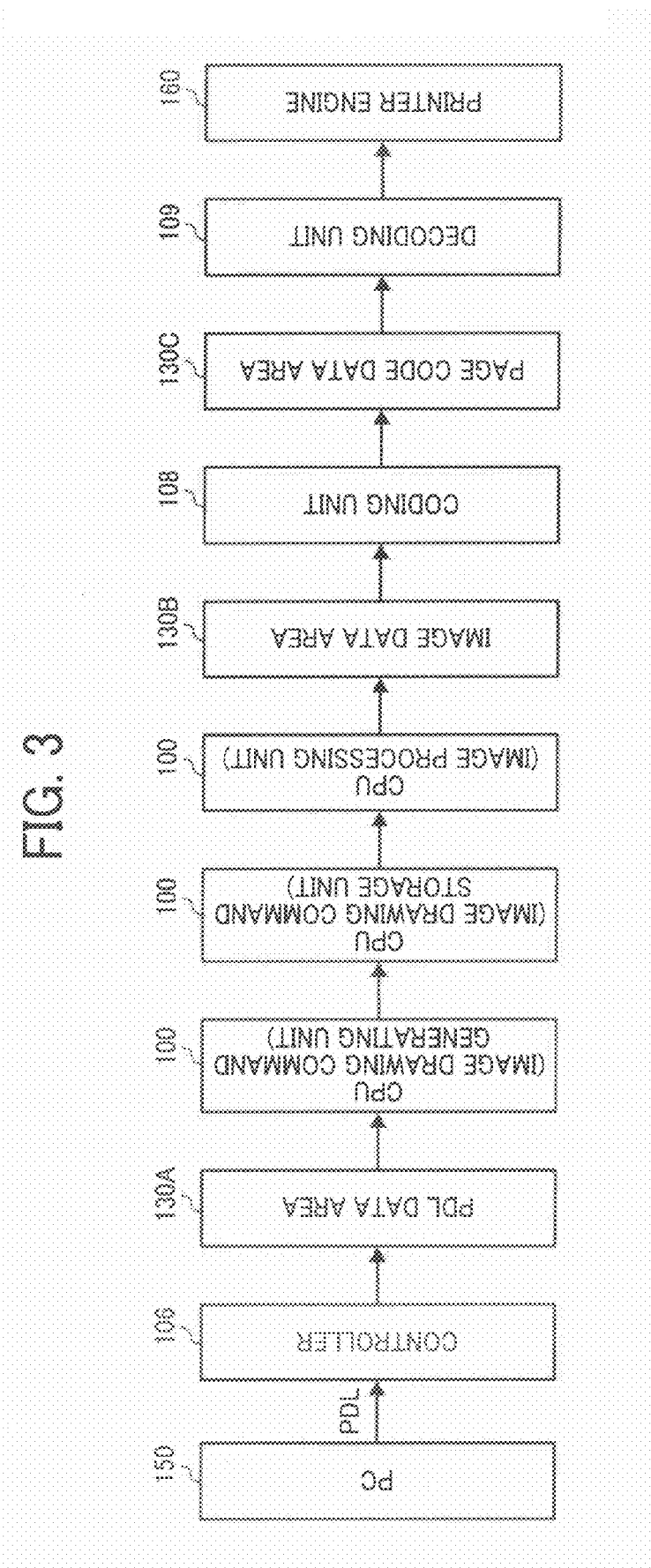
FIG. 3 is a diagram illustrating the overall flow of a process.

FIG. 3 shows the overall flow of a process. The CPU 100 forms a drawing command generating unit and a drawing processing unit according to a program. The computer 150 generates print data (PDL data) and the communication controller 106 receives the PDL data transmitted from the computer 150. The PDL data is stored in the PDL data area 130A of the main memory 130. In the CPU 100, the drawing command generating unit analyzes the PDL data stored in the PDL data area 130A and generates a drawing command. The drawing command is stored in, for example, the PDL data area 130A of the main memory 130.

The drawing unit of the CPU 100 receives the drawing command from the PDL data area 130A of the main memory 130 and draws image data (band data) to the image data area 130B of the main memory 130.

The band data stored in the image data area 130B of the main memory 130 is coded into code data for each band by the coding unit 108 and the code data is stored in the page code data area 130C of the main memory 130. The decoding unit 109 reads the code data for each band corresponding to one page from the page code data area 130C, decodes the read code data, and supplies the decoded data to the printer engine 160. The printer engine 160 performs printing based on the data supplied from the decoding unit 109.

Figure 4:
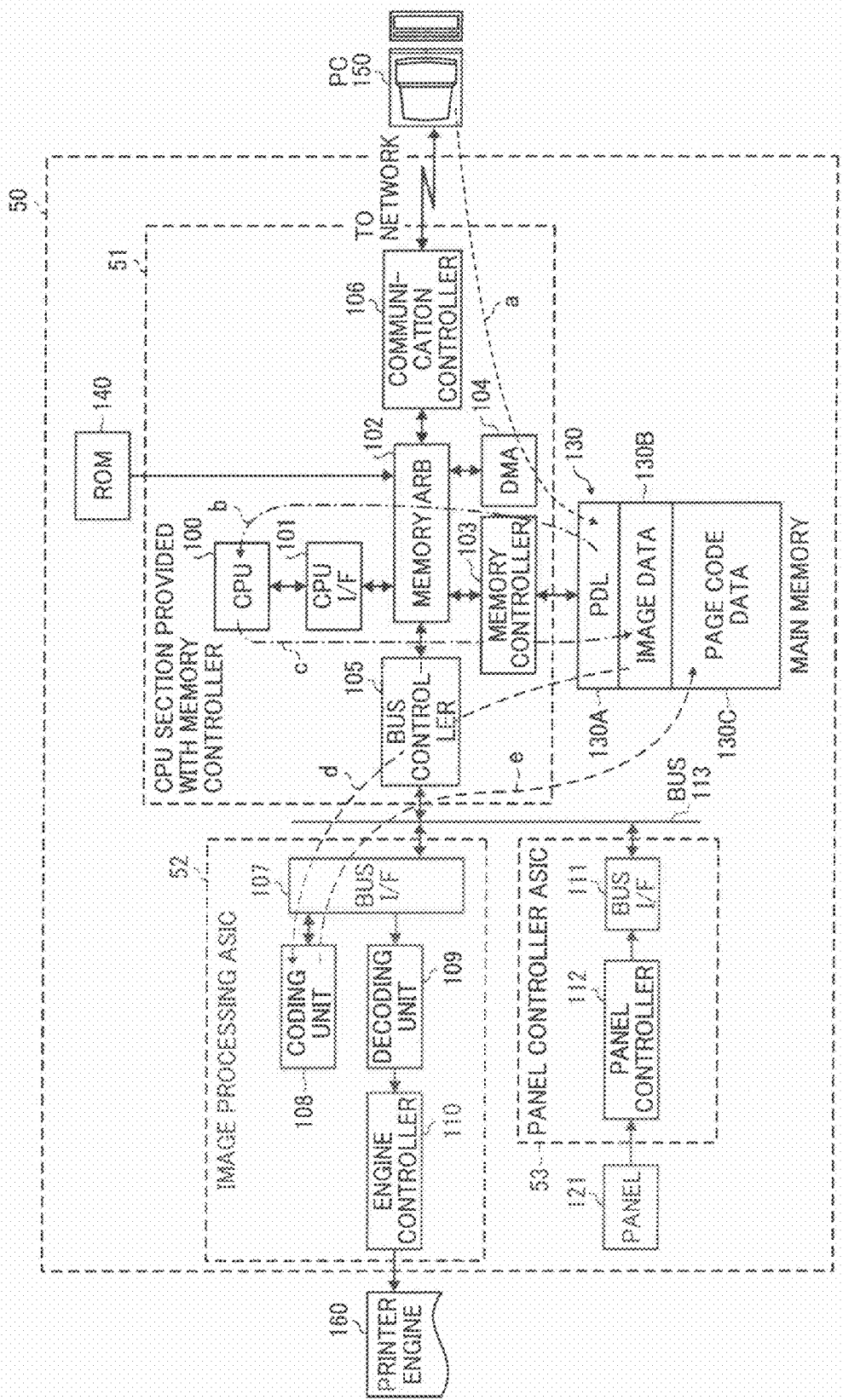
FIG. 4 is a diagram illustrating the flow of data during coding.

FIG. 4 shows the flow of data during coding. The PDL data created by the computer 150 is supplied to the image forming apparatus through the network and is then stored in the PDL data area 130A of the main memory 130 through the memory arbiter 102 along a path a. The CPU 100 reads the PDL data from the PDL data area 130A along a path b, analyzes the read PDL data, and draws image data to the image data area 130B of the main memory 130 along a path c.

The coding unit 108 reads the image data from the image data area 130B of the main memory 130 through the bus 113 along a path d and codes the image data. Page code data corresponding to one page obtained by coding the image data is stored in the page code data area 130C of the main memory 130 through the bus 113 along a path e.

Figure 5:
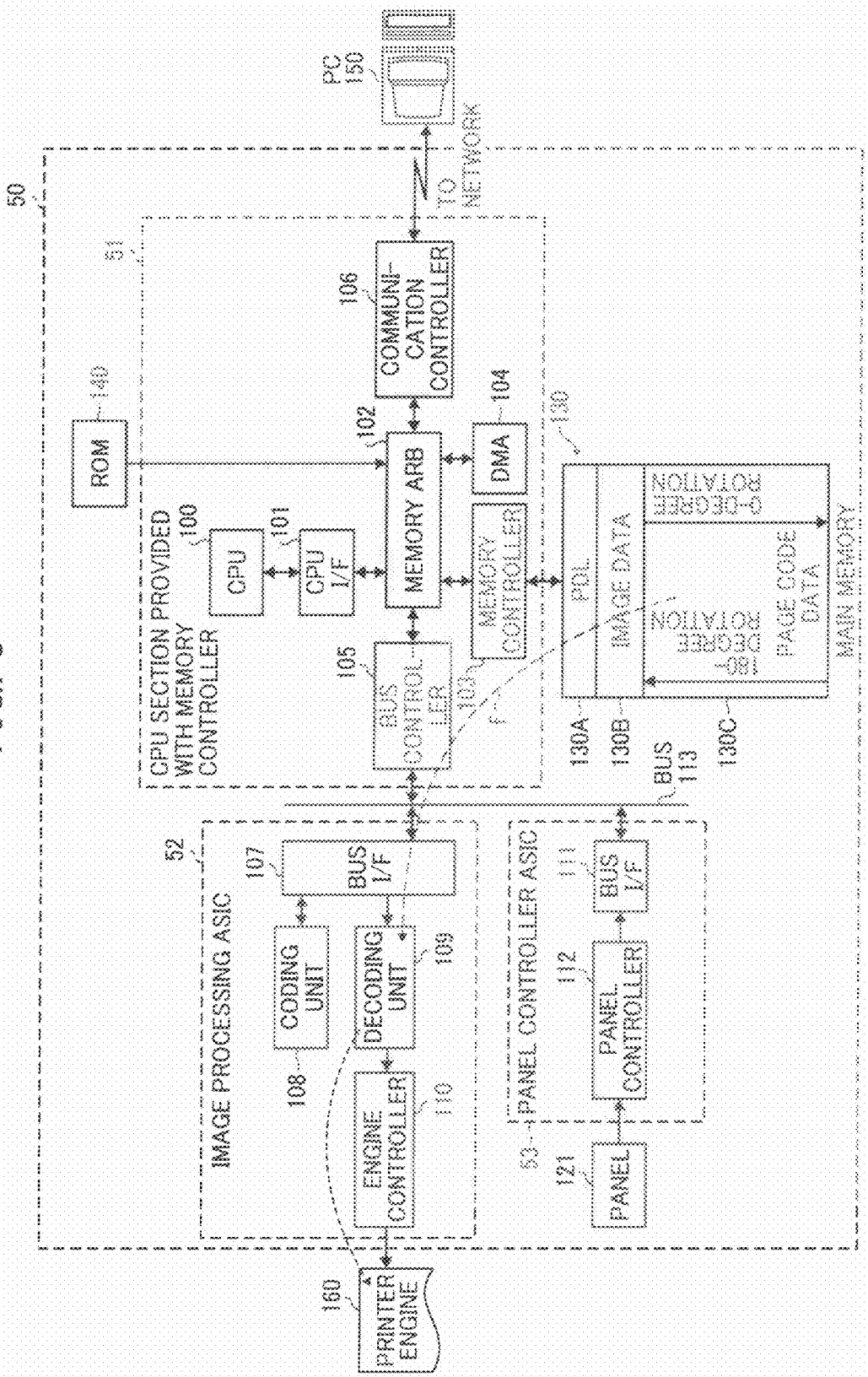
FIG. 5 is a diagram illustrating the flow of data during decoding.

FIG. 5 shows the flow of data during decoding. The decoding unit 109 reads the page code data from the page code data area 130C of the main memory 130 along a path f, decodes the read page code data, and transmits the decoded data to the engine controller 110. For 0-degree rotation decoding, the decoding unit 109 reads the code data from the head of the code data and decodes the read code data. For 180-degree rotation decoding, the decoding unit 109 reads the code data from the end of the code data to the head of the code data and decodes the read code data.

The engine controller 110 receives the decoded image data from the decoding unit 109 and transmits the decoded image data to the printer engine 160.

FIGS. 6A to 6C show all of the processes according to the first embodiment. FIG. 6A shows a coding process, FIG. 6B shows a decoding process, and FIG. 6C shows the amount of data transmitted through the bus 113 in each process. As described above, a 180-degree rotation process is performed by changing the direction in which the page code data is read from the page code data area 130C of the main memory 130. A process of coding even-numbered pages required for the rotation process is reduced. Specifically, the amount of data transmitted through the bus 113 does not increase when a process of coding the second page overlaps a process of decoding the first page and when a process of coding the fourth page overlaps a process of decoding the third page.

In the example shown in FIG. 6C, in the process of coding odd-numbered pages (the first page, the third page, and the fifth page), the amounts of data transmitted through the bus 113 are 192 MB, 256 MB, and 64 MB, respectively. On the other hand, in the process of coding even-numbered pages (the second page and the fourth page), the amount of data transmitted through the bus 113 is 256 MB. The amount of data transmitted through the bus 113 in the process of coding the even-numbered pages is half that in the example according to the related art shown in FIG. 56C.

Figure 7:
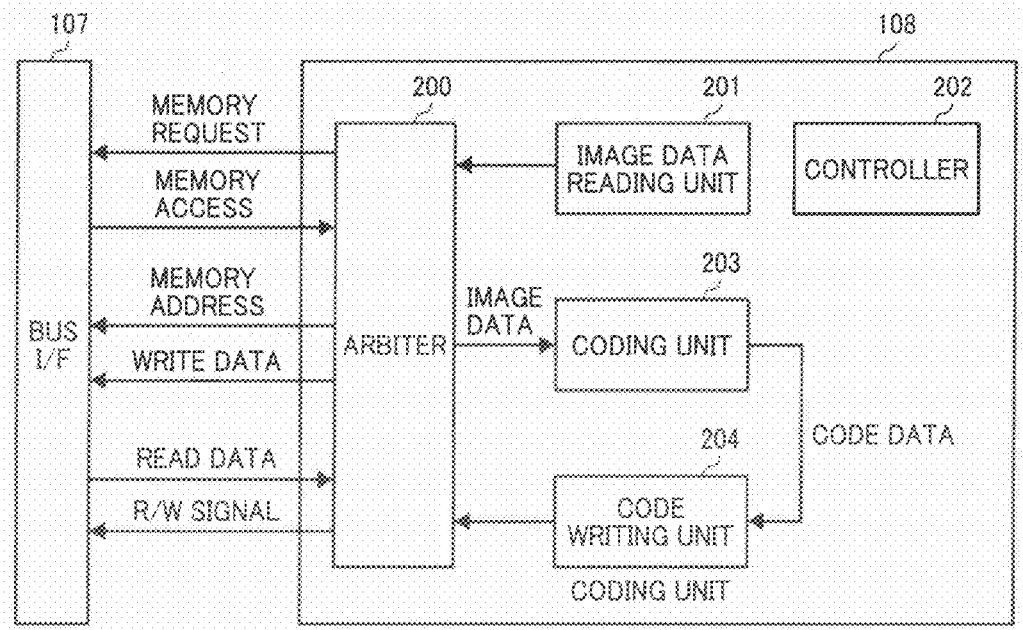
FIG. 7 is a block diagram illustrating the structure of an example of a coding unit.

FIG. 7 shows the structure of an example of the coding unit 108. A controller 202 controls the coding unit 108. An arbiter 200 is connected to the bus I/F 107 and arbitrates the reading of image data and the writing of codes. An image data reading unit 201 reads image data for each line from the image data area 130B of the main memory 130 through the arbiter 200 and transmits the read image data to a coding unit 203. The coding unit 203 codes the image data and transmits code data to a code writing unit 204. The code writing unit 204 receives the code data from the coding unit 203 and writes the code data to the page code data area 130C of the main memory 130 through the arbiter 200.

Figure 8:
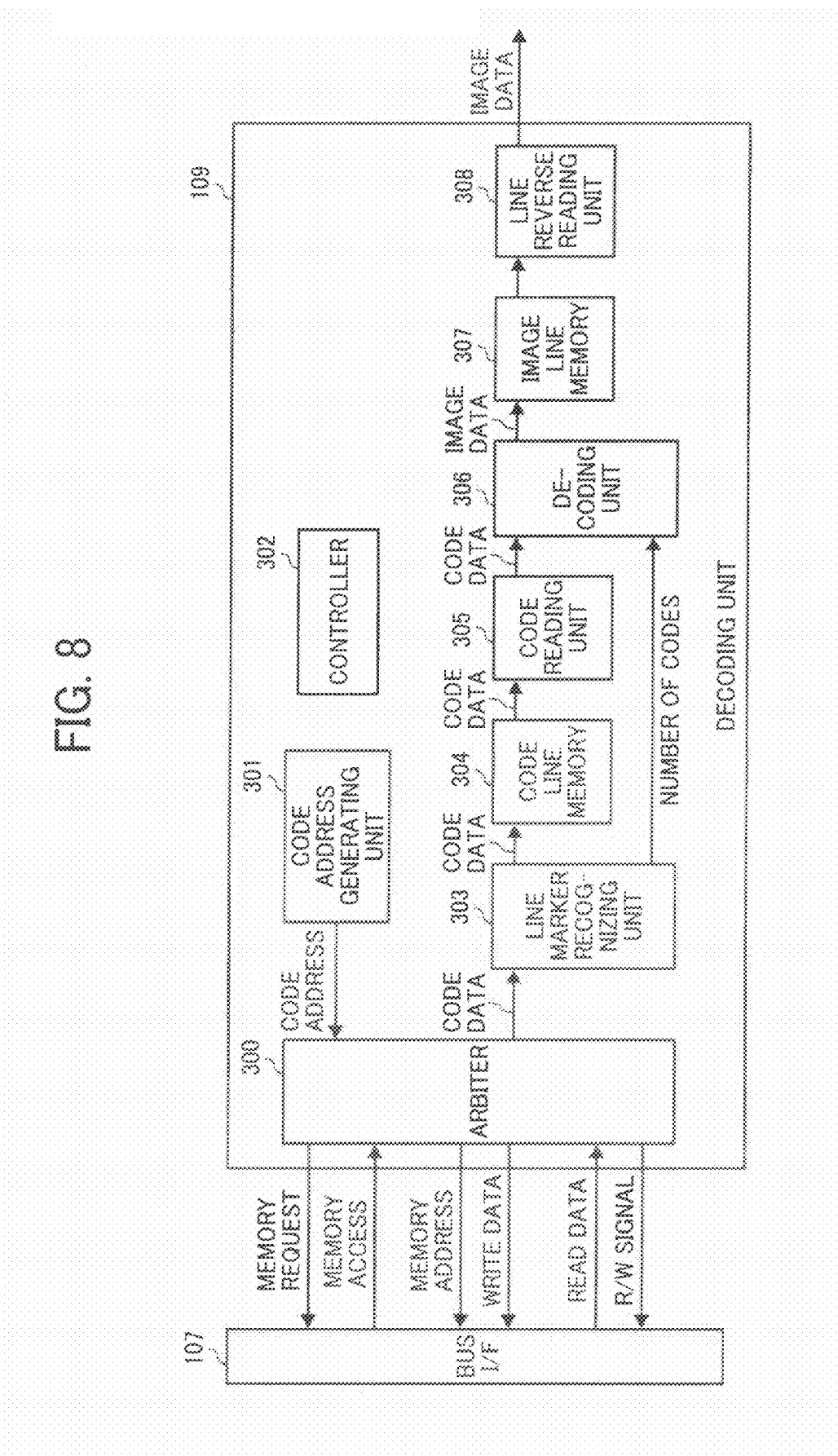
FIG. 8 is a block diagram illustrating the structure of an example of a decoding unit.

FIG. 8 shows the structure of an example of the decoding unit 109. A controller 302 controls the decoding unit 109. An arbiter 300 is connected to the bus I/F 107 and arbitrates the reading of code data. A code address generating unit 301 generates the address of a page code memory for reading the page code data from the page code data area 130C of the main memory 130 through the arbiter 300. As shown in FIG. 5, during 0-degree rotation decoding, the addresses from the start address to the end of the code data are sequentially generated. During 180-degree rotation decoding, the addresses from the end address of the code data to the start address of the code data are sequentially generated in the reverse direction.

A line marker recognizing unit 303 receives the code data from the arbiter 300 during 180-degree rotation decoding, compares a line marker shown in FIG. 9C in the code formats shown in FIGS. 9A to 9D with the most significant 20 bits of the word of the code data, and sequentially writes the word to a code line memory 304 when the line marker is not identical to the bits. On the other hand, when the line marker is identical to the bits, the line marker recognizing unit 303 writes the word to the code line memory 304, and notifies the number of written codes corresponding to one line to a decoding unit 306 such that the decoding unit 306 decodes the code data stored in the code line memory 304. The code formats shown in FIGS. 9A to 9D will be described in detail below.

FIGS. 10A to 10D show the relationship between the code data and the code line memory 304 during 180-degree rotation decoding. The code line memory 304 may store code data corresponding to plural lines. FIGS. 10A to 10D show the code line memory 304 that is divided in a unit of one word (32 bits), which is an access unit.

For example, in FIGS. 10A to 10D and FIGS. 11A to 11D, the term "0 of the first line" indicates the count value of a line memory counter. That is, the term "0 of the first line" indicates the order in which each word is written or read to or from the line memory when one line is divided in a word unit and is then stored in the line memory. That is, the term "0 of the first line" indicates a zero-th position when the first line is divided in a word unit, that is, the position in which the word is first written or read.

Figure 10A:
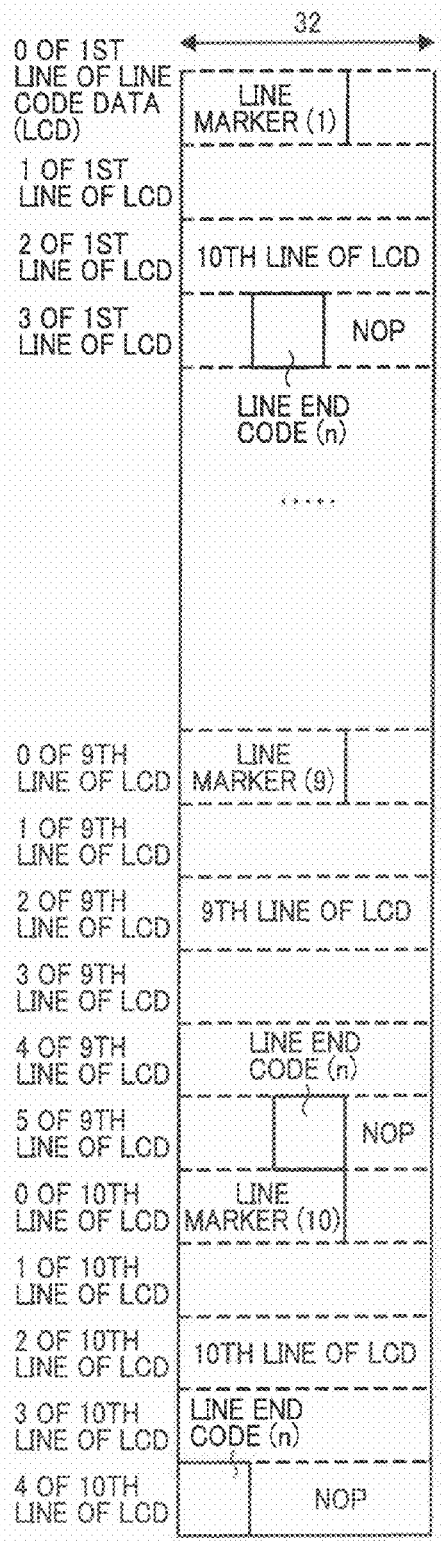
FIGS. 10A to 10D are diagrams illustrating the relationship between code data and a code line memory during 180-degree rotation decoding.

FIG. 10A shows an example of the structure of code data. Line code data is arranged for one word from the first line. A line marker is arranged at the head of each line, and a line end code is arranged at the end of each line. When there is a space on the rear side of the line end code for one word, for example, a predetermined bit is inserted as NOP into the space.

Figure 10B:
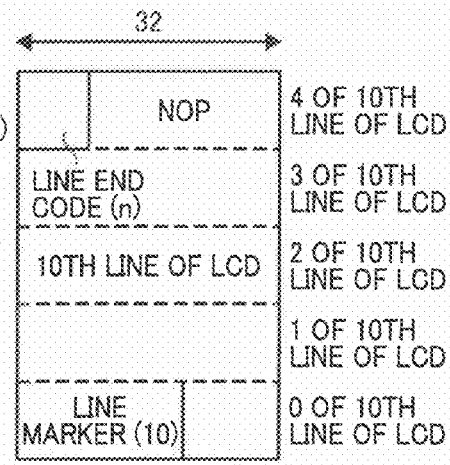
Figure 10C:
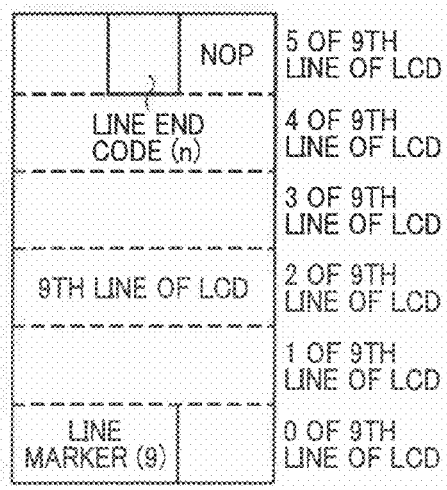
Figure 10D:
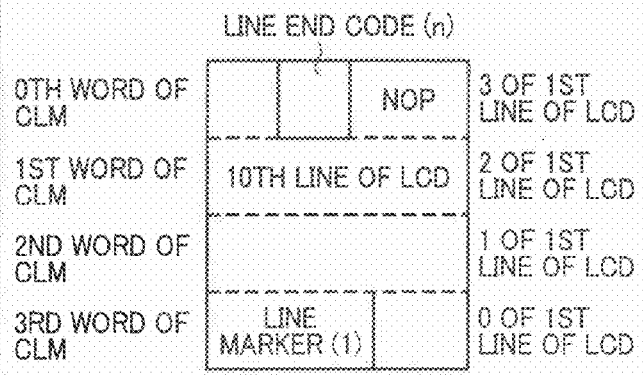

For the content of the code line memory 304 during the decoding of the first line, the code data is sequentially stored from the code data of the fourth word of the tenth line which is the lowermost code data in FIG. 10A to the code of the zero-th word of the tenth line. In FIGS. 10B to 10D, the left side indicates the address of the memory and the right side indicates the order of the stored data. As such, the code data corresponding to one line is stored in the reverse order. The decoding unit 306 reads the code data in the reverse order of the fourth word, the third word, the second word, the first word, and the zero-th word from the end of the code line memory 304, thereby accurately decoding one line.

Similarly, as shown in FIG. 10O, for the content of the code line memory 304 during the decoding of the second line, the code data is sequentially stored from the code data of the fifth word of the ninth line to the code data of the zero-th word of the ninth line. Similarly, the content of the code line memory 304 during the decoding of the tenth line is as shown in FIG. 10D.

As such, since the code data is a variable-length code, the number of words in each line is different. Since the code line memory 304 is provided, the decoding unit 109 can sequentially receive the codes from the end to the head of the page code data read from the page code data area 130C of the main memory 130. In this way, the access efficiency of the main memory 130 is improved and it is possible to increase the transmission rate of the main memory 130. In addition, it is possible to improve the transmission efficiency of DMA through the bus 113.

During 0-degree rotation decoding, the code data is received from the arbiter 300 and the code data is sequentially written to the code line memory 304 until the line end code of the code format shown in FIG. 9D is found.

Figure 11A:
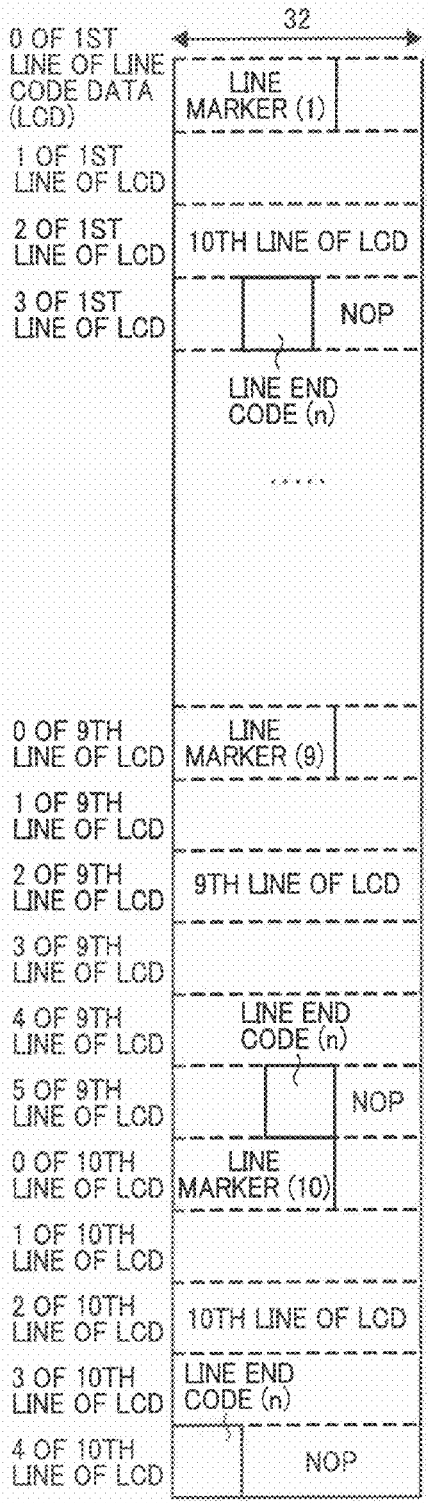
FIGS. 11A to 11D are diagrams illustrating the relationship between the code data and the code line memory during 0-degree rotation decoding.
Figure 11B:
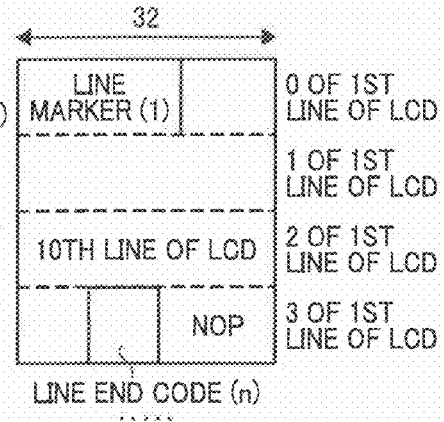
Figure 11C:
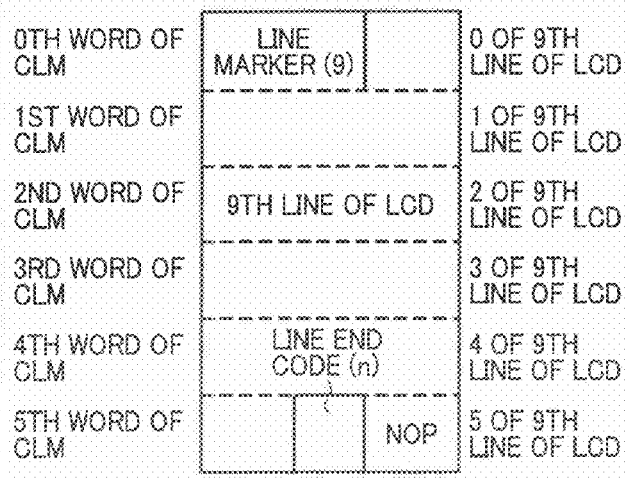
Figure 11D:
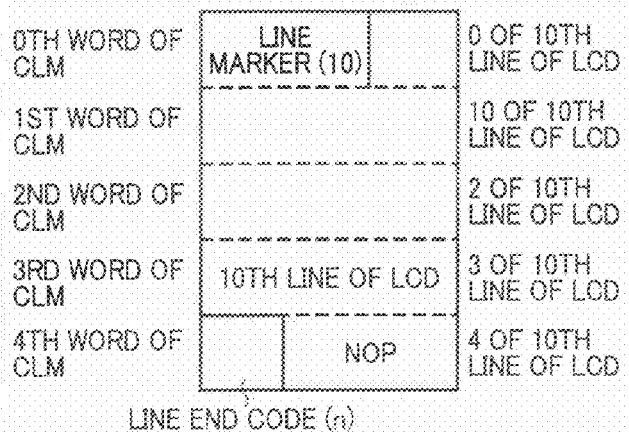

FIGS. 11A to 11D show the relationship between the code data and the code line memory 304 during 0-degree rotation decoding. The content of the code data shown in FIG. 11A is the same as that shown in FIG. 10A. For the content of the code line memory 304 during the decoding of the first line, the code data is sequentially stored from the code data of the zero-th word of the first line which is the lowermost code data in FIG. 11A to the code data of the third word of the first line. As such, the code data corresponding to one line is sequentially stored. In FIGS. 11B to 11D, the left side indicates the address of the memory and the right side indicates the order of the stored data. FIG. 11C shows the ninth line, and FIG. 11D shows the tenth line. The decoding unit 306 sequentially reads the code data in the order of the zero-th word, the first word, the second word, and the third word from the end of the code line memory 304, thereby accurately decoding one line.

As described with reference to FIGS. 10A to 10D, during 180-degree rotation decoding, a code reading unit 305 reads the code data stored in the code line memory 304 in the reverse order and transmits the read code data to the decoding unit 306. As described with reference to FIGS. 11A to 11D, during 0-degree rotation decoding, the code reading unit 305 sequentially reads the code data stored in the code line memory 304 and transmits the read code data to the decoding unit 306. The decoding unit sequentially decodes the code data read from the code line memory 304 and transmits the decoded data to an image line memory 307.

During 180-degree rotation decoding, a line reverse reading unit 308 reads the image data stored in the image line memory 307 from the rear end to the head of the line and transmits the read image data to the engine controller 110. During 0-degree rotation decoding, the line reverse reading unit 308 reads the image data stored in the image line memory 307 in the forward direction and transmits the read image data to the engine controller 110.

<Structure Using MTF Coding Method>

Figure 12:
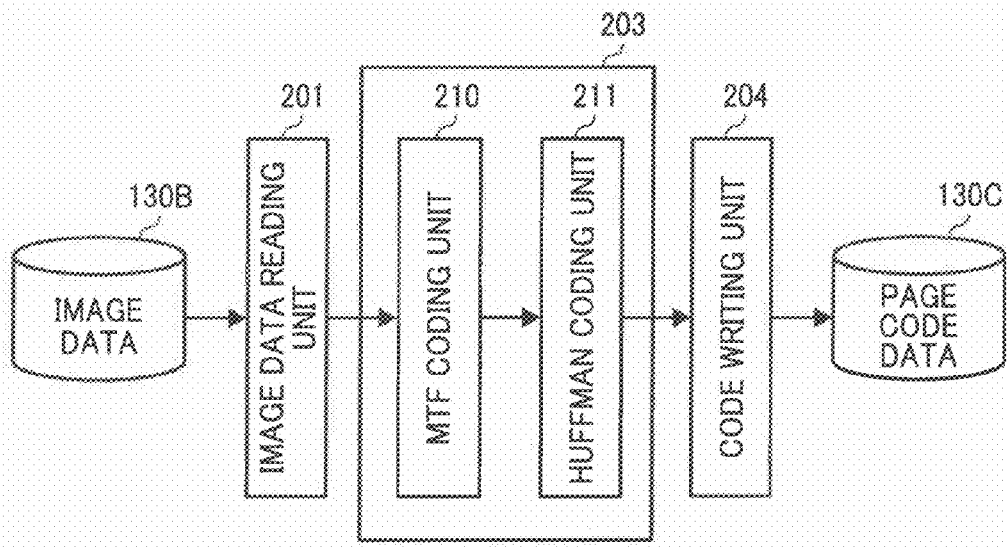
FIG. 12 is a block diagram illustrating the structure of an example of the coding unit.

FIG. 12 shows the structure of an example of the coding unit 203. In the first embodiment, image data is coded by a move to front (MTF) coding method. As disclosed in Japanese Patent No. 4000266, the MTF coding method performs MTF control on a small dynamic dictionary to code an index value matched with the dictionary. In the MTF coding method, it is considered that the character which has appeared in the previous stage among the previously output characters has the highest probability of appearing in the current stage.

The MTF coding method is performed as follows. A list of all input values is provided, and an input value is compared with the values in the list. A code is generated using the position of the list where there is a value identical to the input value as a symbol. Then, the value compared with the input value is deleted from the list and the input value is arranged at the head of the list.

For example, an example of a character string created by five characters "a," "b," "d," "o," and "Y" will be described. First, a list R={a, b, d, o, Y} of the five characters is made and symbols 0, 1, 2, 3, and 4 are given to the characters. Then, a process of examining each character of an input character string (for example, {Ydbbaaaadoo}), outputting a corresponding symbol of the list, and moving the character to the heat of the list is repeatedly performed until all characters of the input character string are output. Finally, an output string {4, 3, 3, 0, 3, 0, 0, 2, 4, 0} is obtained.

The image data reading unit 201 reads image data from the image data area 130B of the main memory 130 and transmits the read image data to an MTF coding unit 210. In this embodiment, the MTF coding unit 210 has a dictionary that stores 32 data items, and compares the data read from the image data reading unit 201 with the data in the dictionary using an MTF process. When the read data is identical to the data in the dictionary, the MTF coding unit 210 transmits the index value identical to the data to a Huffman coding unit 211. When the read data is not identical to the data in the dictionary, the MTF coding unit 210 transmits the read data as escape (ESC) data to the Huffman coding unit 211.

The Huffman coding unit 211 performs a Huffman coding process on the index value or the ESC data transmitted from the MTF coding unit 210 and transmits the processed value or data to the code writing unit 204. The code writing unit 204 transmits the code data received from the Huffman coding unit 211 to the outside. The transmitted code data is stored in the page code data area 130C of the main memory 130.

Figure 13:
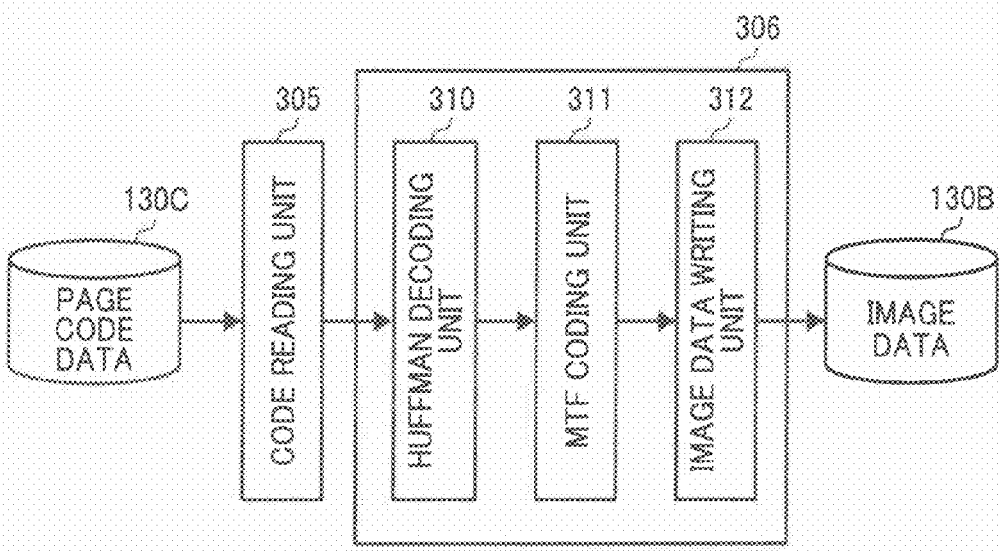
FIG. 13 is a block diagram illustrating the structure of an example of the decoding unit.

FIG. 13 shows the structure of an example of the decoding unit 306. The code reading unit 305 reads code data from the page code data area 130C of the main memory 130 and transmits the read code data to a Huffman decoding unit 310. The Huffman decoding unit 310 decodes a Huffman code of the code data transmitted from the code reading unit and transmits the decoded Huffman code to an MTF decoding unit 311.

In this embodiment, the MTF decoding unit 311 has a dictionary that stores 32 data items. When the code data transmitted from the Huffman decoding unit 310 is an index value, the MTF decoding unit 311 reads the dictionary using the decoded index value, calculates image data using an MTF process, and transmits the image data to an image data writing unit 312. When the code data transmitted from the Huffman decoding unit 310 is ESC data, the MTF decoding unit 311 directly transmits the ESC data to the image data writing unit 312. The image data writing unit 312 transmits the image data transmitted from the MTF decoding unit 311 to the outside. The transmitted image data is stored in the image data area 130B of the main memory 130.

<Coding Process>

Figure 14:
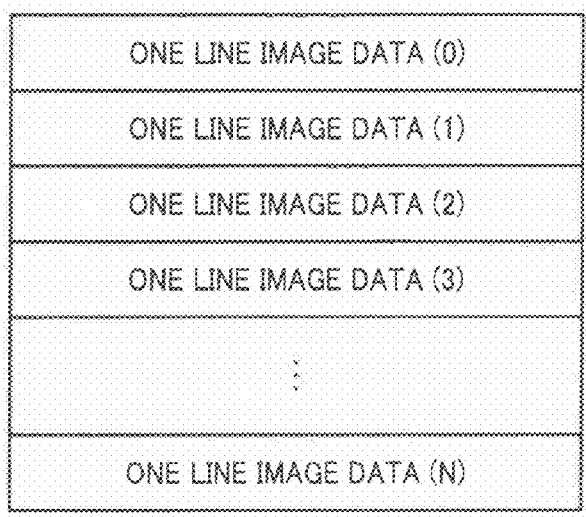
FIG. 14 is a diagram illustrating an example of image data to be coded.
Figure 15:
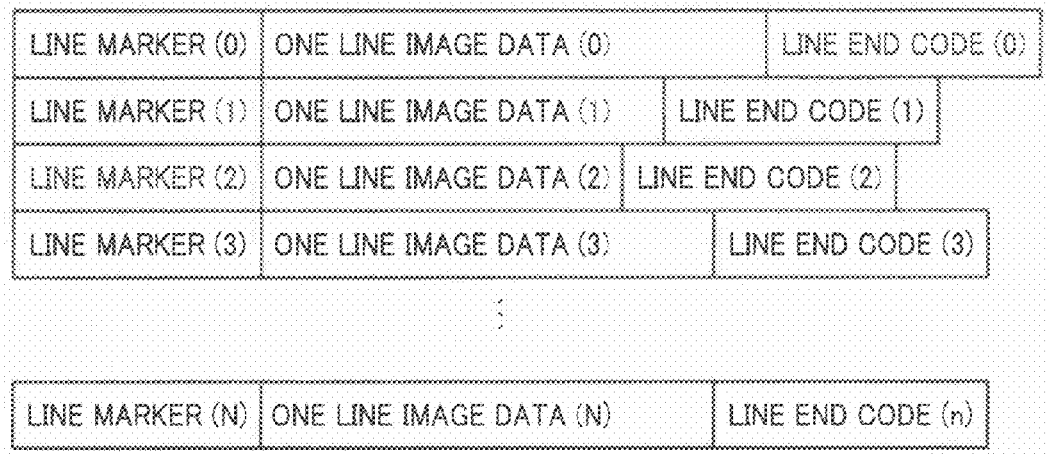
FIG. 15 is a diagram illustrating an example of the code data coded by a coding method according to the first embodiment of the invention.

Next, the coding process according to the first embodiment will be described in detail. FIG. 14 shows an example of the image data to be coded. As shown in FIG. 14, image data for each line is coded. FIG. 15 shows an example of the code data obtained by coding the image data shown in FIG. 14. As shown in FIG. 15, the code data is coded in a line unit. A line marker is arranged at the head of each line, line code data is arranged following the line marker, and a line end code is arranged at the end of the line.

The code formats according to the first embodiment will be described with reference to FIGS. 9A to 9D. FIG. 9C shows a line marker, which is an identification code for identifying the head of the line. The line marker has a code length of 20 bits in which twenty binary values of "1" are consecutive. In FIG. 9C, the line marker is represented in hexadecimal notation. The bit arrangement of the line marker has a pattern that is not identical to any combination of other codes. The line marker has a pattern which is not generated by any combination of codes other than the line marker included in the code data In this way, even when the codes are decoded from the head, it is possible to easily detect the line marker from the codes.

Figure 16:
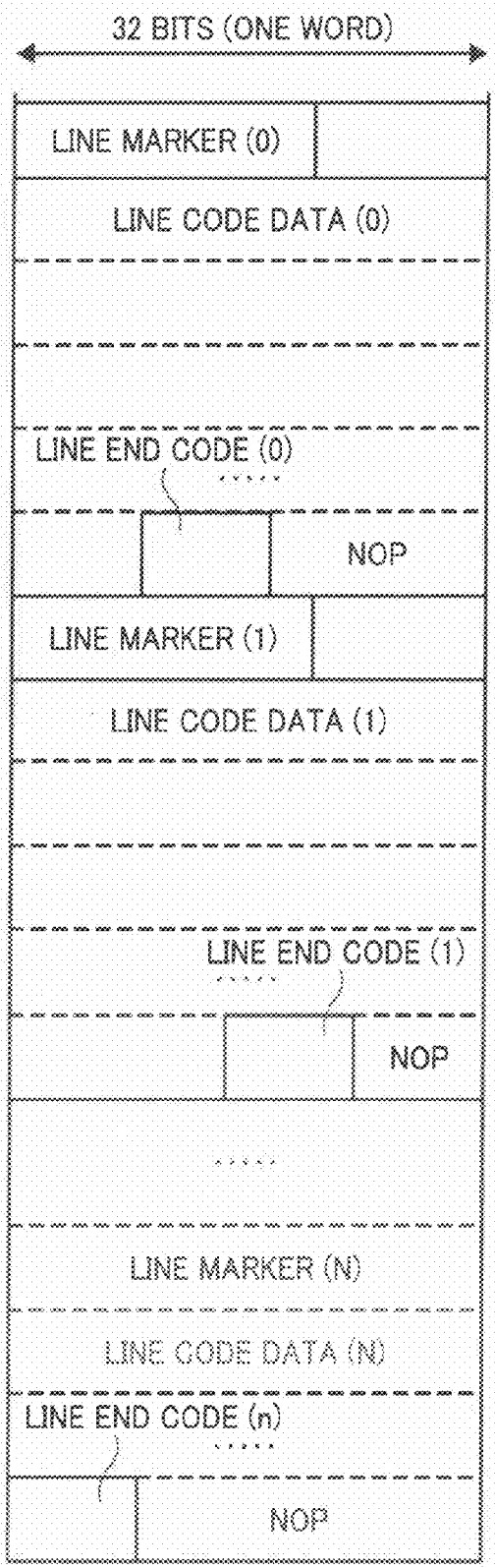
FIG. 16 is a diagram illustrating an example of line code data.

As in the example of the line code data shown in FIG. 16, the codes for each line are divided in a word unit in order to facilitate the detection of the line marker and the decoding of code data for each line.

FIG. 9A shows an index code. An index is associated with each of 32 codes. As the value of the code is reduced, the probability of the code to appear increases. Therefore, a short code length is allocated to the code with a small value. FIG. 9B shows an ESC header, which is the header of the ESC data. The ESC data is raw data when there is no data value in the dictionary. In this embodiment, the ESC data is 16-bit data in order to perform coding in a 16-bit unit.

FIG. 9D shows a line end code. The line end code indicates the end of each line code data item. As in the line code data shown in FIG. 16, the line end code is used to determine the end of the line code data divided in a word unit for each line.

Figure 17:
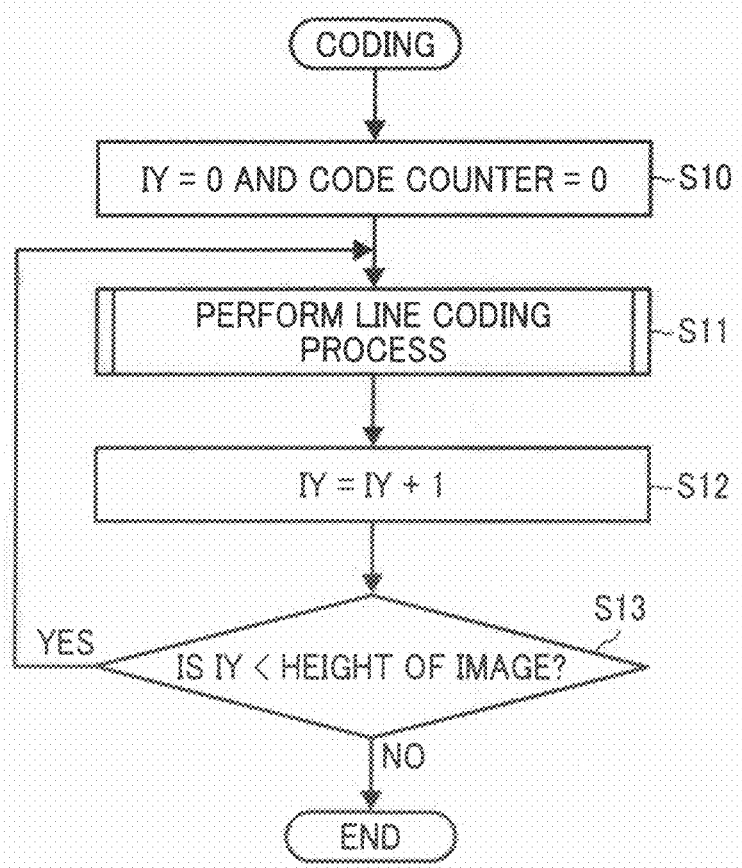
FIG. 17 is a flowchart illustrating an example of a coding process.

FIG. 17 is a flowchart illustrating an example of the coding process. In Step S10, the count value IY of a line counter and the count value of a code counter are cleared. In Step S11, coding is performed for each line. Then, in Step S12, the count value IY of the processed line is increased by 1. Then, in Step S13, it is determined whether the count value IY is processed to the height of the image. When it is determined that the count value IY is processed to the height of the image, the process ends. When it is determined that the process has not ended, the process returns to Step S11.

Figure 18:
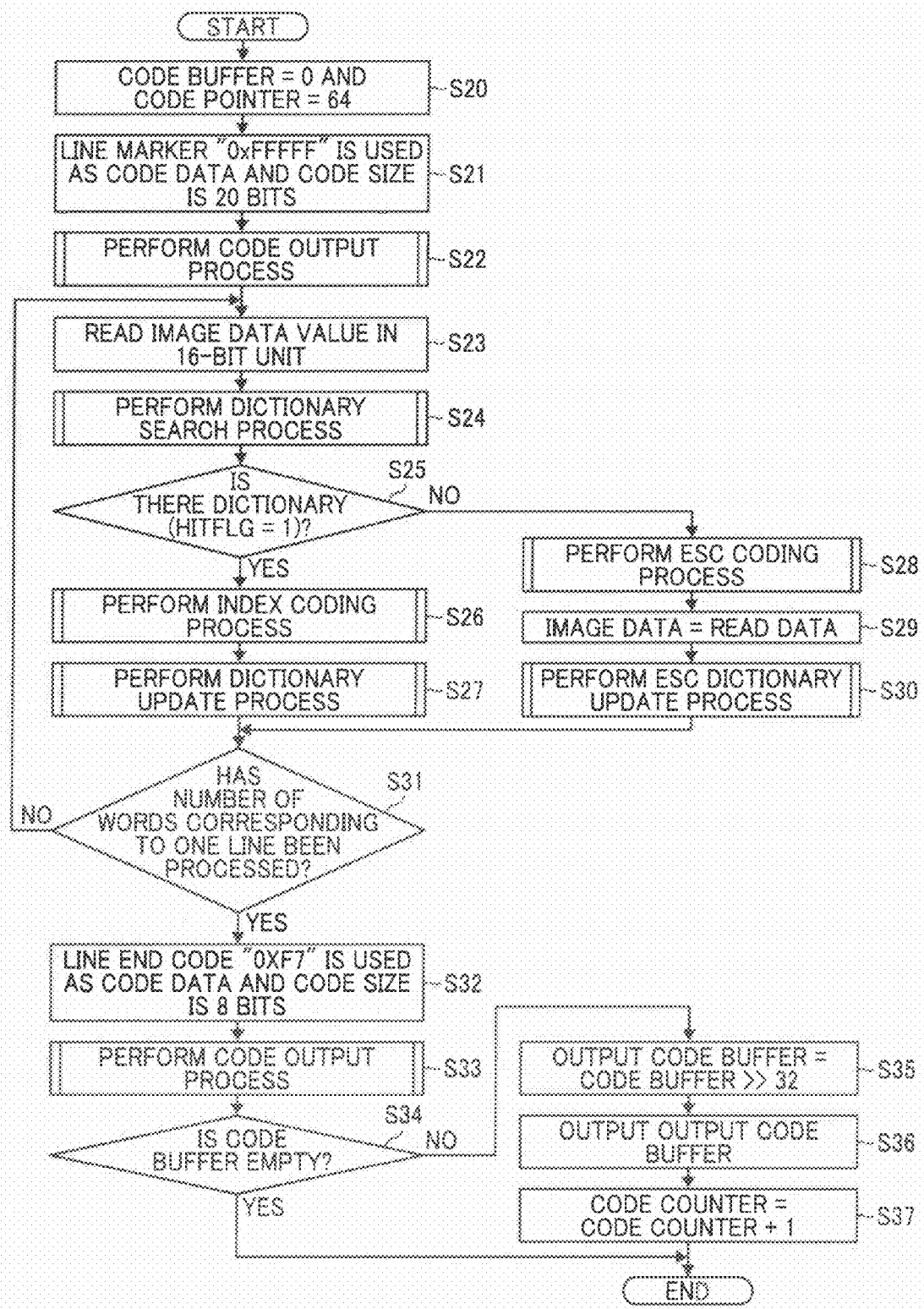
FIG. 18 is a flowchart illustrating an example of a process of coding the image data in a line unit.

FIG. 18 is a flowchart illustrating an example of the coding process for each line in Step S11 of FIG. 17. In Step S20, a code buffer is set to 0, that is, the code buffer is initialized to zero, and a pointer value is initialized to 64 bits. Then, in Step S21, the line marker is coded. That is, a value "0xFFFFF (hexadecimal notation)" is used as the code data of the line marker, and a code size is 20 bits. In Step S22, the code data of the line marker is output.

In Step S23, image data is read in a 16-bit unit. In Step S24, a value of the dictionary identical to the read image data is searched. An example of this operation is shown in FIG. 19. In this example, the value of the image data is "0x5555" and the value "0x5555" is searched from the dictionary. As a result, the value is identical to fourteenth dictionary data and an index value "14" is selected. When there is a value of the dictionary identical to input data, a flag HITFLG is 1. When there is no value of the dictionary identical to input data, the flag HITFLG is 0.

Figure 20:
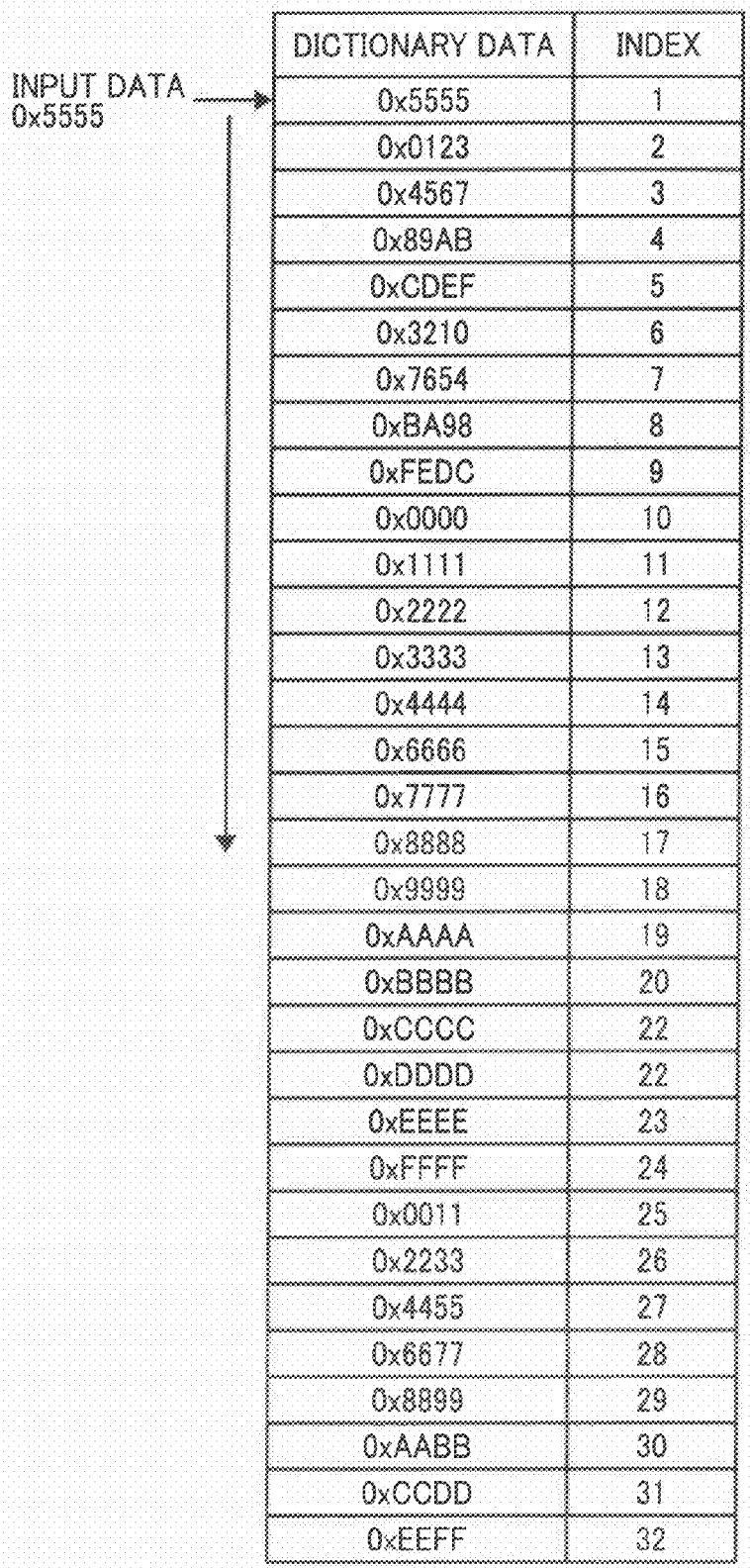
FIG. 20 is a diagram illustrating the update of the dictionary.

In Step S25, it is determined whether there is a value of the dictionary identical to input data. When it is determined that there is a value of the dictionary identical to input data (flag HITFLG=1), the process proceeds to Step S26 to code the index value. In Step S27, the dictionary is updated. FIG. 20 shows an example of the update of the dictionary. In this example, since the input data is identical to the fourteenth dictionary data, the first to fourteenth data items of the dictionary are moved one by one to the rear side, and the input data identical to the value of the dictionary is stored in the zero-th dictionary.

When it is determined in Step S25 that there is no value of the dictionary identical to input data, the process proceeds to Step S28 and an ESC coding process is performed. In Step S29, image data is used as the read data. In Step S30, the update of the ESC dictionary is performed.

When the dictionary update process in Step S27 or Step S30 ends, the process proceeds to Step S31 to determine whether words corresponding to one line has been processed. When it is determined that the number of words corresponding to one line has not been processed, the process proceeds to Step S23.

On the other hand, when it is determined that the number of words corresponding to one line has been processed, the process proceeds to Step S32. In Step S32, the line end code is coded. That is, a value "0xF7" is used ad the code data of the line end code and a code size is 8 bits. In Step S33, the line end code is output.

In Step S34, it is determined whether the code buffer is empty. When it is determined that the code buffer is empty, a series of coding processes shown in the flowchart of FIG. 18 ends. When it is determined that the code buffer is not empty, the process proceeds to Step S35, and data in the code buffer is shifted 32 bits to the right and is then stored in an output code buffer. In Step S36, the data in the output code buffer is output. In Step S37, the count value of the code counter is increased by 1. In this way, a series of processes shown in the flowchart of FIG. 18 ends.

Figure 21:
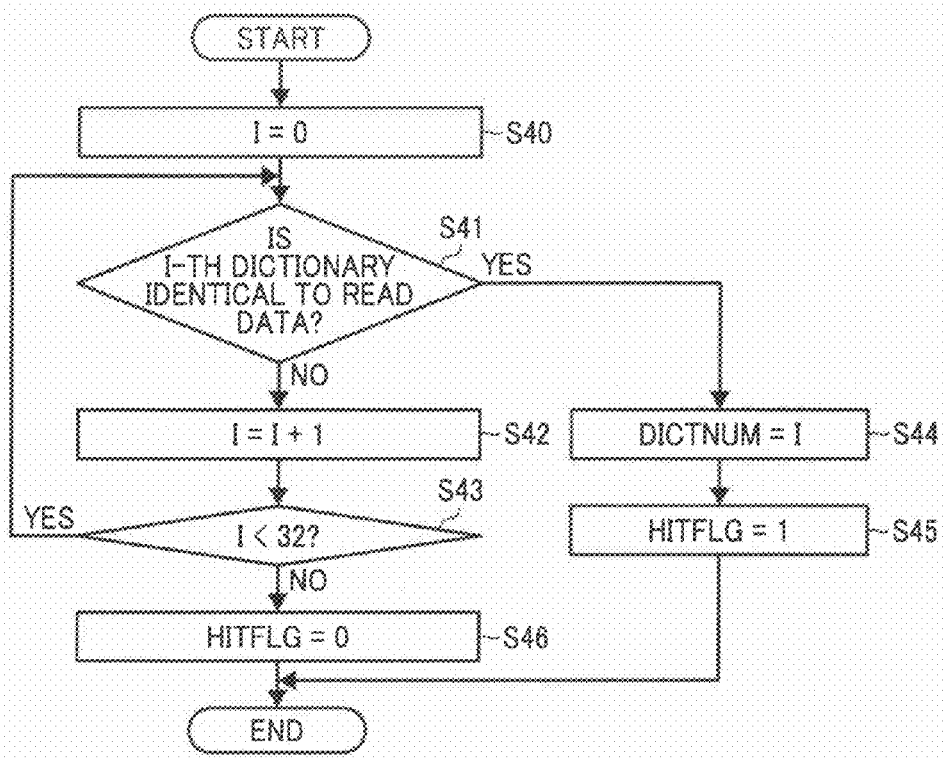
FIG. 21 is a flowchart illustrating an example of a dictionary search process.

FIG. 21 is a flowchart illustrating an example of the dictionary search process in Step S24 of FIG. 18. In Step S40, an index value I is set to 0. In Step S41, it is determined whether I-th dictionary data is identical to read image data. When it is determined that the I-th dictionary data is not identical to the read image data, the index value I is increased by 1 in Step S42. In Step S43, when the index value I is less than 32, the process returns to Step S41. When the index value I is equal to or more than 32, the process proceeds to Step S46 and the flag HITFLG is set to 0. On the other hand, when it is determined in Step S41 that the I-th dictionary data is identical to the read image data, the process proceeds to Step S44, and the index value I identical to the read image data is a value DICTNUM. In Step S45, the flag HITFLG is set to 1.

Figure 22:
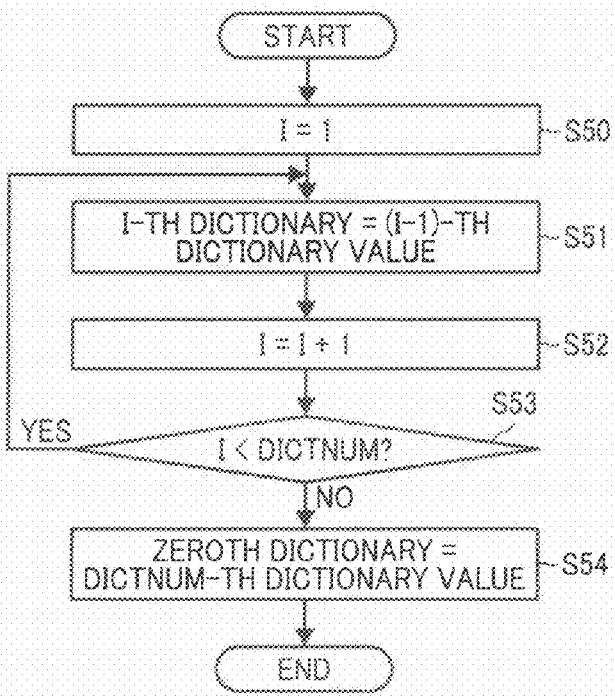
FIG. 22 is a flowchart illustrating an example of a dictionary update process.

FIG. 22 is a flowchart illustrating an example of the dictionary update process in Step S27 of FIG. 18. In Step S50, the index value I is set to 1. In Step S51, (I−1)-th dictionary data is used as I-th dictionary data. In Step S52, the index value I is increased by 1. In Step S53, it is determined whether the index value I is less than the value DICTNUM. When it is determined that the index value I is less than the value DICT-NUM, the process returns to Step S51. On the other hand, when it is determined that the index value I is equal to or more than the value DICTNUM, the process proceeds to Step S54 and DICTNUM-th dictionary data becomes zero-th dictionary data.

Figure 23:
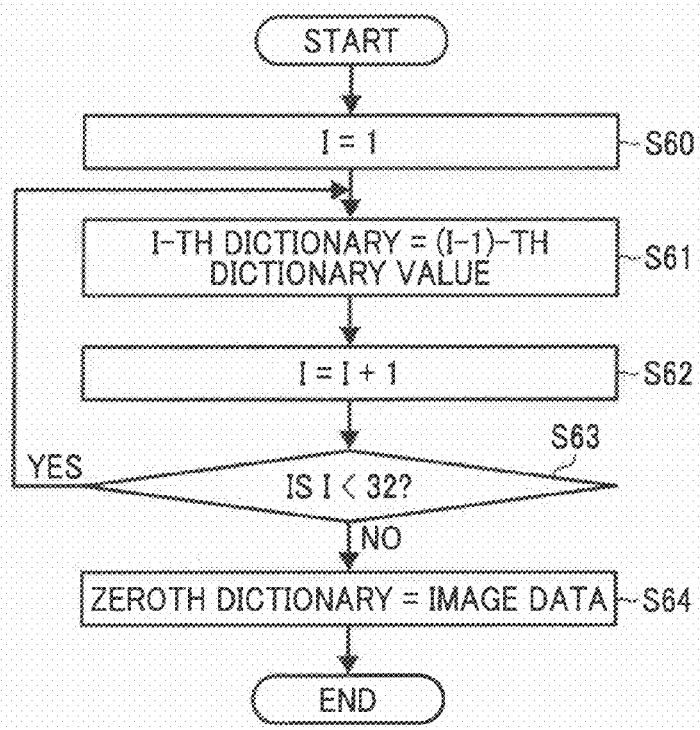
FIG. 23 is a flowchart illustrating an example of an ESC dictionary update process.

FIG. 23 is a flowchart illustrating an example of the ESC dictionary update process in Step S30 of FIG. 18. In Step S60, the index value I is set to 1. In Step S61, (I−1)-th dictionary data becomes I-th dictionary data. In Step S62, the index value I is increased by 1. In Step S63, it is determined whether the index value I is less than 32. When the index value I is less than 32, the process returns to Step S61. On the other hand, when it is determined that the index value I is equal to or more than 32 is satisfied, the process proceeds to Step S64 and image data becomes zero-th dictionary data.

Figure 24:
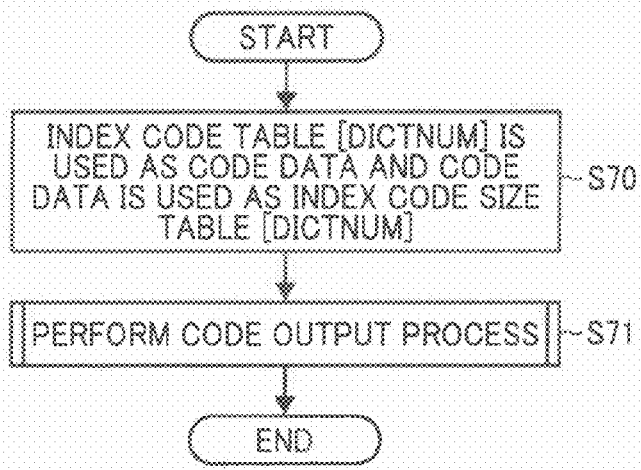
FIG. 24 is a flowchart illustrating an example of an index coding process.

FIG. 24 is a flowchart illustrating an example of the index coding process in Step S26 of FIG. 18. In Step S70, the code value and code length of the index value are calculated based on the code formats shown in FIGS. 9A to 9D, using an index code table shown in FIG. 25 in which an index code and an index code size are associated with each other. That is, an index code [DICTNUM] is used as code data and a code size is used as an index code size [DICTNUM] by the index code table. The code data and the code size are changed to variable-length codes by a code output process in Step S71.

Figure 26:
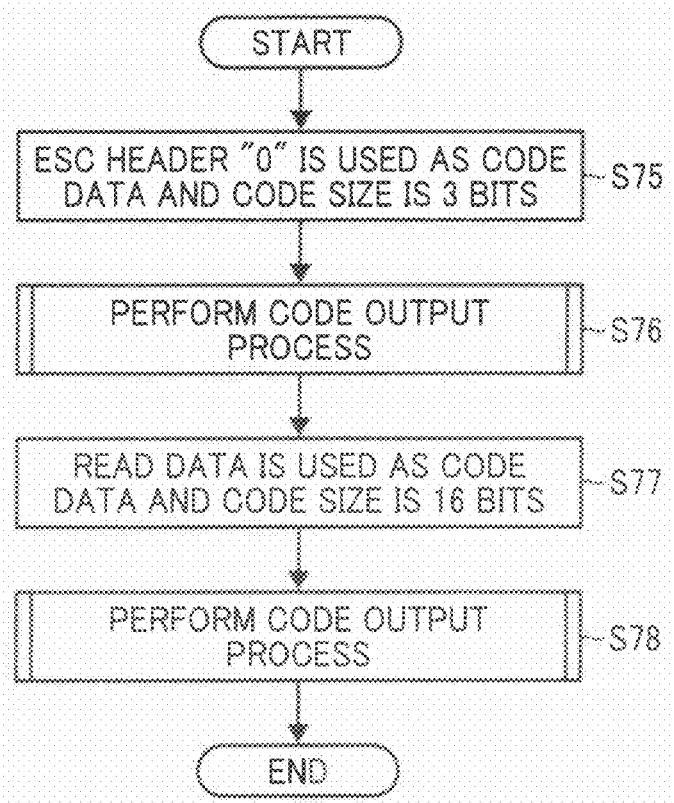
FIG. 26 is a flowchart illustrating an example of an ESC coding process.

FIG. 26 is a flowchart illustrating an example of the ESC coding process in Step S28 of FIG. 18. In Step S75, the value "0" of the ESC header is used as the code data and the code size is 3 bits. In Step S76, the code data and the code size are changed to variable-length codes by the code output process. In Step S77, the read image data is used as the code data and the code size is 16 bits. In Step S78, the code data and the code size are changed to variable-length codes by the code output process.

Figure 27:
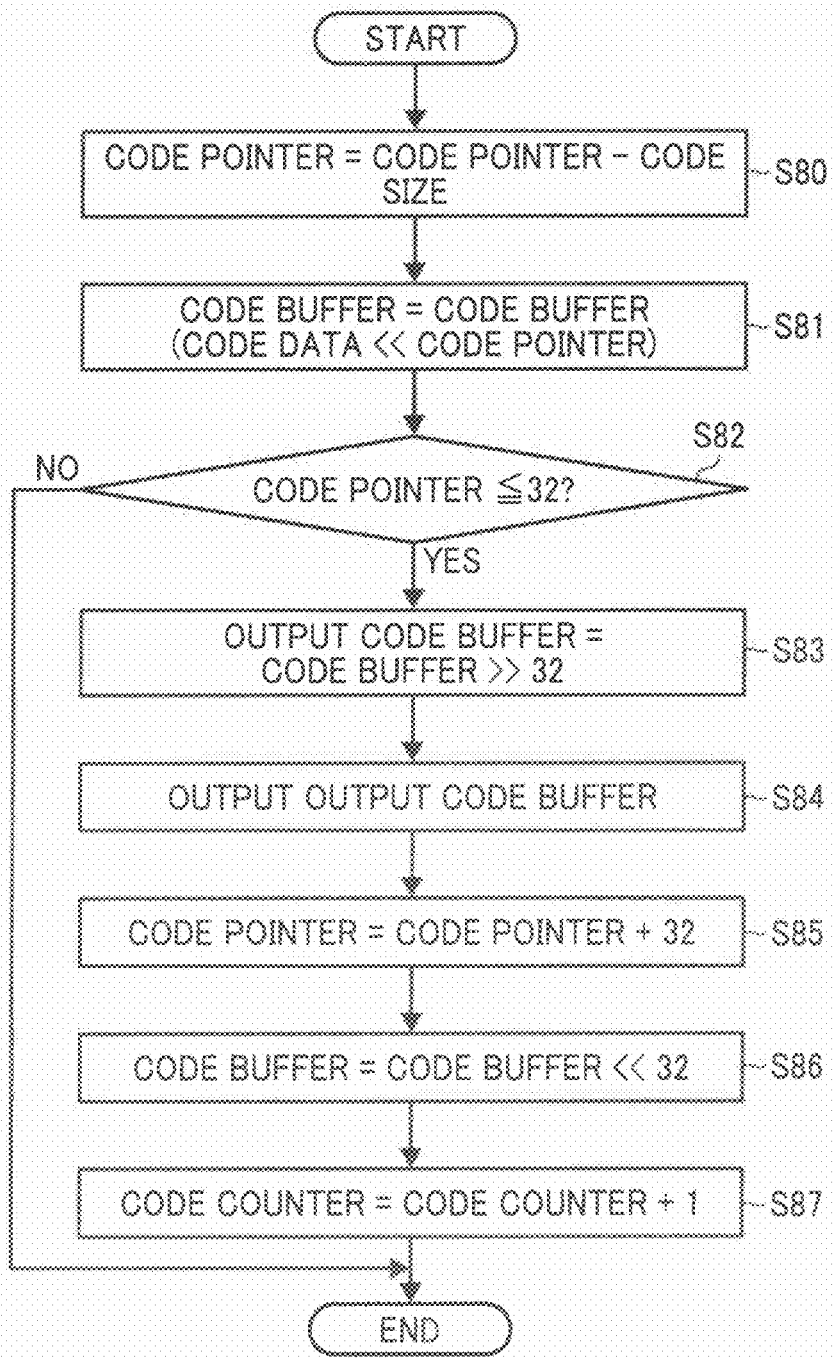
FIG. 27 is a flowchart illustrating an example of a code output process.

FIG. 27 is a flowchart illustrating an example of the code output process in Step S71, Step S76, and Step S78. The code output process puts the variable-length code data together into a word size (in this example, 32 bits) and outputs the word size. The code buffer is 64 bits and sequentially adds the variable-length code data. A code pointer indicates the end of a valid code in the code buffer.

In Step S80, a value obtained by subtracting the code size from the code pointer is used as a code pointer. That is, in order to add the code data to the code buffer, a portion of the code pointer corresponding to the code size is updated. In Step S81, the code data is moved with the code pointer, is positioned, and is then added to the code buffer. In Step S82, it is determined whether the code pointer is equal to or less than 32. When it is determined that the code pointer is more than 32, the code output process ends.

On the other hand, when it is determined that the code pointer is equal to or less than 32, the most significant 32 bits of the code buffer are output in Steps S83 to S87. That is, in Step S83, the code buffer is shifted 32 bits to the right and becomes the output code buffer. In Step S84, the output code buffer is output. In Step S85, 32 is added to the code pointer. In Step S86, the code buffer is shifted 32 bits to the left. In Step S87, the code counter is increased by 1. In this way, a series of code output processes shown in the flowchart of FIG. 27 ends.

<Decoding Process>

Figure 28:
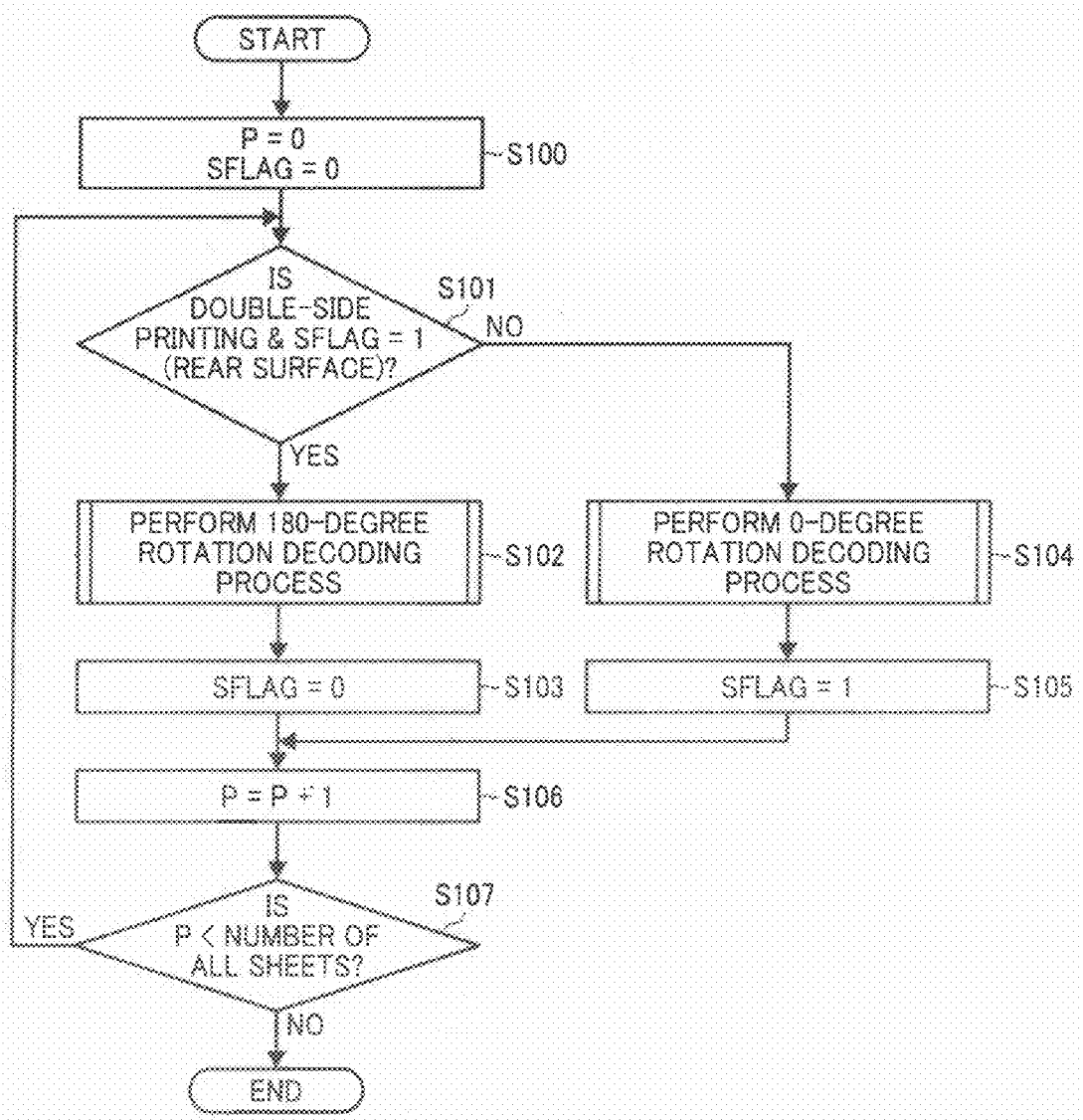
FIG. 28 is a flowchart illustrating an example of a decoding process.

Next, the decoding process according to the first embodiment will be described. FIG. 28 is a flowchart illustrating an example of the decoding process. It is assumed that double-side printing is designated as the print mode. In Step S100, the count value P of the counter indicating the number of sheets to be processed is initialized to zero and a flag SFLAG indicating the front surface and the rear surface of the sheet is initialized to zero. The flag SFLAG with a value of 0 indicates the front surface, and the flag SFLAG with a value of 1 indicates the rear surface.

In Step S101, it is determined whether printing is performed on the rear surface based on the value of the flag SFLAG. When the value of the flag SFLAG is 1 and it is determined that printing is performed on the rear surface, the process proceeds to Step S102 and a 180-degree rotation decoding process is performed. In Step S103, the value of the flag SFLAG is 0 and the process proceeds to Step S106.

On the other hand, in Step S101, when the value of the flag SFLAG is 0 and it is determined that printing is performed on the front surface, the process proceeds to Step S104 and a 0-degree rotation decoding process is performed. In Step S105, the value of the flag SFLAG is 1 and the process proceeds to Step S106.

In Step S106, the count value P is increased by 1. In Step S107, it is determined whether all of the sheets have been processed. When it is determined that all of the sheets have not been processed, the process returns to Step S101. When it is determined that all of the sheets have been processed, a series of decoding processes shown in the flowchart of FIG. 28 ends.

Figure 29:
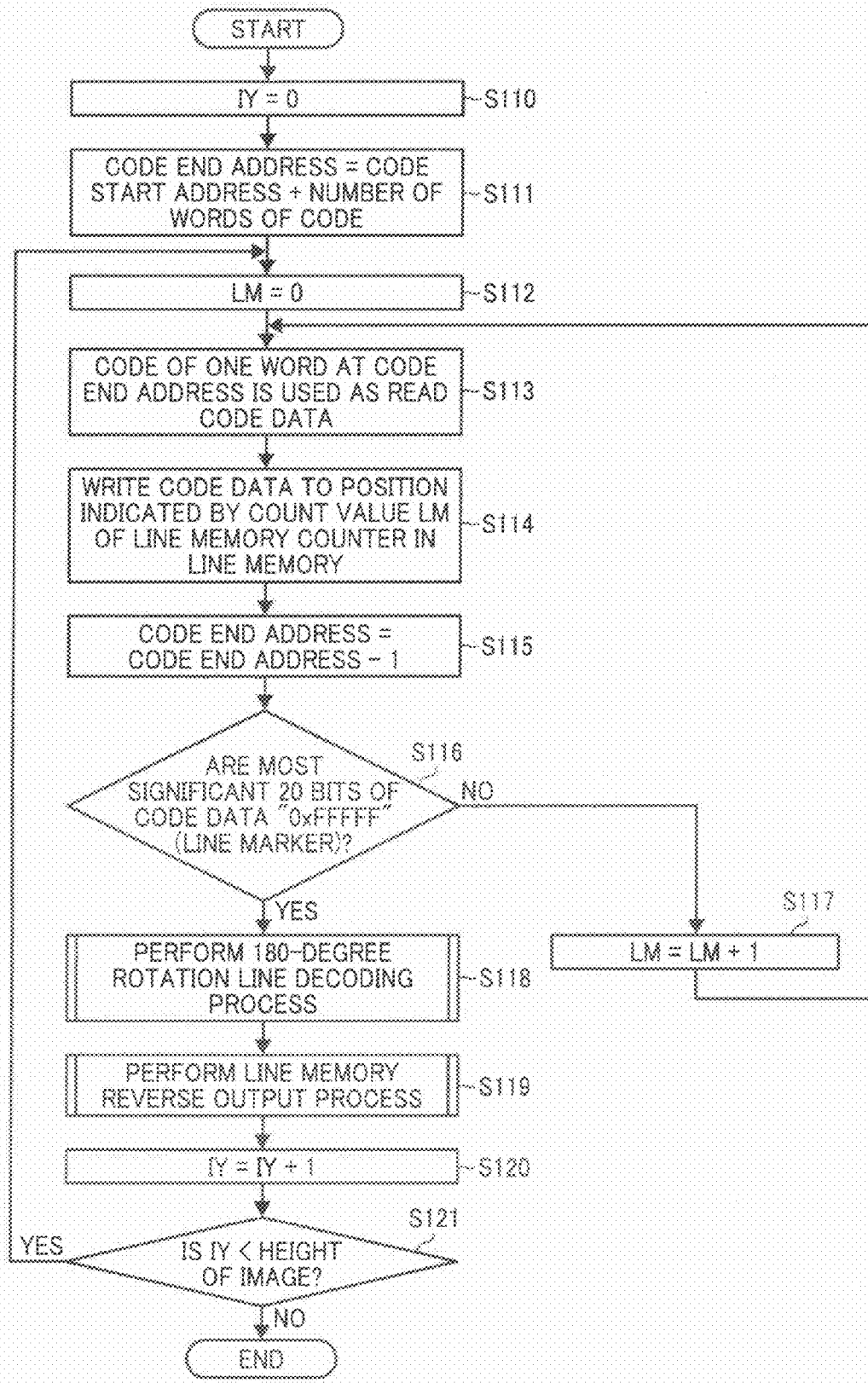
FIG. 29 is a flowchart illustrating an example of a 180-degree rotation decoding process.

FIG. 29 is a flowchart illustrating an example of the 180-degree rotation decoding process in Step S102 of FIG. 28. In Step S110, the count value IY of the line counter is set to 0. In Step S111, the start address of the line code data and the number of words of the line code data are added to be a code end address, and the process proceeds to Step S112.

In Step S112, the count value LM of the line memory counter is set to 0. The count value LM of the line memory counter indicates the order in which words are read in the code line memory 304 shown in FIGS. 10A to 10D. In Steps S112 to S116, as described with reference to FIGS. 10A to 10D, line code data is sequentially read from the end address of the line code data and line code data corresponding one line is read to the code line memory 304. That is, in Step S113, the code data of one word at the end code address is read. In Step S114, the read code data is written to a position indicated by the count value of the line memory counter in the code line memory 304. In Step S115, a value obtained by subtracting 1 from the end code address is used as a new end code address.

In Step S116, it is determined whether the line marker is recognized. In this way, the head of the line is recognized. That is, it is determined whether the value of the most significant 20 bits of the code data is "0xFFFFF." When it is determined that the line marker is not recognized, the process proceeds to Step S117, and the count value LM of the line memory counter is increased by 1. Then, the process returns to Step S113.

On the other hand, when it is determined in Step S116 that the line marker is recognized, the process proceeds to Step S118, and a 180-degree rotation line decoding process is performed. In Step S119, a line memory reverse output process is performed.

In Step S120, the count value IY of the line counter is increased by 1. In Step S121, it is determined whether the count value IY is less than the height of the image. When it is determined that the count value IY is less than the height of the image, the process proceeds to Step S112. On the other hand, when it is determined that the count value IY reaches the height of the image, a series of processes shown in the flowchart of FIG. 29 ends.

Figure 30:
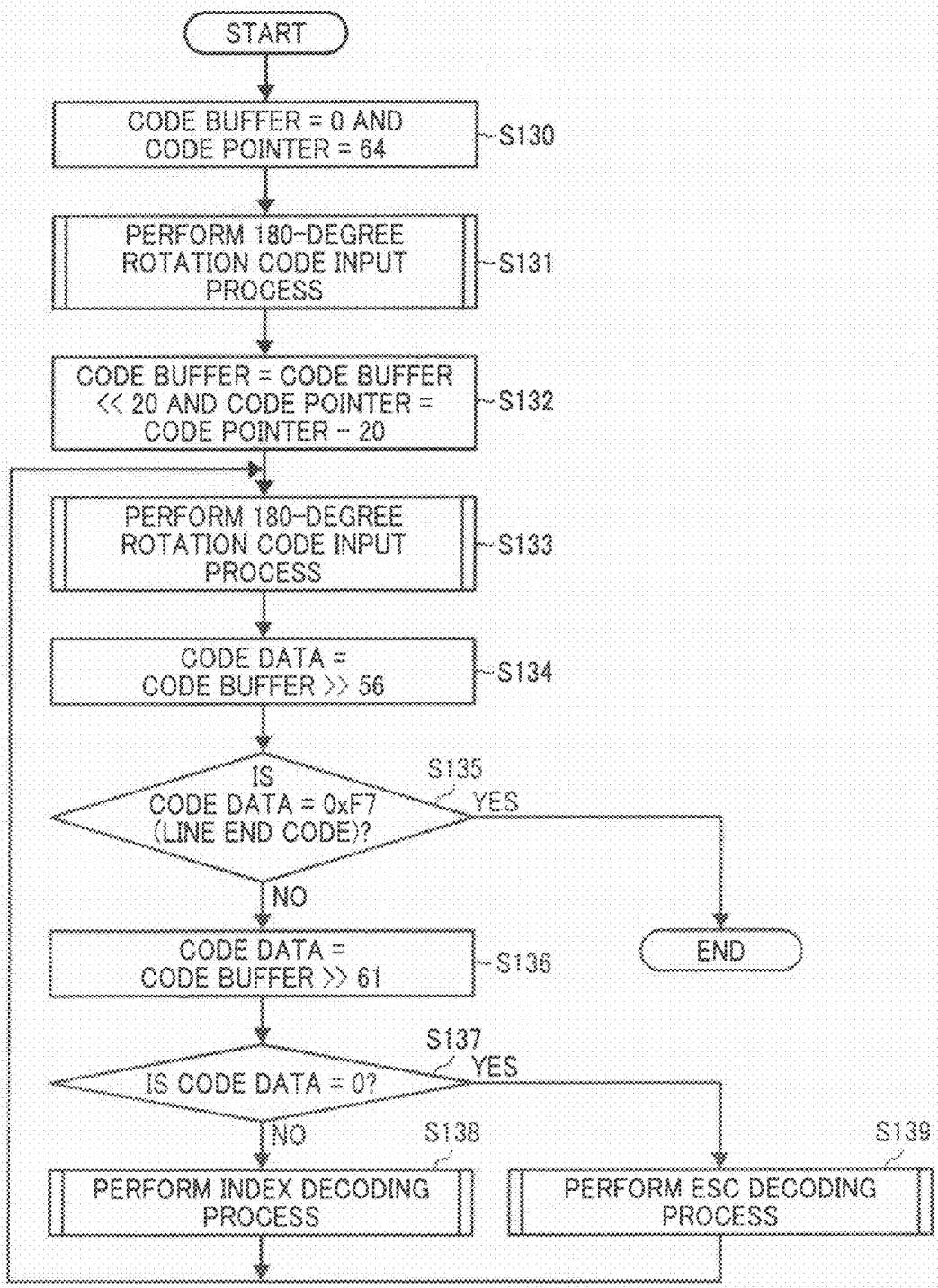
FIG. 30 is a flowchart illustrating an example of a 180-degree rotation line decoding process.

FIG. 30 is a flowchart illustrating an example of the 180-degree rotation line decoding process in Step S118 of FIG. 29. In Step S130, the code buffer is set to 0 (bit), that is, the code buffer is initialized to zero, and the code pointer is initialized to 64 (bits). The code buffer temporarily stores a variable-length code, and a code pointer indicates the end of the code buffer.

In Step S131, a 180-degree rotation code input process is performed, and line code data is input and stored in the code buffer. In Step S132, the code buffer is shifted 20 bits to the left and the value of the code pointer is reduced by 20. In this way, the line marker is removed from the code buffer, and the head of the code following the line marker is arranged at the most significant bit (MSB). The code length of the line marker is added to the code pointer to indicate the end of the code.

In Step S133, the 180-degree rotation code input process is performed and line code data is input and stored in the code buffer. In Step S134, the code buffer is shifted 56 bits to the right and the code data is cut out. In this way, 8 bits from the head of the code are cut out as the code data.

In Step S135, it is determined whether the cut code is the line end code, that is, whether the value of the cut code data is "0xF7." When it is determined that the cut code is the line end code, a series of processes shown in the flowchart of FIG. 30 ends.

On the other hand, when it is determined that the cut code is not the line end code, the process proceeds to Step S136. The code buffer is shifted 61 bits to the right and 3 bits from the head of the current code are cut out as the code data. In Step S137, it is determined whether the value of the cut code data is "0." When it is determined whether the value of the cut code data is not "0," the process proceeds to Step S138, and an index decoding process is performed. On the other hand, when it is determined whether the value of the cut code data is "0," the process proceeds to Step S139, and an ESC decoding process is performed. When Step S138 or Step S139 ends, the process returns to Step S133.

Figure 31:
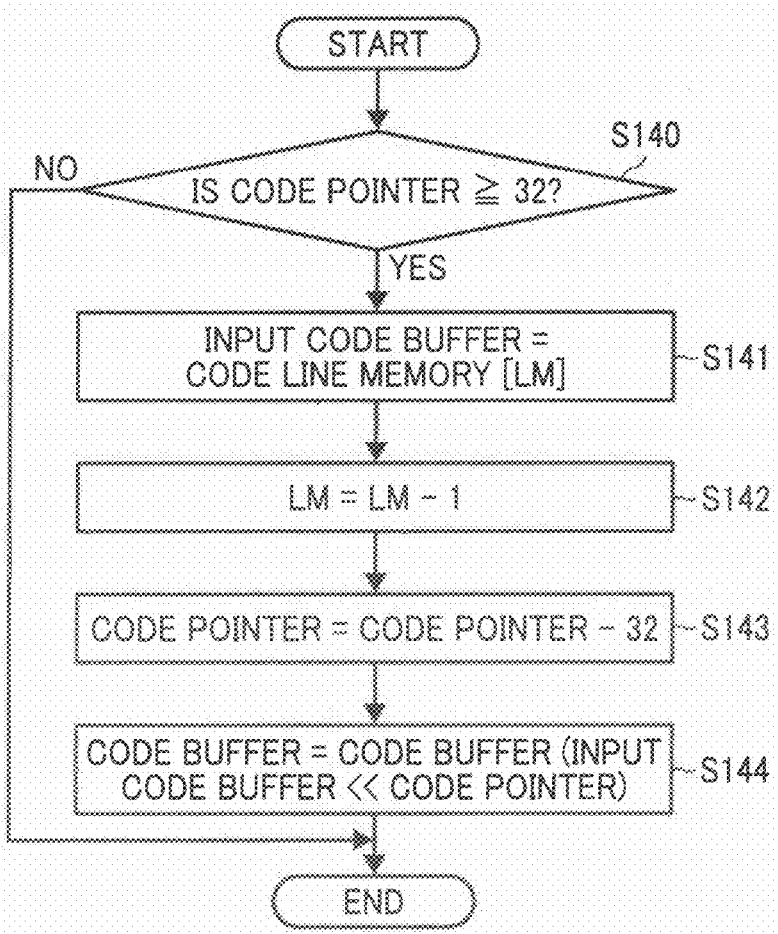
FIG. 31 is a flowchart illustrating an example of a 180-degree rotation code input process.

FIG. 31 is a flowchart illustrating an example of the 180-degree rotation code input process in Step S131 and Step S133 of FIG. 30. In the 180-degree rotation code input process, when the position of a valid code of the code buffer is more than 32 bits, the code data of one word (32 bits) is read from the code line memory and is then added to the code buffer.

In Step S140, it is determined whether the position of the valid code of the code buffer indicated by the code pointer is equal to or more than 32 bits. When it is determined that the position of the valid code of the code buffer is less than 32 bits, a series of processes shown in the flowchart of FIG. 31 ends.

On the other hand, when it is determined that the position of the valid code of the code buffer is equal to or more than 32 bits, the process proceeds to Step S141 and the code of one word at the position indicated by the count value LM of the line memory counter is read from the code line memory 304 and is then stored in the input code buffer. In Step S142, the count value LM is reduced by 1 and the process proceeds to Step S143. In Step S143, 32 bits are reduced from the value of the code pointer and the code pointer is updated. In Step S144, the read code data is added to the code buffer at the position indicated by the code pointer.

Figure 32:
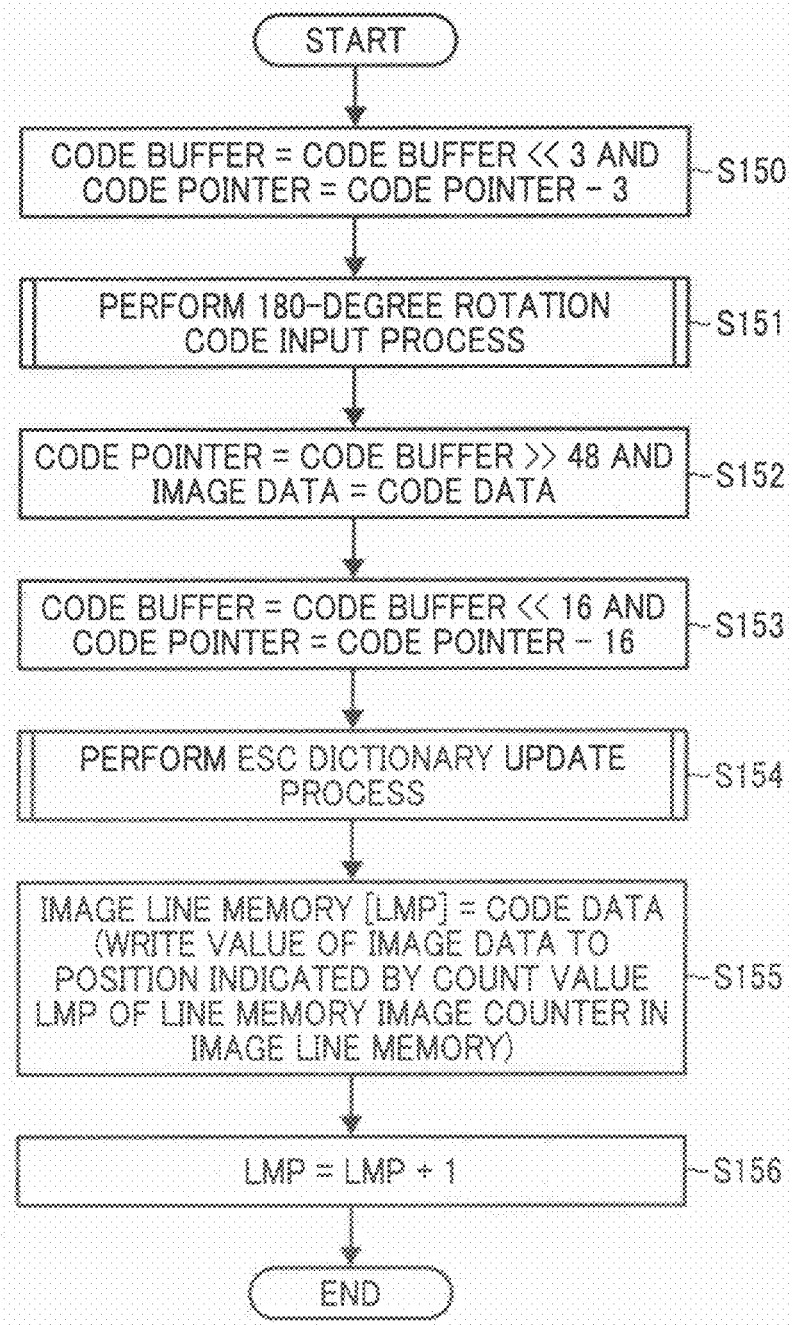
FIG. 32 is a flowchart illustrating an example of an ESC decoding process.

FIG. 32 is a flowchart illustrating an example of the ESC decoding process in Step S139 of FIG. 30. In Step S150, the code buffer is shifted 3 bits to the left and the value of the code pointer is reduced by 3 to remove the ESC header. In Step S151, the 180-degree rotation code input process shown in FIG. 31 is performed. In Step S152, the code buffer is shifted 48 bits to the right and the code data is cut out. Then, the cut code data becomes the image data.

In Step S153, the code buffer is shifted 16 bits to the left, 16 bits are reduced from the value of the code pointer, and the code pointer is updated. In Step S154, a process of updating the ESC dictionary is performed.

When the ESC dictionary is updated, the process proceeds to Step S155, and image data is written to the position indicated by the count value LMP of a line memory pixel counter in the image line memory 307. In Step S156, the line memory pixel counter is increased by 1. In this way, a series of processes shown in the flowchart of FIG. 32 ends. The line memory pixel counter counts the count value in a pixel unit in the line memory. In this example, since the data length of one pixel is 16 bits, the line memory pixel counter counts the count value LMP for every 16 bits.

Figure 33:
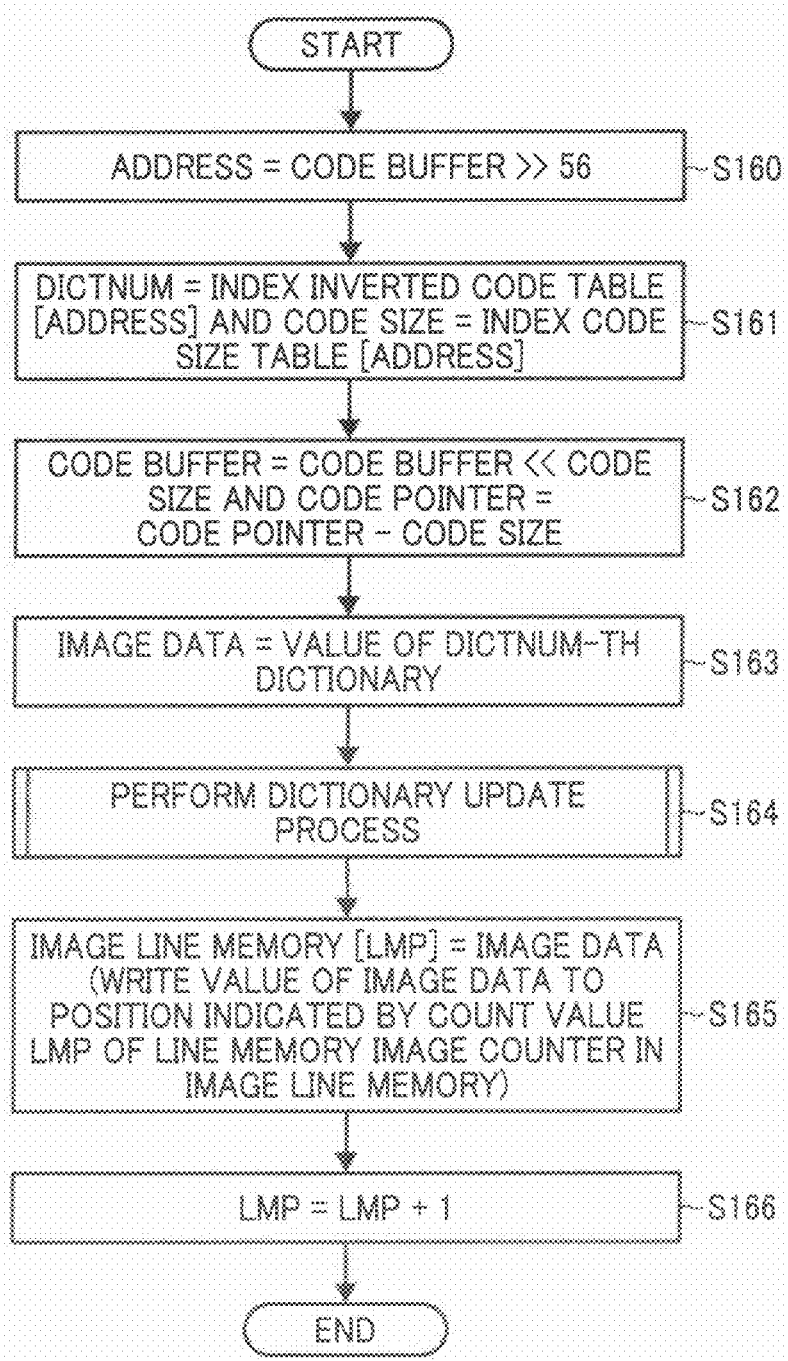
FIG. 33 is a flowchart illustrating an example of an index decoding process.

FIG. 33 is a flowchart illustrating an example of the index decoding process in Step S138 of FIG. 30. In Step S160, the code buffer is shifted 56 bits to the right. In this way, 8 bits are cut out from the code data and an address value is obtained. In Step S161, a value DICTNUM is calculated with reference to the address value of an inverted index code table shown in FIG. 34 in which an inverted index code is associated with an inverted index code size and is used as the index value. In addition, a code size is calculated.

In Step S162, the code buffer is shifted to the left by the code size, and the code pointer is updated with a value obtained by subtracting the code size from the value of the code pointer. In Step S163, as shown in FIG. 35, an access to the dictionary is performed using the value DICTNUM, which is an index value, and image data is calculated. That is, the value of a DICTNUM-th dictionary is used as image data. In Step S164, the dictionary is updated.

In Step S165, the image data is written to the position indicated by the count value LMP of the line memory pixel counter in the image line memory 307. In Step S166, the count value LMP is increased by 1. In this way, a series of processes shown in the flowchart of FIG. 32 ends.

Figure 36:
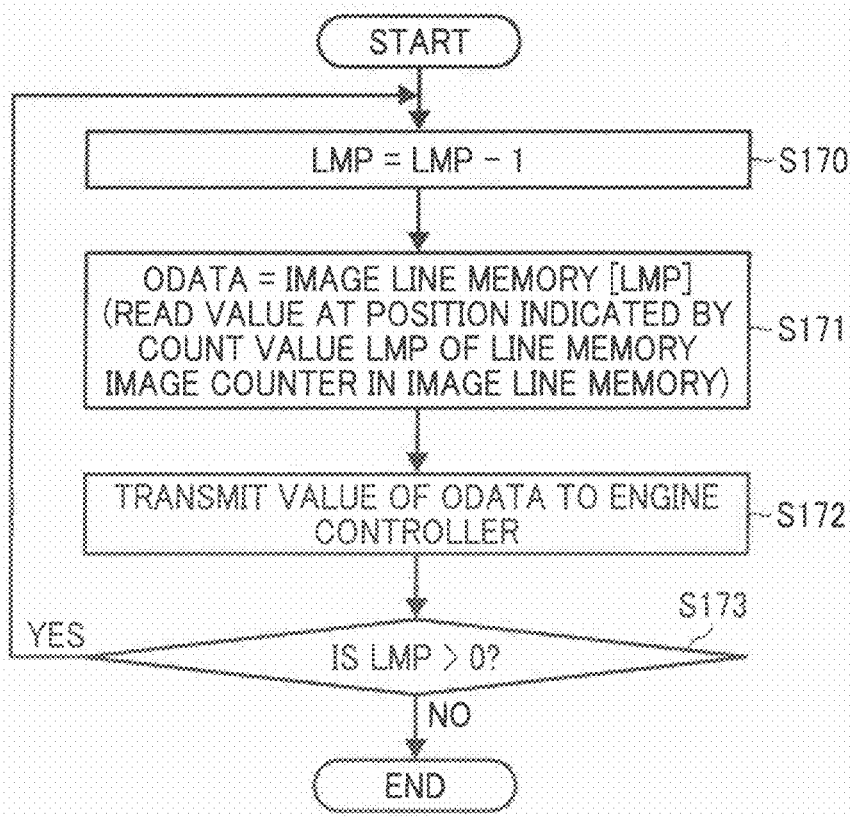
FIG. 36 is a flowchart illustrating an example of a line memory reverse output process.

FIG. 36 is a flowchart illustrating an example of the line memory revere output process in Step S119 of FIG. 29. In Step S170, 1 is subtracted from the count value LMP of the line memory pixel counter. In Step S171, the image data at the position indicated by the count value LMP in the image line memory 307 is read and used as data ODATA. In Step S172, the data ODATA is transmitted to the engine controller 110. In Step S173, it is determined whether the count value LMP of the line memory pixel counter is more than 0. When it is determined that the count value LMP of the line memory pixel counter is more than 0, the process returns to Step S170. When it is determined whether the count value LMP of the line memory pixel counter is 0, a series of processes shown in the flowchart of FIG. 36 ends.

Figure 37:
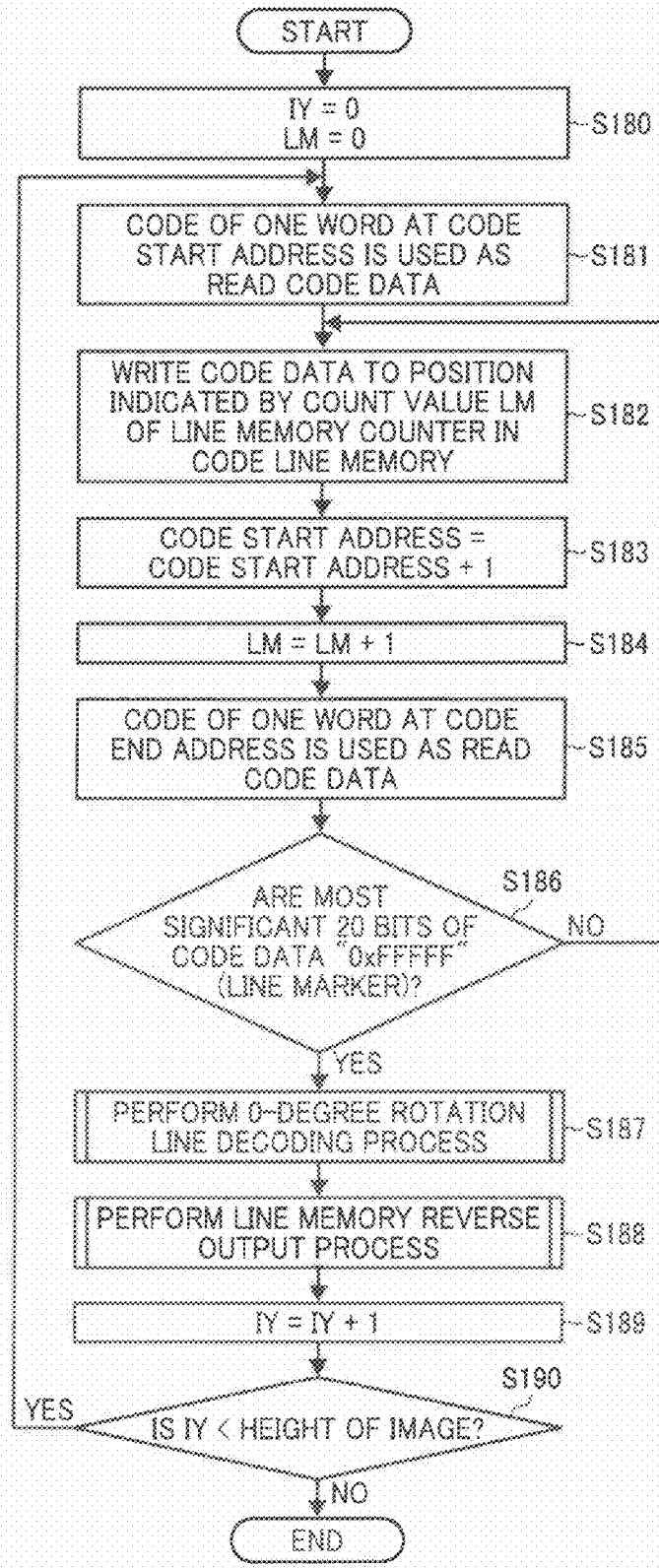
FIG. 37 is a flowchart illustrating an example of a 0-degree rotation decoding process.

FIG. 37 is a flowchart illustrating an example of the 0-degree rotation decoding process in Step S104 of FIG. 28. In Step S180, the line counter of the count value IY is set to 0 and the count value LM of the line memory counter is set to 0. In Step S181, the code of one word at a code start address is read as code data. In Step S182, the code data is written to the position indicated by the count value LM of the line memory counter in the code line memory 304. In Step S183, 1 is added to the code start address. In Step S184, 1 is added to the count value LM of the line memory counter. In Step S185, the code of one word at code end address is read as code data.

In Step S186, it is determined whether the line marker is recognized. In this way, the heat of the line is recognized. That is, it is determined whether the value of the most significant 20 bits of the code data is "0xFFFFF." When it is determined that the line marker is not recognized, the process returns to Step S182.

On the other hand, when it is determined in Step S186 that the line marker is recognized, the process proceeds to Step S187 and a 0-degree rotation line decoding process is performed. In Step S188, a line memory output process is performed.

In Step S189, the count value IY of the line counter is increased by 1. In Step S190, it is determined whether the count value IY is less than the height of the image. When it is determined that the count value IY is less than the height of the image, the process returns to Step S181. On the other hand, when it is determined that the count value IY reaches the height of the image, a series of processes shown in the flowchart of FIG. 37 ends.

Figure 38:
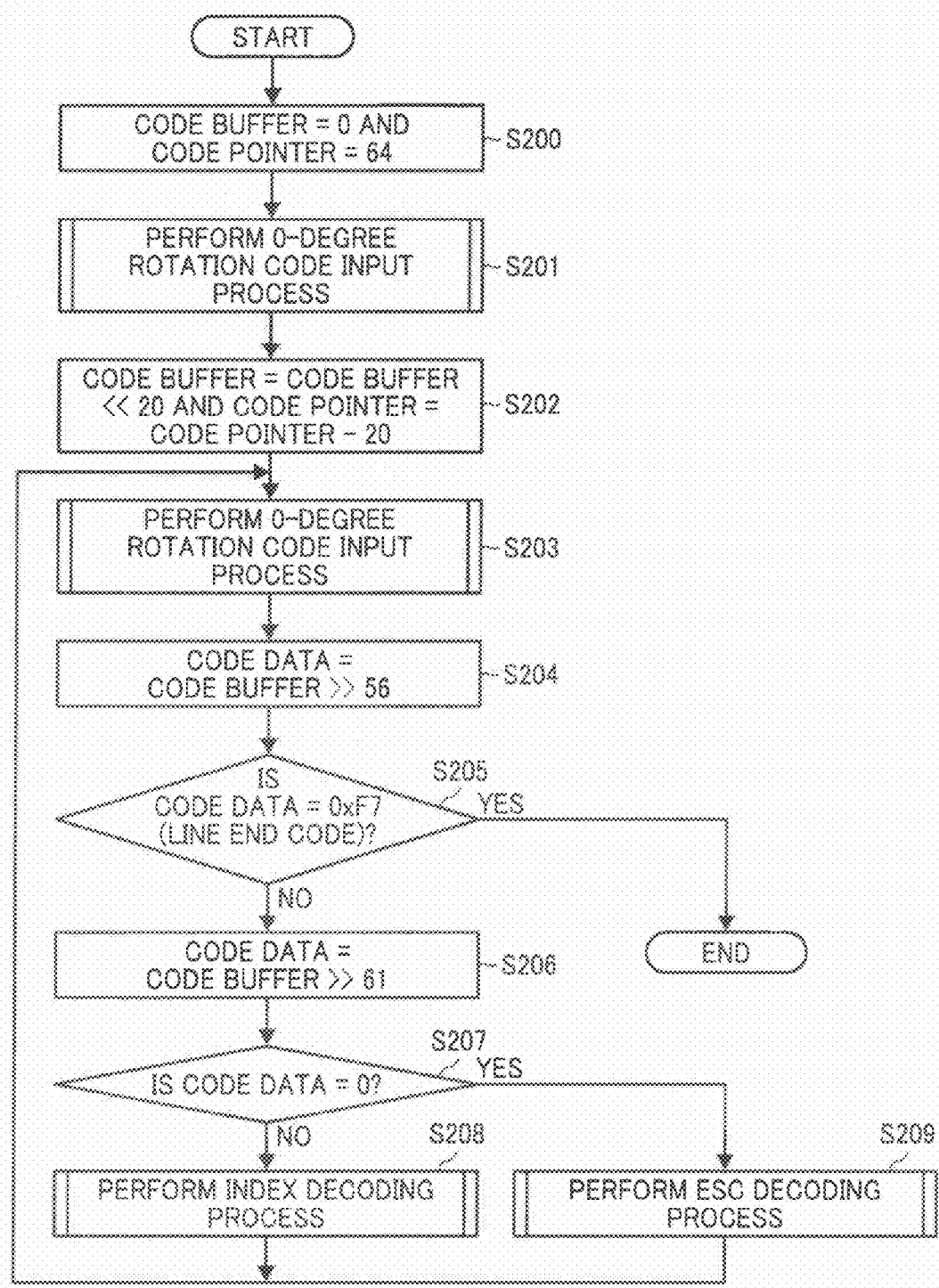
FIG. 38 is a flowchart illustrating an example of a 0-degree rotation line decoding process.

FIG. 38 is a flowchart illustrating an example of the 0-degree rotation line decoding process in Step S187 of FIG. 37. In Step S200, the code buffer is 0 (bit), that is, the code buffer is initialized to zero, and the code pointer is initialized to 64 (bits). The code buffer temporarily stores a variable-length code and the code pointer indicates the end of the code buffer.

In Step S201, the 0-degree rotation code input process is performed, and line code data is input and stored in the code buffer. In Step S202, the code buffer is shifted 20 bits to the left and the value of the code pointer is reduced by 20. In this way, the line marker is removed from the code buffer, and the head of the code following the line marker is arranged at the most significant bit (MSB). The code length of the line marker is added to the code pointer to indicate the end of the code.

In Step S203, the 0-degree rotation code input process is performed and line code data is input and stored in the code buffer. In Step S204, the code buffer is shifted 56 bits to the right and the code data is cut out. In this way, 8 bits from the head of the code are cut out as the code data.

In Step S205, it is determined whether the cut code is the line end code, that is, whether the value of the cut code data is "0xF7." When it is determined that the cut code is the line end code, a series of processes shown in the flowchart of FIG. 38 ends.

On the other hand, when it is determined that the cut code is not the line end code, the process proceeds to Step S206. The code buffer is shifted 61 bits to the right and 3 bits from the head of the current code are cut out as the code data. In Step S207, it is determined whether the value of the cut code data is "0." When it is determined that the value of the cut code data is not "0," the process proceeds to Step S208, and the index decoding process is performed. On the other hand, when it is determined that the value of the cut code data is "0," the process proceeds to Step S209, and the ESC decoding process is performed. When Step S208 or Step S209 ends, the process returns to Step S203.

FIG. 39 is a flowchart illustrating an example of the 0-degree rotation code input process in Step S201 and Step S203 of FIG. 38. In the 0-degree rotation code input process, when the position of the valid code of the code buffer is more than 32 bits, the code data of one word (32 bits) is read from the code line memory and is then added to the code buffer.

In Step S210, it is determined whether the position of the valid code of the code buffer indicated by the code pointer is equal to or more than 32 bits. When it is determined that the position of the valid code of the code buffer is less than 32 bits, a series of processes shown in the flowchart of FIG. 39 ends.

On the other hand, when it is determined that the position of the valid code of the code buffer is equal to or more than 32 bits, the process proceeds to Step S211 and a code at the position indicated by the count value LM of the line memory counter is read from the code line memory 304 and is then stored in the input code buffer. In Step S212, 1 is added to the count value LM of the line memory counter and the process proceeds to Step S213. In Step S213, 32 bits are reduced from the value of the code pointer and the code pointer is updated. In Step S214, the read code data is added to the code buffer at the position indicated by the code pointer.

FIG. 40 is a flowchart illustrating an example of the line memory output process in Step S188 of FIG. 37. In Step S220, the count value WC of a work counter is set to 0. The work counter counts the count value WC for each pixel (16 bits). In Step S221, image data at the position indicated by the count value WC of the work counter in the image line memory 307 is read as data ODATA. In Step S222, the data ODATA is transmitted to the engine controller 110. In Step S223, 1 is added to the count value WC of the work counter. In Step S224, it is determined whether the count value WC of the work counter is less than the count value LMP of the line memory pixel counter. When it is determined that the count value WC of the work counter is less than the count value LMP of the line memory pixel counter, the process returns to Step S170. When it is determined that the count value WC of the work counter is equal to or more than the count value LMP of the line memory pixel counter, a series of processes shown in the flowchart of FIG. 40 ends.

As described above, in the first embodiment, the line marker is arranged at the head of the line code data, and the line end code is arranged at the end thereof. Therefore, even when the line code data is divided into a word unit and is then stored in the line memory, it is easy to read the line code data in the reverse direction. Therefore, it is not necessary to provide a separate structure for rotating the image data 180 degrees and it is possible to reduce the amount of data transmitted through the bus 113 when the image data is rotated 180 degrees.

<Second Embodiment>

Next, a second embodiment of the invention will be described. In the first embodiment, the image data is coded by the MTF coding method. In contrast, in the second embodiment, the image data is coded using a run length code. In the second embodiment, the hardware structure is the same as that in the first embodiment and thus a description thereof will be omitted.

<Code Format>

Figure 41A:
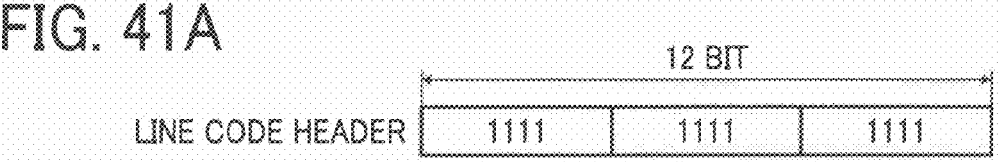
FIGS. 41A to 41C are diagrams illustrating an example of a code format according to a second embodiment of the invention.
Figure 41B:
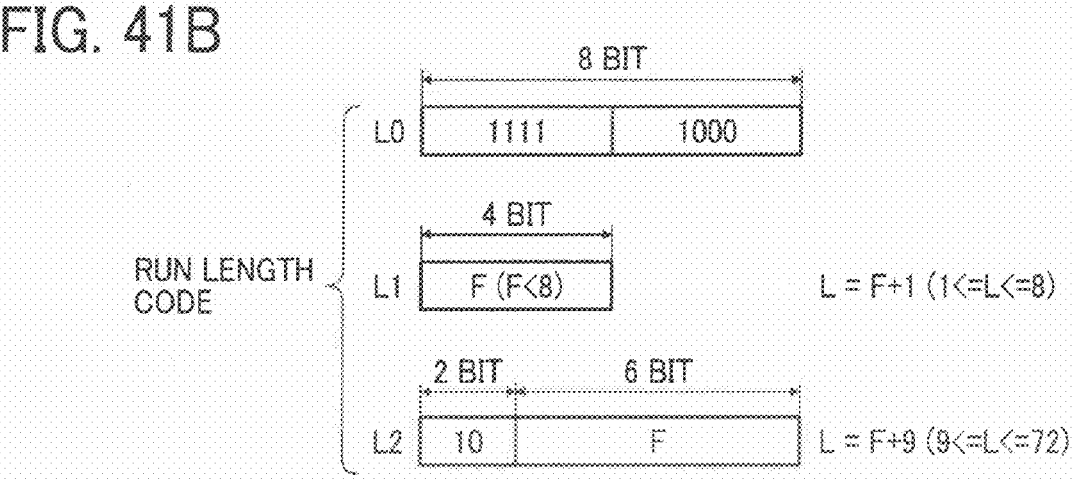
Figure 41C:
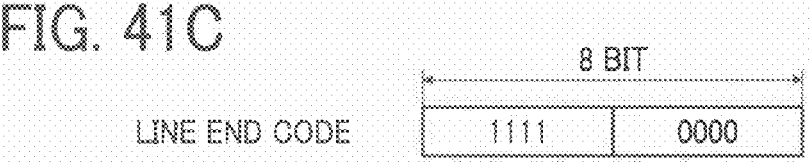

FIGS. 41A to 41C show an example of a code format according to the second embodiment. In the second embodiment, line code data includes a line code header, a run length code that follows the line code header, and a line end code that follows the run length code. FIG. 41A shows an example of the line code header. The line code header is an identification code for identifying the head of the line, has a code length of 12 bits, and includes twelve consecutive binary values of "1." The bit arrangement of the line code header has a pattern that is not identical to any combination of other codes. Therefore, even when the codes are decoded from the head, it is possible to easily detect the line code header from the codes. The line end code shown in FIG. 41C indicates the end of the code of each line. In this embodiment, the line marker recognizing unit 303 of the decoding unit 109 shown in FIG. 8 is replaced with a line code header recognizing unit that recognizes the line code header.

Figure 42:
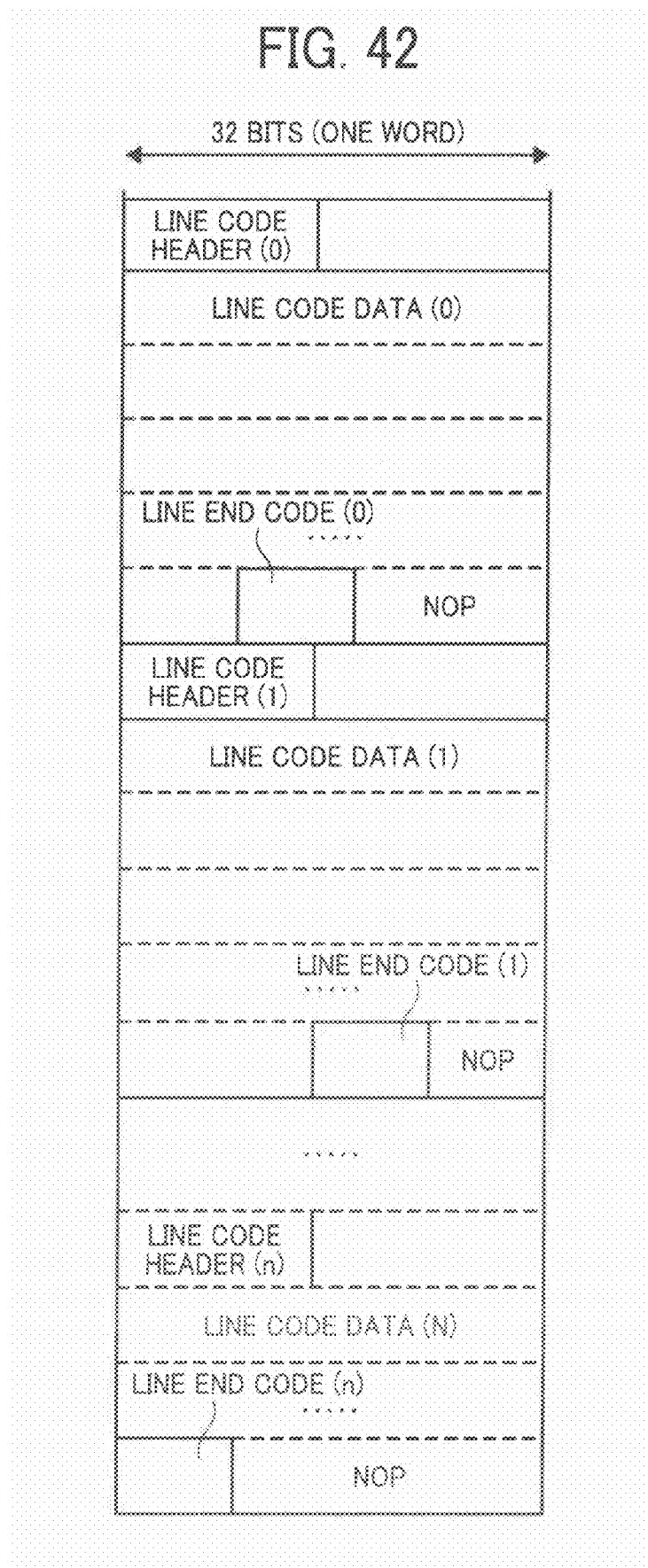
FIG. 42 is a diagram illustrating an example of line code data according to the second embodiment of the invention.
Figure 43A:
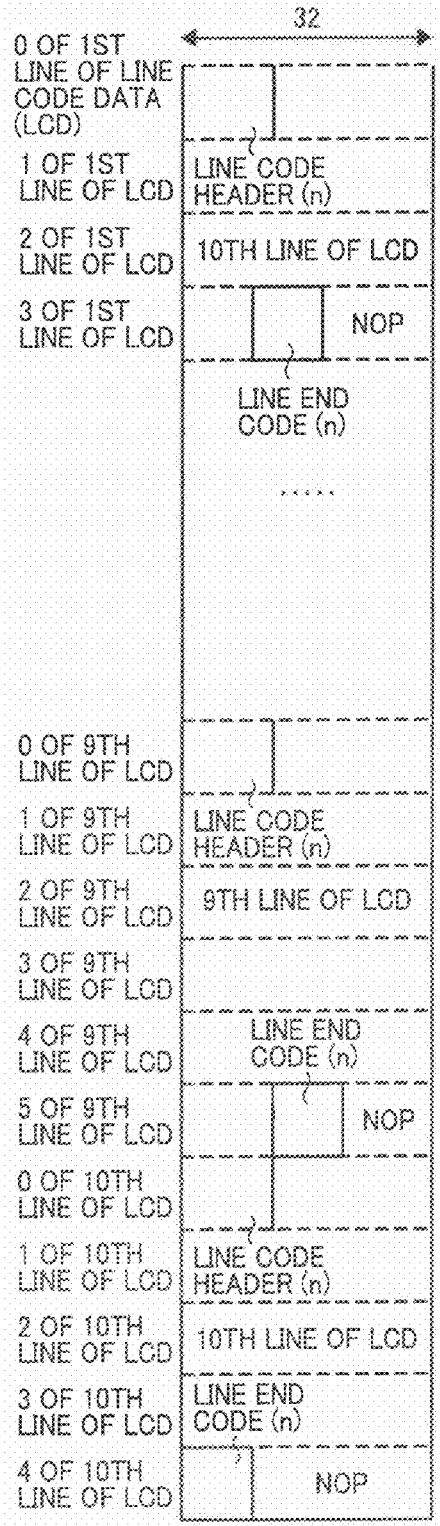
FIGS. 43A to 43D are diagrams illustrating the relationship between code data and a code line memory during 180-degree rotation decoding according to the second embodiment of the invention.
Figure 43B:
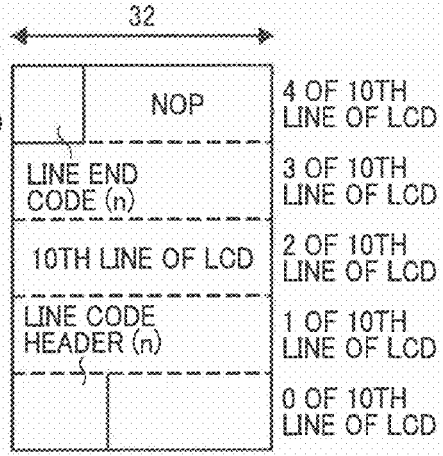
Figure 43C:
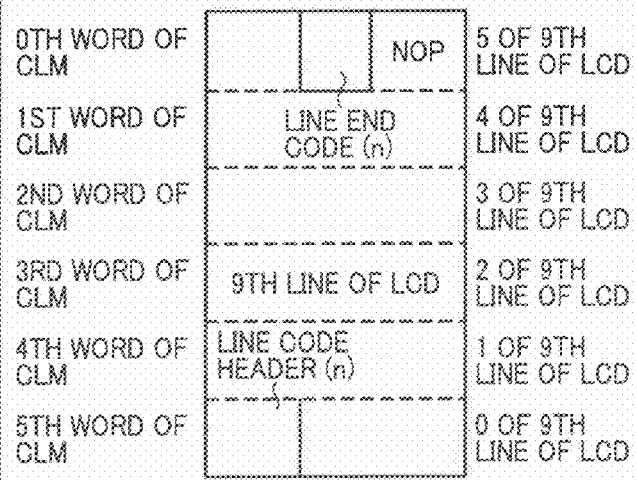
Figure 43D:
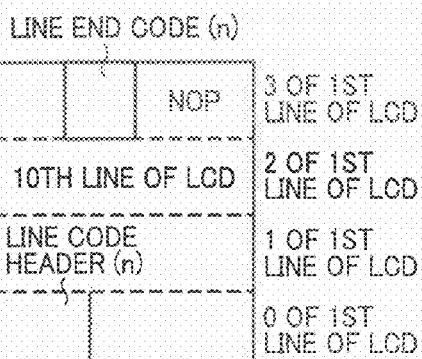
Figure 44A:
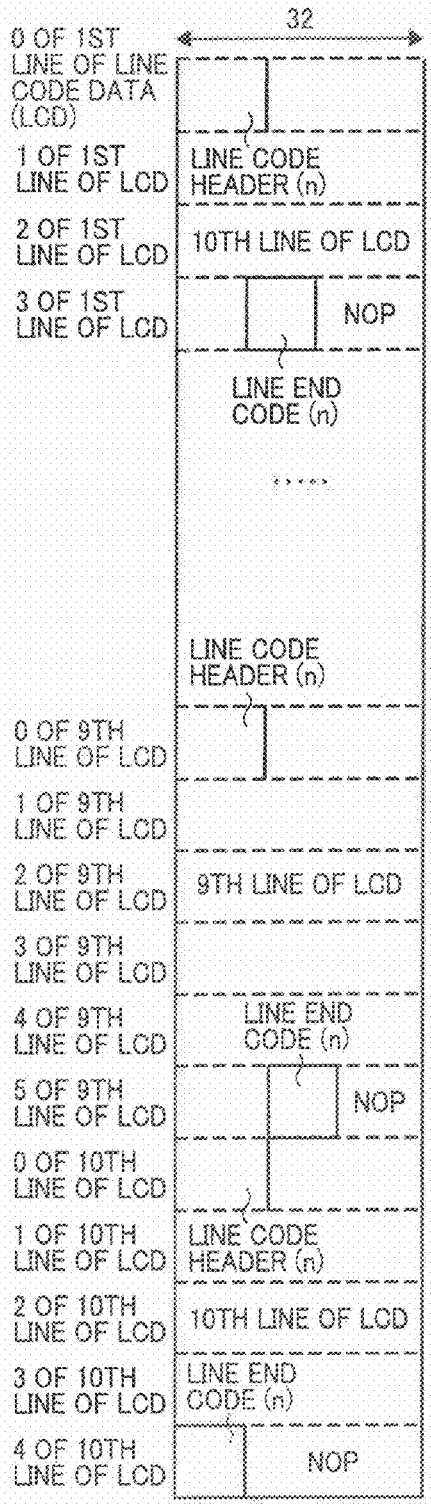
FIGS. 44A to 44D are diagrams illustrating the relationship between the code data and the code line memory during 0-degree rotation decoding according to the second embodiment of the invention.
Figure 44B:
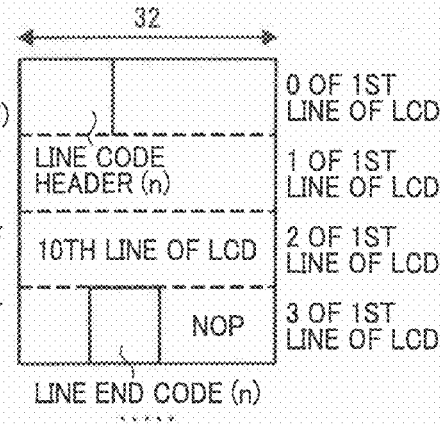
Figure 44C:
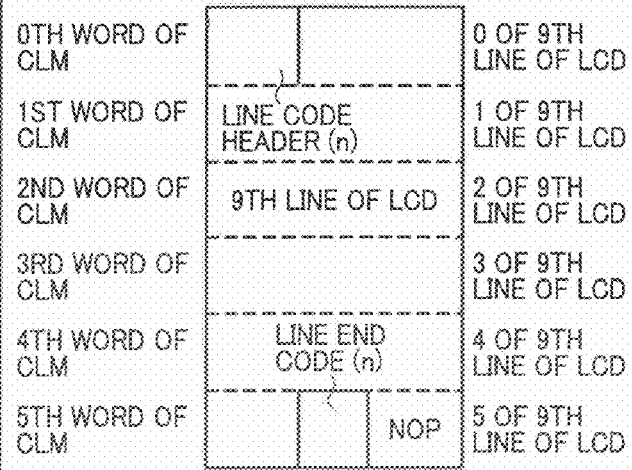
Figure 44D:
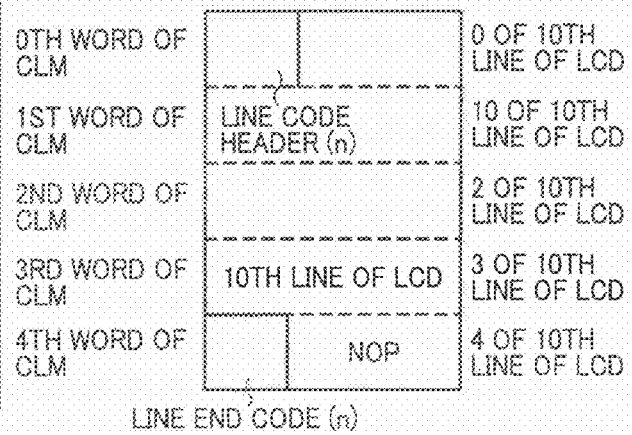

In the second embodiment, similar to the first embodiment, as in an example of the line code data shown in FIG. 42, the codes for each line are divided in a word unit in order to facilitate the detection of the line code header and the decoding of the code data for each line.

FIG. 41B shows an example of the run length code. The run length code includes consecutive binary values of "0" and "1" and indicates a run length. An inverted code of a run length code L0 inverts the values "0" and "1" of the run length. During coding, it is preferable that the head start from a value "0." Therefore, when image data starting from a value "1" is coded, it is declared that the image data starts from a value "1" with the inverted code and then the image data is coded with the run length codes L1 and L2. The run length codes L1 and L2 indicate run lengths with a value "0" or a value "1." The run length code L1 indicates one to eight consecutive values, and the run length code L2 indicates nine to seventy-two consecutive values. A 2-bit value "10" at the head of the run length code L2 is used to identify the run length code L2.

FIGS. 43A to 43D show the relationship between the code data and the code line memory 304 during 180-degree rotation decoding, and FIGS. 44A to 44D show the relationship between the code data and the code line memory 304 during 0-degree rotation decoding. As such, in the second embodiment, the relationship between the code data and the code line memory 304 is the same as the relationship between the code data and the code line memory 304 in the first embodiment except that the line marker is replaced with the line code header.

<Coding Process>

A coding process according to the second embodiment will be described below. In the second embodiment, the same coding process as that described with reference to the flowchart of FIG. 17 in the first embodiment is performed in a line unit. FIGS. 45A and 45B are flowcharts illustrating an example of a line coding process according to the second embodiment in Step S11 of FIG. 17. In the flowcharts shown in FIGS. 45A and 45B, codes "1," "2," and "3" indicate that the process is performed on the corresponding codes.

In Step S230, each variable is initialized. For example, a flag INITFLG is initialized to 0, a value OLD_bit is initialized to 0, a run length is initialized to 1, a code buffer is initialized to 0 (empty state), and a code pointer is initialized to 64. In Step S231, a line code header "0xFFF" is used as code data and a code size is 12 bits. In Step S232, the code data of the line code header is output in the same way as that described with reference to FIG. 27.

In Step S233, image data is read in a word unit. In Step S234, it is determined whether the flag INITFLG is 0 and the MSB of the read word data value is "1." When it is determined that the flag INITFLG is 0 or the MSB of the read word data value is not "1," the process proceeds to Step S237. On the other hand, when it is determined that the flag INITFLG is 0 and the MSB of the read word data value is "1," the process proceeds to Step S235.

In Step S235, an inverted code "0xF8" is used as the code data and a code size is 8 bits. In Step S236, the code data is output in the same way as that described with reference to FIG. 27.

In Step S237, the flag INITFLG is set to 1. In Step S238, a value X is set to 0. In Step S239, an X-th bit value is cut out from a word data value. In Step S240, it is determined whether the bit value cut out in Step S239 is equal to the value OLD_bit. When it is determined that the cut bit value is equal to the value OLD_bit, the process proceeds to Step S241 and 1 is added to the run length. On the other hand, when it is determined that the cut bit value is not equal to the value OLD_bit, the process proceeds to Step S242 and a run length coding process is performed.

When Step S241 or Step S242 ends, the process proceeds to Step S243 and the bit value cut in Step S239 becomes the value OLD_bit. In Step S244, 1 is added to the value X. In Step S245, it is determined whether the value X is less than the number of word bits. When it is determined that the value X is less than the number of word bits, the process returns to Step S239.

On the other hand, when it is determined that the value X is equal to or more than the number of word bits, the process proceeds to Step S246 and it is determined whether the number of words corresponding to one line has been processed. When it is determined that the number of words corresponding to one line has not been processed, the process returns to Step S233 and the next word is read from the image data.

When it is determined that the number of words corresponding to one line has been processed, the process proceeds to Step S247, and a line end code "0xF0" is used as the code data and a code size is 8 bits. In Step S248, a code output process is performed in the same way as that described with reference to FIG. 27.

When the code output process ends, the process proceeds to Step S249 and it is determined whether the code buffer is empty. When it is determined that the code buffer is empty, a series of processes shown in the flowcharts of FIGS. 45A and 45B ends. On the other hand, when it is determined that the code buffer is not empty, the process proceeds to Step S250. The code buffer is shifted 32 bits to the right and is used as an output code buffer. In Step S251, the output code buffer is output. Then, the process proceeds to Step S252, and the code counter is increased by 1. In this way, a series of processes shown in the flowcharts of FIGS. 45A and 45B ends.

FIG. 46 shows an example of the run length coding process in Step S242 of FIGS. 45A and 45B. In Step S260, it is determined whether the run length is equal to or less than 8. When it is determined that the run length is equal to or less than 8, the process proceeds to Step S261, and 1 is subtracted from the run length. In Step S262, a run length value of 4 bits is used as the code data and a code size is 4 bits. In Step S263, the code output process is performed in the same way as that described with reference to FIG. 27. Then, the process proceeds to Step S273 and the run length is set to 1. In this way, a series of process shown in the flowchart of FIG. 46 ends.

On the other hand, when it is determined in Step S260 that the run length is more than 8, the process proceeds to Step S264. In Step S264, it is determined whether the run length is equal to or less than 72. When it is determined that the run length is equal to or less than 72, the process proceeds to Step S265, and 9 is subtracted from the run length. Then, the process proceeds to Step S266. In Step S266, 8 bits including a 2-bit value "0b11" and a 6-bit run length are used as the code data and the code size is 8 bits. Then, the process proceeds to Step S267, and the code output process is performed in the same way as described with reference to FIG. 27. When the code output process ends, the process proceeds to Step S273.

On the other hand, when it is determined in Step S264 that the run length is more than 72, the process proceeds to Step S268. In Step S268, 8 bits including a 2-bit value "0b10" and a 6-bit value "0b111111" indicating the run length of a decimal value "72" are used as the code data and the code size is 8 bits. Then, the process proceeds to Step S269, and the code output process is performed in the same way as described with reference to FIG. 27.

When the coding process ends, the process proceeds to Step S270. An inverted code "0xFF00" is used as the code data and the code size is 8 bits. That is, the inverted code indicates that the run length is continuous. Then, the process proceeds to Step S271 and the code output process is performed in the same way as that described with reference to FIG. 27. When the code output process ends, the process proceeds to Step S272 and 72 is subtracted from the run length. Then, the process returns to Step S260.

<Decoding Process>

Next a decoding process according to the second embodiment will be described. In the second embodiment, the same decoding process as that in the flowchart of FIG. 28 in the first embodiment is performed in a line unit. During double-side printing, in Step S101, when it is determined that the flag SFLAG is 1 and the print mode is a rear surface print mode, the 180-degree rotation decoding process in Step S102 is performed in the same way as that in FIG. 29.

Figure 47:
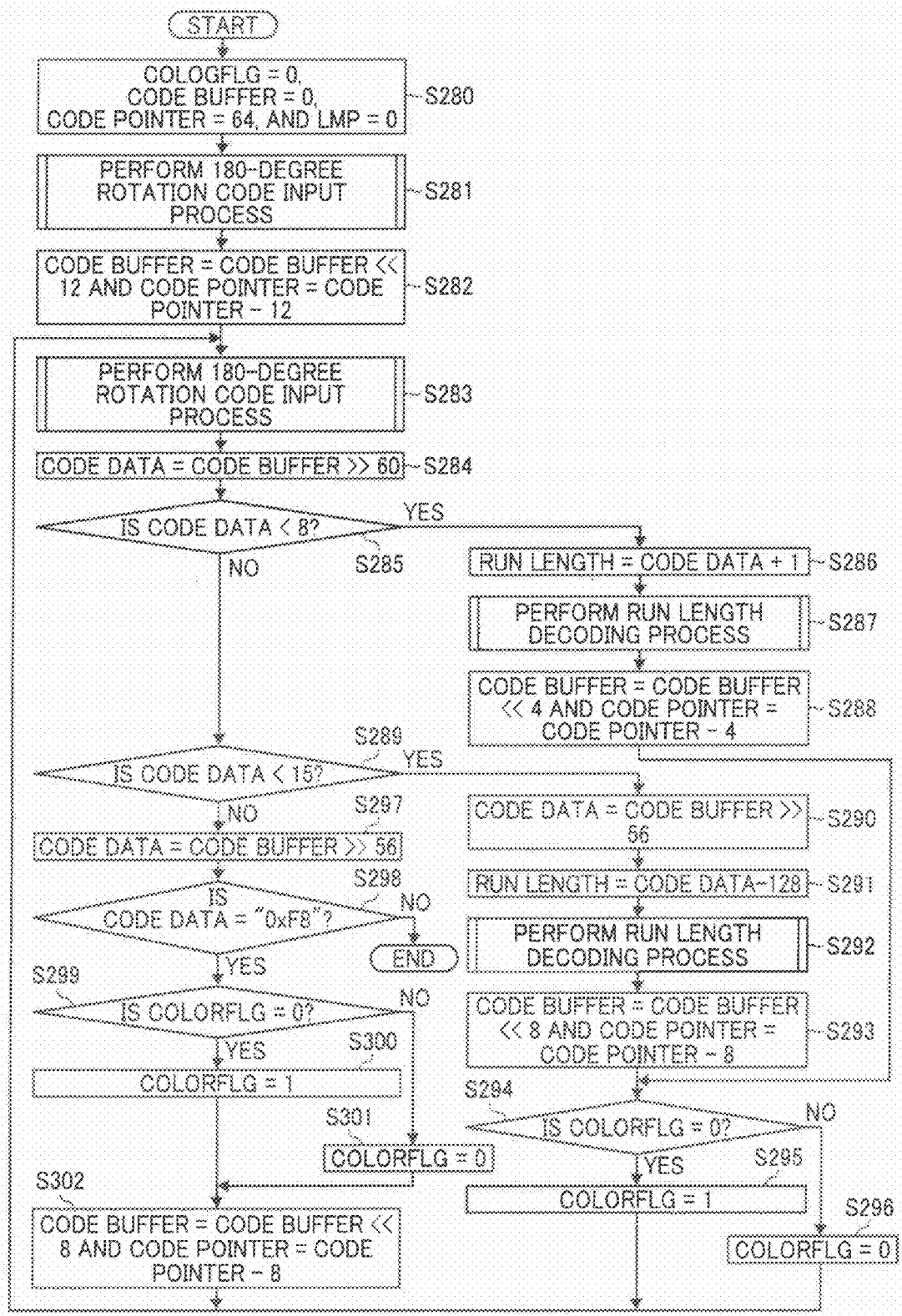
FIG. 47 is a flowchart illustrating an example of a 180-degree rotation line decoding process according to the second embodiment of the invention.

FIG. 47 is a flowchart illustrating an example of the 180-degree rotation line decoding process according to the second embodiment in Step S118 of FIG. 29. In Step S280, each variable is initialized. For example, a flag COLORFLG is initialized to 0, the code buffer is initialized to 0, a code pointer is initialized to 64, and the count value LMP of the line memory pixel counter is initialized to 0. In Step S281, the 180-degree rotation code input process is performed in the same way as that described with reference to FIG. 31. In Step S282, the code buffer is shifted 12 bits to the left and 12 is subtracted from the code pointer. In this way, the line code header is removed from the code data.

In Step S283, the 180-degree rotation code input process is performed in the same way as that described with reference to FIG. 31. In Step S284, the code buffer is shifted to 60 bits to the right and the code data is read. In this way, 4 bits from the head of the next code are cut out as the code data. When the code data is cut out, the process proceeds to Step S285 and it is determined whether the value of the code data is less than 8. That is, in Step S285, it is determined whether the code is the run length code L1.

When it is determined that the value of the code data is less than 8 and the code is the run length code L1, the process proceeds to Step S286, and a value obtained by adding 1 to the value of the code data becomes the run length. In Step S287, a run length decoding process is performed.

When the run length is decoded in Step S287, the process proceeds to Step S288. The code buffer is shifted 4 bits to the left and 4 is subtracted from the code pointer. Then, the process proceeds to Step S294 and it is determined whether the flag COLORFLG is 0. When it is determined that the flag COLORFLG is 0, the flag COLORFLG is 1 in Step S295, and the process returns to Step S283. On the other hand, when it is determined that the flag COLORFLG is not 0, the flag COLORFLG is 0 in Step S296. The process returns to Step S283.

When it is determined in Step S285 that the value of the code data is equal to or more than 8, the process proceeds to Step S289 and it is determined whether the value of the code data is less than 15. That is, in Step S289, it is determined whether the code is the run length code L2. When it is determined that the value of the code data is less than 15 and the code is the run length code L2, the process proceeds to Step S290. The code buffer is shifted 56 bits to the right and the code data is read. In Step S291, a value obtained by subtracting 128 from the value of the code data becomes the code data. Then, the process proceeds to Step S292 and a run length decoding process is performed.

When the run length decoding process in Step S292 ends, the process proceeds to Step S293. The code buffer is shifted 8 bits to the left and 8 is subtracted from the code pointer. Then, the process proceeds to Step S294.

When it is determined in Step S289 that the value of the code data is equal to or more than 16, the process proceeds to Step S297. The code buffer is shifted 56 bits to the right and the code data is read. Then, in Step S298, it is determined whether the code data is a value "0xF8," that is, an inverted code. When it is determined that the code is not the inverted code, the code may be determined to be the line end code. Therefore, a series of processes shown in the flowchart of FIG. 47 ends.

When it is determined that the code is the inverted code, the process proceeds to Step S299 and it is determined whether the flag COLORFLG is 0. When it is determined that the flag COLORFLG is 0, the flag COLORFLG is 1 in Step S300. When it is determined that the flag COLORFLG is not 0, the flag COLORFLG is 0 in Step S301.

After Step S300 or Step S301, the process proceeds to Step S302. The code buffer is shifted 8 bits to the left and 8 is subtracted from the code pointer. Then, the process returns to Step S283.

Figure 48:
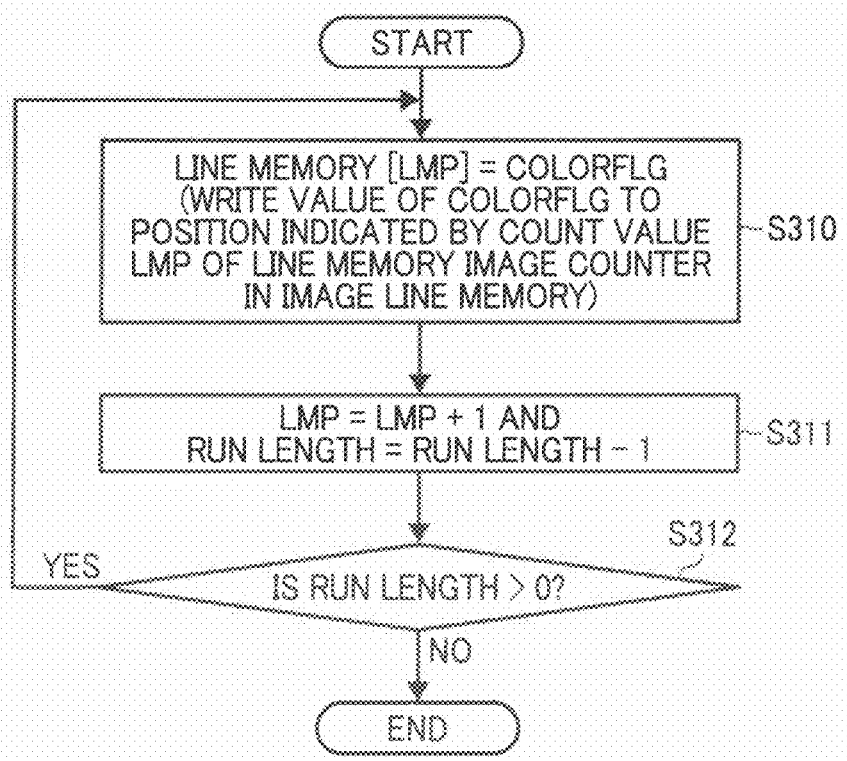
FIG. 48 is a flowchart illustrating an example of a run length decoding process.

FIG. 48 is a flowchart illustrating an example of the run length decoding process in Step S287 and Step S292. In Step S310, the value of the flag COLORFLG is written to the position indicated by the count value LMP of the line memory pixel counter in the image line memory 307. In Step S311, 1 is added to the count value LMP of the line memory pixel counter, and 1 is subtracted from the run length. In Step S312, it is determined whether the run length is more than 0. When it is determined that the run length is more than 0, the process returns to Step S310. On the other hand, when it is determined that the run length is 0, a series of processes shown in the flowchart of FIG. 48 ends. As such, image data corresponding to the value of the run length is drawn in the image line memory 307 with the value indicated by the current flag COLORFLG.

Figure 49:
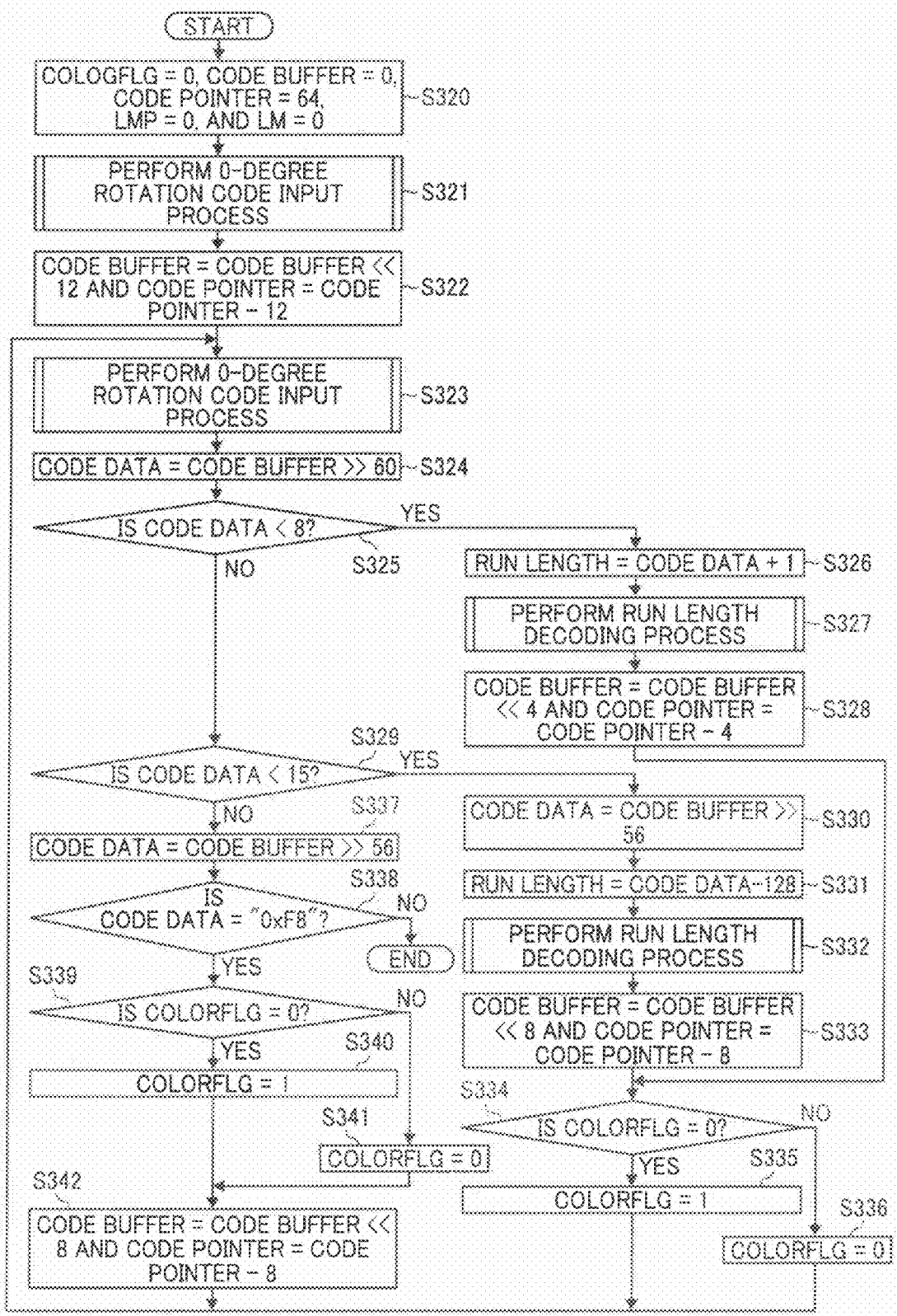
FIG. 49 is a diagram illustrating an example of a 0-degree rotation line decoding process according to the second embodiment of the invention.
Figure 50:
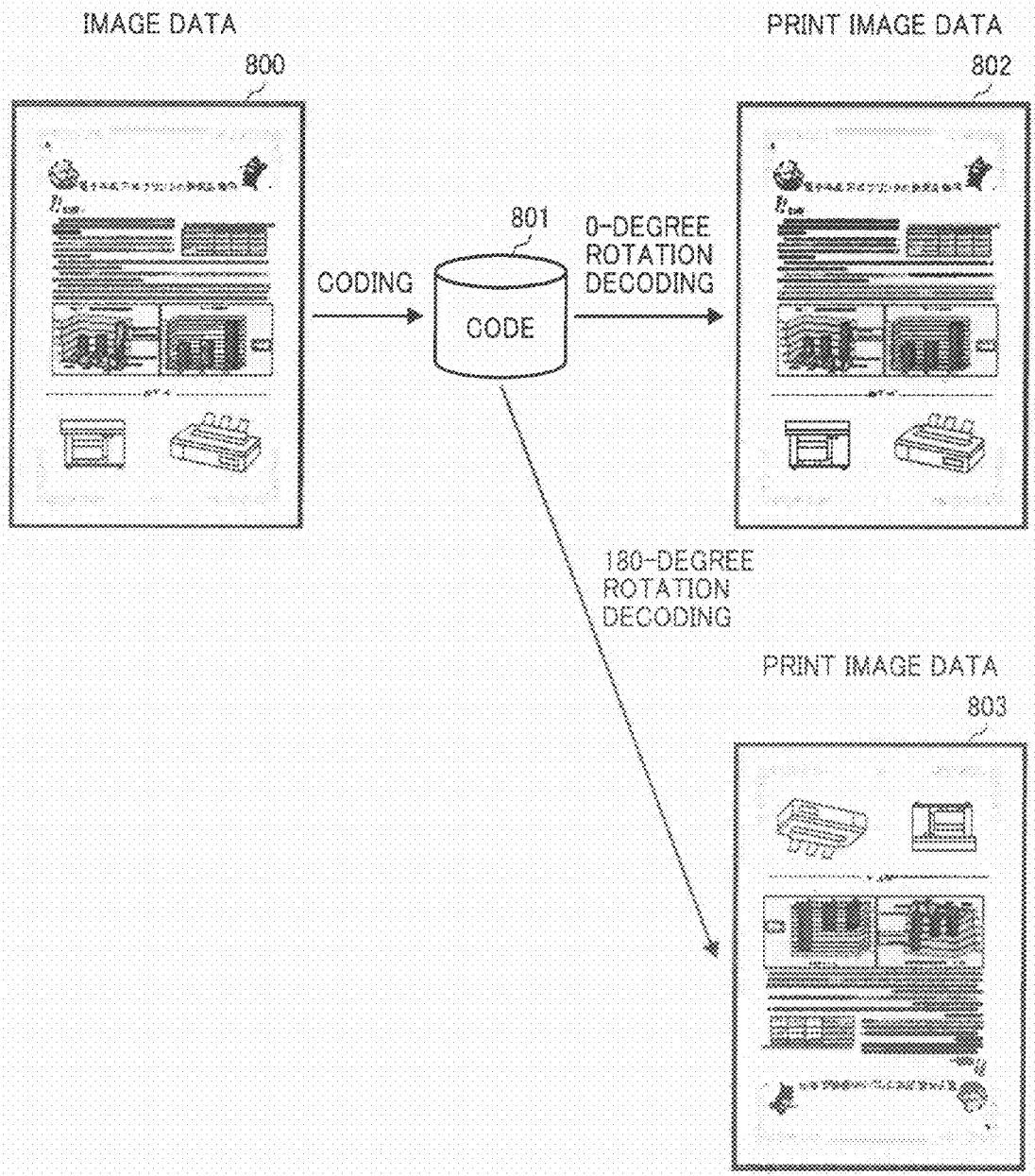
FIG. 50 is a diagram illustrating the related art.
Figure 51:
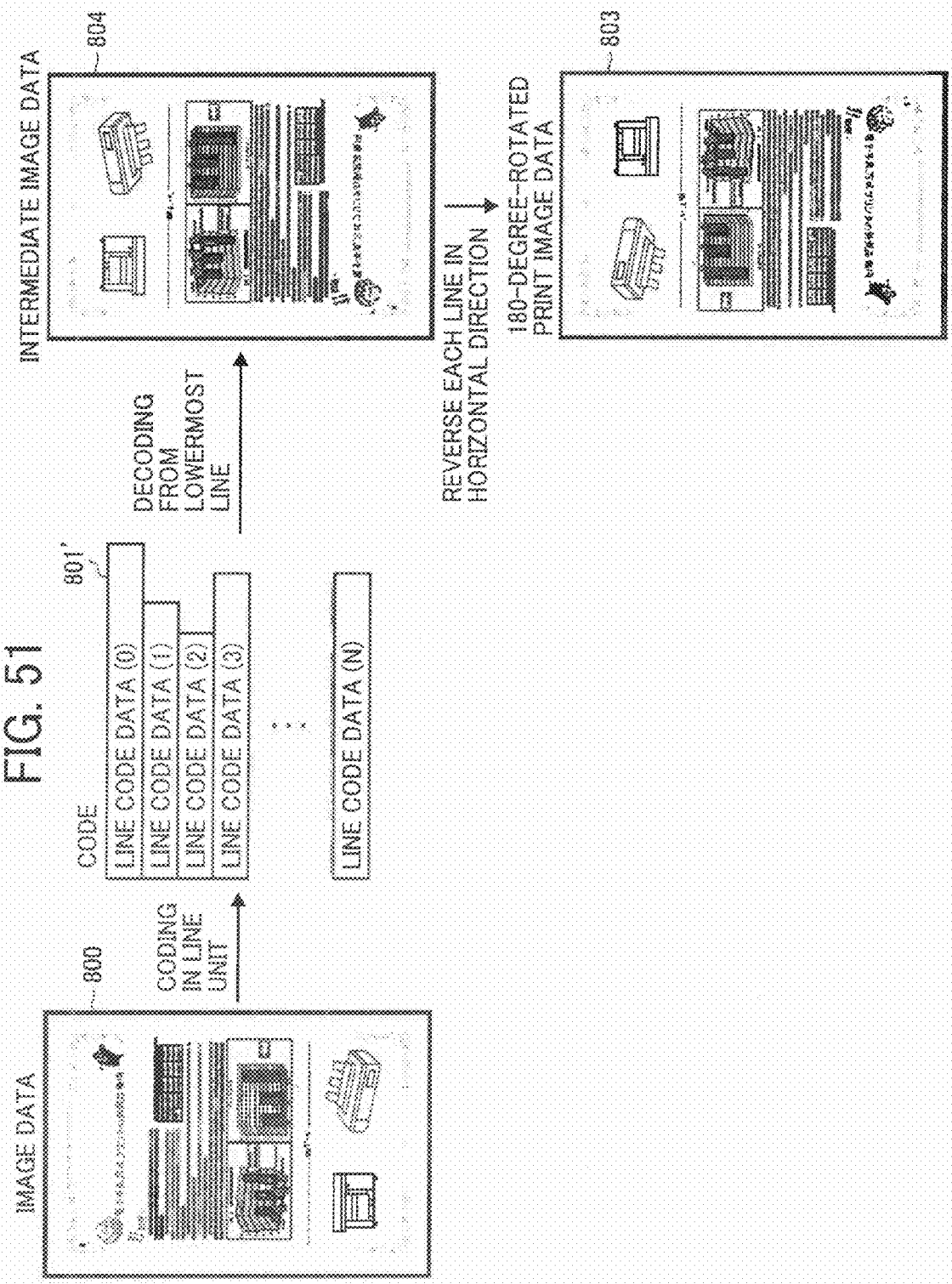
FIG. 51 is a diagram illustrating the related art.
Figure 52:
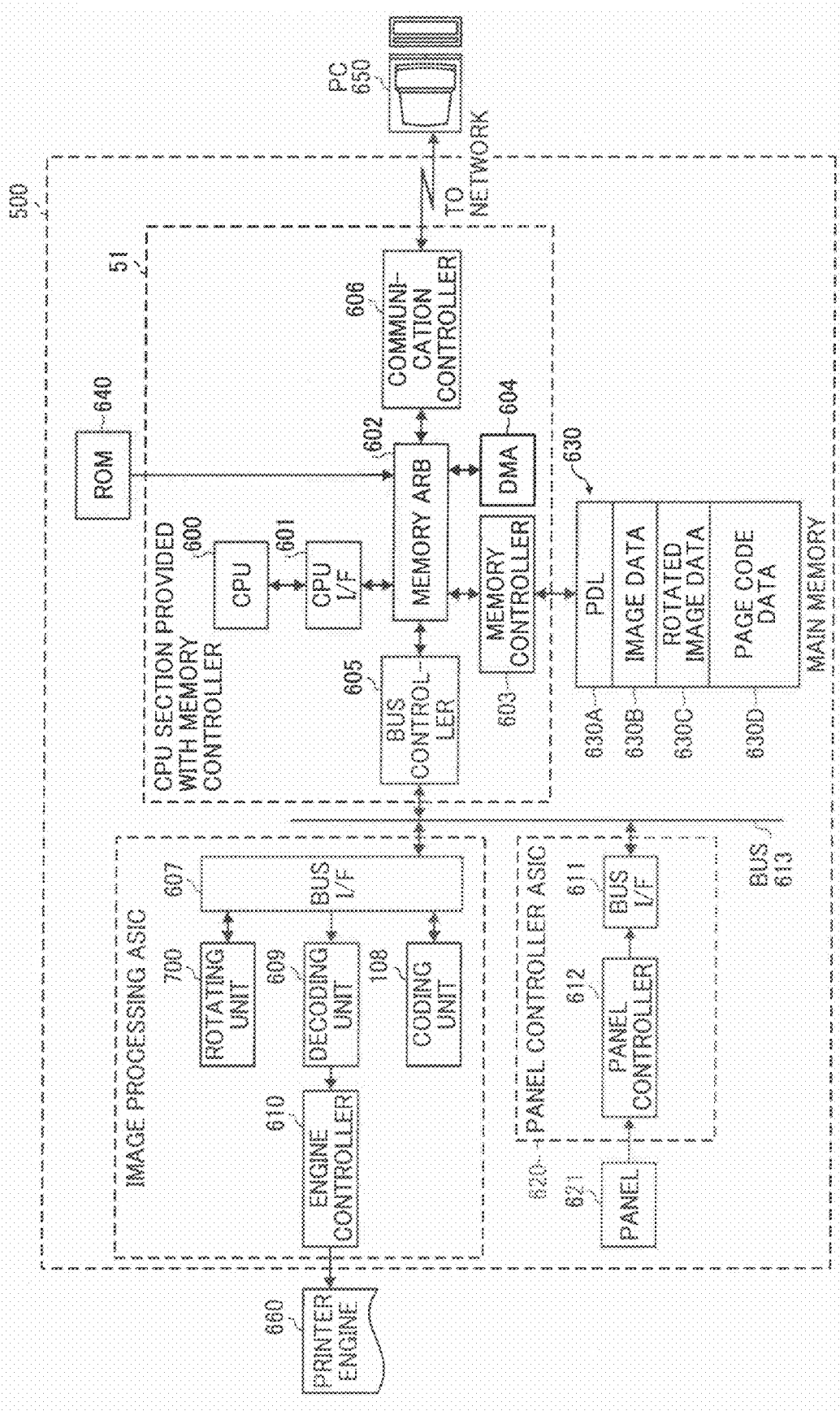
FIG. 52 is a block diagram illustrating the structure of an example of a printer according to the related art.
Figure 53:
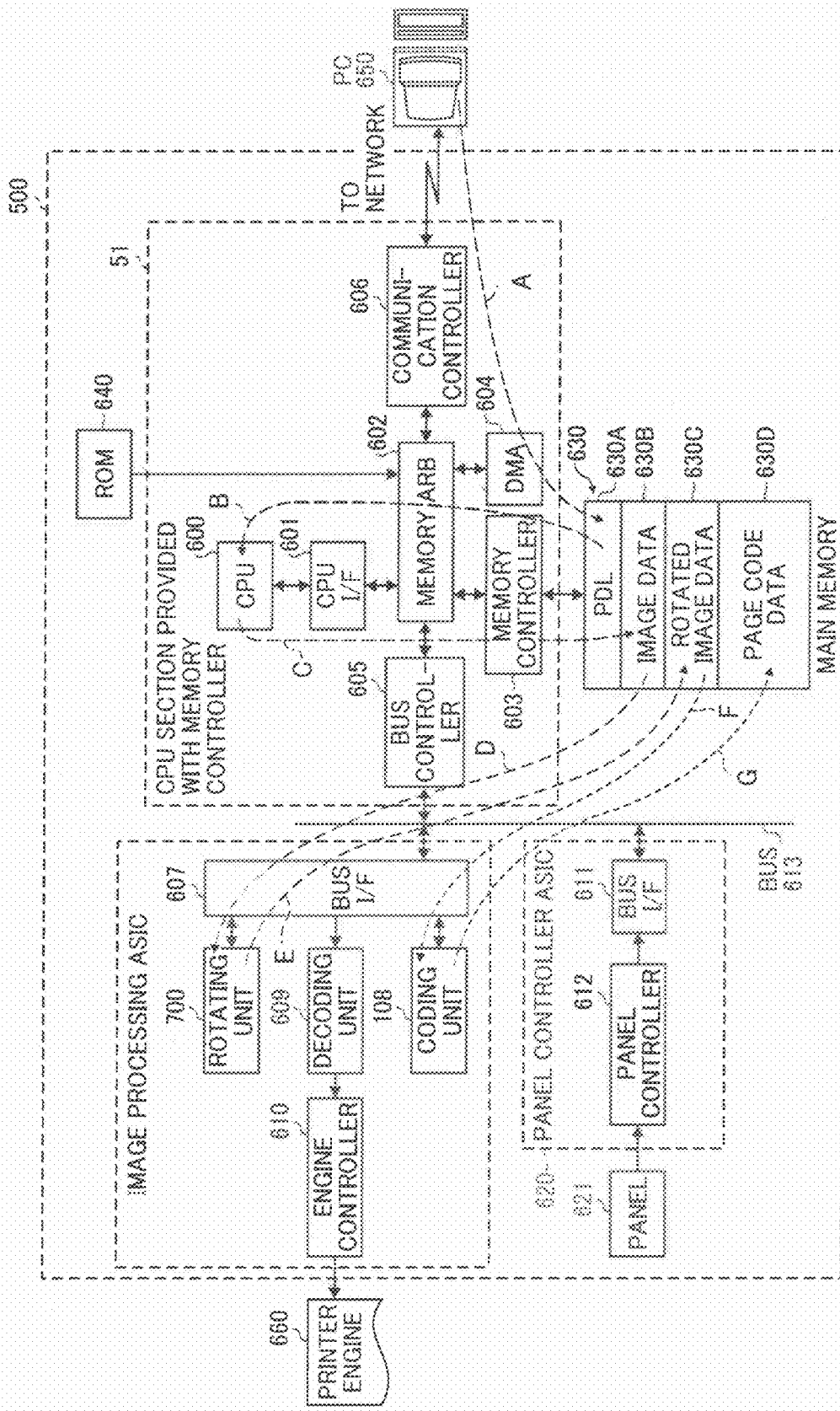
FIG. 53 is a diagram illustrating the flow of data when a 180-degree rotation process is performed in the printer according to the related art.
Figure 54:
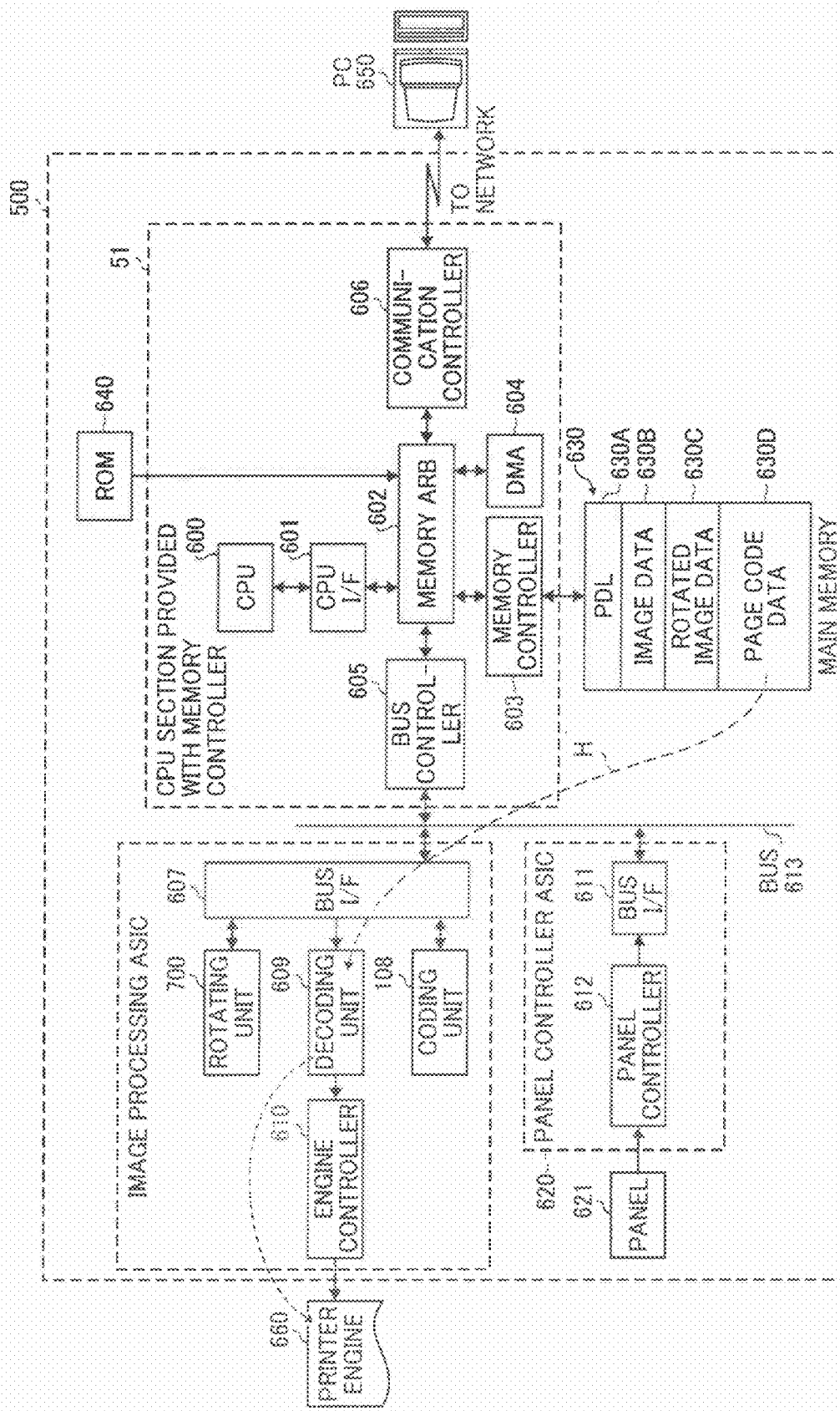
FIG. 54 is a diagram illustrating the flow of data when the 180-degree rotation process is performed in the printer according to the related art.
Figure 55:
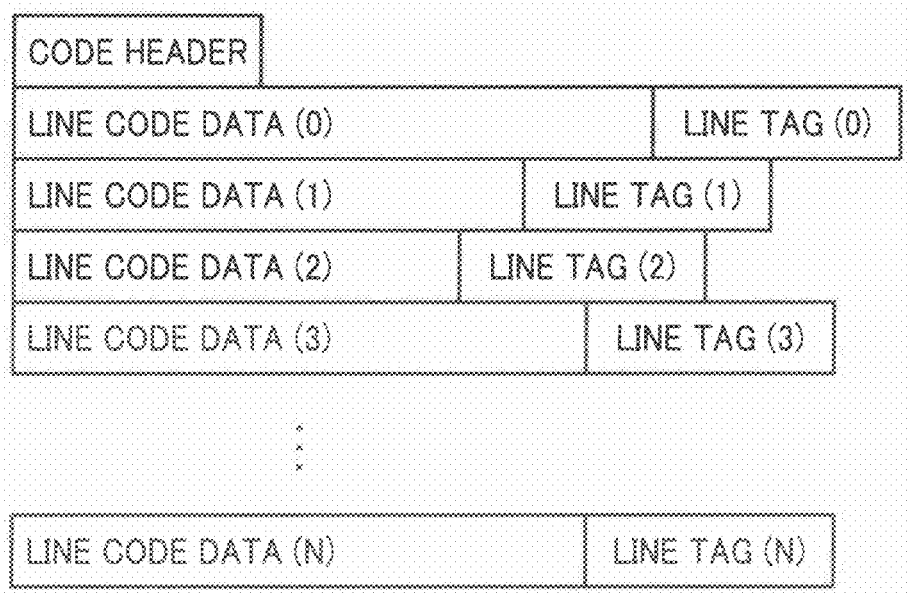
FIG. 55 is a diagram illustrating an example of a code according to the related art.

FIG. 49 is a flowchart illustrating an example of the 0-degree rotation line decoding process according to the second embodiment in Step S187 of FIG. 37. In Step S320, each variable is initialized. For example, the flag COLORFLG is initialized to 0, the code buffer is initialized to 0, the code pointer is initialized to 64, the count value LM of the line memory counter is initialized 0, and the count value LMP of the line memory pixel counter is initialized to 0. In Step S321, the 0-degree rotation code input process is performed in the same way as that described with reference to FIG. 39. In Step S322, the code buffer is shifted 12 bits to the left and 12 is subtracted from the code pointer. In this way, the code data is removed from the line code header.

In Step S323, the 0-degree rotation code input process is performed in the same way as that described with reference to FIG. 39. In Step S324, the code buffer is shifted 60 bits to the right and the code data is read. In this way, 4 bits from the head of the next code are cut out as the code data. When the code data is cut out, the process proceeds to Step S325, and it is determined whether the value of the code data is less than 8. That is, in Step S325, it is determined whether the code is the run length code L1.

When it is determined that the value of the code data is less than 8 and the code is the run length code L1, the process proceeds to Step S326 and a value obtained by adding 1 to the value of the code data becomes the run length. Then, in Step S327, the run length decoding process is performed.

When the run length is decoded in Step S327, the process proceeds to Step S328 and the code buffer is shifted 4 bits to the left and 4 is subtracted from the code pointer. Then, the process proceeds to Step S334 and it is determined whether the flag COLORFLG is 0. When it is determined that the flag COLORFLG is 0, the flag COLORFLG is 1 in Step S335 and the process returns to Step S323. On the other hand, when it is determined that the flag COLORFLG is not 0, the flag COLORFLG is 0 in Step S336, and the process returns to Step S323.

When it is determined in Step S325 that the value of the code data is equal to or more than 8, the process proceeds to Step S329 and it is determined whether the value of the code data is less than 15. That is, in Step S329, it is determined whether the code is the run length code L2. When it is determined that the value of the code data is less than 15 and the code is the run length code L2, the process proceeds to Step S330. The code buffer is shifted 56 bits to the right and the code data is read. In Step S331, a value obtained by subtracting 128 from the value of the code data becomes the code data. Then, the process proceeds to Step S332 and the run length decoding process is performed.

When the run length decoding process in Step S332 ends, the process proceeds to Step S333. The code buffer is shifted 8 bits to the left, and 8 is subtracted from the code pointer. Then, the process proceeds to Step S334.

When it is determined in Step S329 that the value of the code data is equal to or more than 16, the process proceeds to Step S337. The code buffer is shifted 56 bits to the right and the code data is read. Then, in Step S338, it is determined whether the code data is the value "0xF8," that is, the inverted code. When it is determined that the code is not the inverted code, the code may be determined to be the line end code. Therefore, a series of processes shown in the flowchart of FIG. 49 ends.

When it is determined that the code is the inverted code, the process proceeds to Step S339 and it is determined whether the flag COLORFLG is 0. When it is determined that the flag COLORFLG is 0, the flag COLORFLG is 1 in Step S340. When it is determined that the flag COLORFLG is not 0, the flag COLORFLG is 0 in Step S341.

After Step S340 or Step S341, the process proceeds to Step S342. The code buffer is shifted 8 bits to the left and 8 is subtracted from the code pointer. Then, the process returns to Step S323.

As described above, in the second embodiment, the line code header is arranged at the head of the line code data, and the line end code is arranged at the end thereof. Therefore, even when the line code data is divided into a word unit and is then stored in the line memory, it is easy to read the line code data in the reverse direction. Therefore, it is not necessary to provide a separate structure for rotating the image data 180 degrees and it is possible to reduce the amount of data transmitted through the bus 113 when the image data is rotated 180 degrees. In addition, even when the run length coding method is used, it is possible to perform coding and decoding processes, similar to the MTF coding method.

According to the embodiments, it is possible to effectively perform a 180-degree rotation process on image data subjected to compression coding.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a first storage unit that stores therein a plurality of code data each of which is formed by arranging an identification code at a head side of line code data and a line end code at an end side of the line code data obtained by coding image data in a line unit, in order from a first line to a last line of the image data, the identification code being arranged at a head side of each line of a plurality of lines of the code data, the line end code being arranged at an end side of each line of the plurality of lines of the code data, and the line end code being independent of an amount of code of each respective line of the plurality of lines;

a first reading unit that reads the code data from the first storage unit;

a second storage unit that recognizes the identification code from the code data read by the first reading unit to store therein the code data in a line unit based on the identification code;

a second reading unit that reads the code data from the second storage unit;

a decoding unit that decodes the code data read by the second reading unit;

a third storage unit that stores therein decoded image data obtained by decoding the code data by the decoding unit in a line unit; and a third reading unit that reads the decoded image data stored in the third storage unit in a line unit, wherein, when the image data is rotated 180 degrees and is output, the first reading unit reads the code data from the first storage unit from the last line to the first line and reads each line from an end to a head of the line, the second reading unit reads the code data from the second storage unit from a position of the identification code included in the code data to the end of the line with respect to the code data, and the third reading unit reads the decoded image data from the third storage unit from the end to the head of the line in a pixel unit.

2. The image processing apparatus according to claim 1, wherein the second storage unit stores therein the code data divided into a predetermined unit with a data length less than that of the line.

3. The image processing apparatus according to claim 2, wherein the second storage unit stores therein the code data such that the identification code is arranged at a head of the predetermined unit.

4. The image processing apparatus according to claim 1, wherein the line code data is coded using only information of the line included in the line code data in the image data.

5. The image processing apparatus according to claim 1, wherein the code data is coded by a variable-length coding method.

6. The image processing apparatus according to claim 1, wherein, when the image data is rotated 0 degrees and is output, the first reading unit reads the code data from the first storage unit from the first line to the last line and reads each line from a head to an end of the line, the second reading unit reads the code data from the second storage unit from a position of the identification code included in the code data to the end of the line with respect to the code data, the third reading unit reads the decoded image data from the third storage unit from the head to the end of the line in a pixel unit, and the first reading unit, the second reading unit, and the third reading unit change a reading process for the 0-degree rotation and a reading process for the 180-degrees rotation for each image data.

7. An image processing method comprising:

first reading, by a first reading unit, code data which is formed by arranging an identification code at a head side of line code data and a line end code at an end side of the line code data obtained by coding image data in a line unit from a first storage unit that stores therein a plurality of the code data in order from a first line to a last line of the image data, the identification code being arranged at a head side of each line of a plurality of lines of the code data, the line end code being arranged at an end side of each line of the plurality of lines of the code data, and the line end code being independent of an amount of code of each respective line of the plurality of lines;

second recognizing, by a second storage unit, the identification code from the code data read by the first reading unit to store therein the code data in a line unit based on the identification code;

second reading, by a second reading unit, the code data from the second storage unit;

decoding, by a decoding unit, the code data read by the second reading;

third storing, by a third storage unit, therein decoded image data obtained by decoding the code data by the decoding in a line unit; and third reading, by a third reading unit, the decoded image data stored in the third storage unit in a line unit, wherein, when the image data is rotated 180 degrees and is output, the first reading includes reading the code data from the first storage unit from the last line to the first line and reads each line from an end to a head of the line, the second reading includes reading the code data from the second storage unit from a position of the identification code included in the code data to the end of the line with respect to the code data, and the third reading includes reading the decoded image data from the third storage unit from the end to the head of the line in a pixel unit.

8. An image forming apparatus comprising:

a printing unit configured to perform printing on front and rear surfaces of a sheet;

a first storage unit that stores therein a plurality of code data each of which is formed by arranging an identification code at a head side of line code data and a line end code at an end side of the line code data obtained by coding image data in a line unit, in order from a first line to a last line of the image data, the identification code being arranged at a head side of each line of a plurality of lines of the code data, the line end code being arranged at an end side of each line of the plurality of lines of the code data, and the line end code being independent of an amount of code of each respective line of the plurality of lines;

a first reading unit that reads the code data from the first storage unit;

a second storage unit that recognizes the identification code from the code data read by the first reading unit to store therein the code data in a line unit based on the identification code;

a second reading unit that reads the code data from the second storage unit;

a decoding unit that decodes the code data read by the second reading unit;

a third storage unit that stores therein decoded image data obtained by decoding the code data by the decoding unit in a line unit; and a third reading unit that reads the decoded image data stored in the third storage unit in a line unit, wherein, when the image data is rotated 180 degrees and is output,
the first reading unit reads the code data from the first storage unit from the last line to the first line and reads each line from an end to a head of the line,
the second reading unit reads the code data from the second storage unit from a position of the identification code included in the code data to the end of the line with respect to the code data, and
the third reading unit reads the decoded image data from the third storage unit from the end to the head of the line in a pixel unit, and
wherein the first reading unit, the second reading unit, and the third reading unit perform a reading process for the 0-degree rotation when the printing unit performs printing on the front surface of the sheet and performs a reading process for the 180-degree rotation when the printing unit performs printing on the rear surface of the sheet.

9. The image processing apparatus according to claim 1, wherein
the first reading unit reads the code data from the first storage unit from the last line to the first line and reads in a single direction each line from the line end code at an end of the line to the identification code at a head of the line.

10. The image processing apparatus according to claim 1, wherein
the line end code corresponds to another identification code of a predetermined length.

11. The image processing apparatus according to claim 1, wherein
a length of the line end code is a same for each line of the plurality of lines of the code data.

12. The image processing apparatus according to claim 1, wherein
a length of the line end code of each line of the plurality of lines of the code data is eight bits.

13. The image processing apparatus according to claim 1, wherein
a length of the identification code of each line of the plurality of lines of the code data is twenty bits.

* * * * *